(12) United States Patent
Moore

(10) Patent No.: US 10,462,972 B2
(45) Date of Patent: Nov. 5, 2019

(54) METHODS FOR AUTOMATED PRUNING AND HARVESTING OF FRUIT PLANTS UTILIZING A GRAPHIC PROCESSOR UNIT

(71) Applicant: Francis Wilson Moore, Pasco, WA (US)

(72) Inventor: Francis Wilson Moore, Pasco, WA (US)

(73) Assignee: HarvestMoore, L.L.C., Kennewick, WA (US)

( * ) Notice: Subject to any disclaimer, the term of this patent is extended or adjusted under 35 U.S.C. 154(b) by 187 days.

(21) Appl. No.: 15/706,512

(22) Filed: Sep. 15, 2017

(65) Prior Publication Data

US 2018/0092304 A1    Apr. 5, 2018

Related U.S. Application Data

(60) Provisional application No. 62/533,596, filed on Jul. 17, 2017, provisional application No. 62/394,904, filed on Sep. 15, 2016.

(51) Int. Cl.

| A01D 46/30 | (2006.01) |
|---|---|
| A01D 46/24 | (2006.01) |
| B25J 5/00 | (2006.01) |
| B25J 9/16 | (2006.01) |
| B25J 15/00 | (2006.01) |
| G05D 1/02 | (2006.01) |
| A01G 3/08 | (2006.01) |
| A01D 46/253 | (2006.01) |
| B25J 9/00 | (2006.01) |
| B25J 9/04 | (2006.01) |

(Continued)

(52) U.S. Cl.
CPC ............. *A01D 46/30* (2013.01); *A01D 46/24* (2013.01); *A01D 46/253* (2013.01); *A01G 3/08* (2013.01); *A01G 3/085* (2013.01); *B25J 5/00* (2013.01); *B25J 5/007* (2013.01); *B25J 9/0084* (2013.01); *B25J 9/046* (2013.01); *B25J 9/1679* (2013.01); *B25J 9/1697* (2013.01); *B25J 15/0019* (2013.01); *G05D 1/0231* (2013.01); *G05B 2219/45105* (2013.01); *G05D 1/0088* (2013.01); *G05D 2201/0201* (2013.01); *G06T 17/00* (2013.01); *Y10S 901/01* (2013.01)

(58) Field of Classification Search
CPC ....... A01D 34/008; A01D 46/24; A01D 46/30
See application file for complete search history.

(56) References Cited

U.S. PATENT DOCUMENTS

| 2,288,682 A | 7/1942 | Chittenden |
|---|---|---|
| 2,443,027 A | 6/1948 | Dishmaker |
| 2,553,463 A | 5/1951 | McCulloch |

(Continued)

FOREIGN PATENT DOCUMENTS

EP     0267860 A2  *  5/1988  ............. A01D 46/24

OTHER PUBLICATIONS

WO PCT/US2010/046678 Srch Rpt, dated Apr. 28, 2011, Moore.

(Continued)

*Primary Examiner* — Alicia Torres
(74) *Attorney, Agent, or Firm* — Wells St. John P.S.

(57) ABSTRACT

A method for pruning a fruit plant. An exemplary method step includes obtaining an image of the fruit plant that has branches. Next, creating exclusion zones surrounding the branches. Then pruning the fruit plant based upon the exclusion zones.

24 Claims, 33 Drawing Sheets

(51) Int. Cl.
  *G06T 17/00* (2006.01)
  *G05D 1/00* (2006.01)

(56) References Cited

U.S. PATENT DOCUMENTS

| | | | |
|---|---|---|---|
| 2,968,907 | A | 1/1961 | Bernheim |
| 3,165,833 | A | 1/1965 | Logan |
| 3,165,880 | A | 1/1965 | Buie |
| 3,182,827 | A | 5/1965 | Frost |
| 3,277,572 | A | 10/1966 | Eickenberg |
| 3,365,870 | A | 1/1968 | Cardinale |
| 3,460,330 | A | 8/1969 | Black |
| 3,507,107 | A | 4/1970 | Harms |
| 3,564,826 | A | 2/1971 | Middleton, Jr. |
| 3,591,949 | A | 7/1971 | Connery |
| 3,621,643 | A | 11/1971 | Garrans |
| 3,756,001 | A | 9/1973 | Macidull |
| 3,793,814 | A | 2/1974 | Rohrbach |
| 3,898,785 | A | 8/1975 | Chew |
| 3,901,005 | A | 8/1975 | Rohrbach |
| 3,913,307 | A | 10/1975 | Cardinal, Jr. |
| 3,969,878 | A | 7/1976 | Morganeier |
| 4,015,366 | A | 4/1977 | Hall, III |
| 4,215,451 | A | 8/1980 | Wikoff |
| 4,482,960 | A | 11/1984 | Pryor |
| 4,501,113 | A | 2/1985 | Gerber |
| 4,519,193 | A | 5/1985 | Yoshida |
| 4,520,619 | A | 6/1985 | Doi |
| 4,532,757 | A | 8/1985 | Tutle |
| 4,606,179 | A | 8/1986 | Peterson |
| 4,663,925 | A | 5/1987 | Terada |
| 4,718,223 | A | 1/1988 | Suzuki |
| 4,769,700 | A | 9/1988 | Pryor |
| 4,860,529 | A | 8/1989 | Peterson |
| 4,975,016 | A | 12/1990 | Pellenc |
| 4,976,094 | A | 12/1990 | Williamson |
| 5,005,347 | A | 4/1991 | Kedem |
| 5,280,697 | A | 1/1994 | Miller |
| 5,426,927 | A | 6/1995 | Wang |
| 5,471,827 | A | 12/1995 | Janssen |
| 5,816,037 | A | 10/1998 | Chiel |
| 5,946,896 | A | 9/1999 | Daniels |
| 6,250,056 | B1 | 6/2001 | Spagnolo |
| 6,442,920 | B1 | 9/2002 | Peterson |
| 6,553,299 | B1 | 4/2003 | Keller |
| 6,591,591 | B2 | 7/2003 | Coers |
| 6,671,582 | B1 | 12/2003 | Hanley |
| 7,204,072 | B2 | 4/2007 | Joy et al. |
| 7,418,985 | B2 | 9/2008 | Torgersen |
| 7,487,809 | B2 | 2/2009 | Uebergang |
| 7,500,343 | B2 | 3/2009 | Hsia |
| 7,540,137 | B2 | 6/2009 | Gray |
| 7,640,091 | B2 | 12/2009 | Berg |
| 7,765,780 | B2 | 8/2010 | Koselka |
| 7,810,305 | B2 | 10/2010 | Macidull |
| 8,381,501 | B2 | 2/2013 | Koselka et al. |
| 8,442,304 | B2 | 5/2013 | Marrion et al. |
| 9,226,446 | B2 * | 1/2016 | Moore .................. A01D 46/24 |
| 2005/0039431 | A1 | 2/2005 | Schloesser |
| 2005/0126144 | A1 | 6/2005 | Koselka |
| 2006/0026940 | A1 | 2/2006 | Carter |
| 2006/0150602 | A1 | 7/2006 | Stimmann |
| 2006/0213167 | A1 | 9/2006 | Koselka et al. |
| 2008/0010961 | A1 | 1/2008 | Gray |
| 2008/0264030 | A1 | 10/2008 | Bryan |
| 2008/0279460 | A1 | 11/2008 | Kasahara |
| 2010/0212279 | A1 | 8/2010 | Macidull |
| 2011/0022231 | A1 | 1/2011 | Walker |
| 2014/0283495 | A1 | 9/2014 | Christensen |
| 2016/0057940 | A1 * | 3/2016 | Lyons .................. A01D 46/30 |
| | | | 47/1.43 |

OTHER PUBLICATIONS

WO PCT/US2010/046678 Wtn Opn, dated Apr. 28, 2011, Moore.
Gorte, et al., "Structuring Laser-Scanned Trees Using 3D Mathematical Morphology", ResearchGate Conference Paper, Jan. 2004, 6 pgs.

* cited by examiner

METHODS FOR AUTOMATED PRUNING AND HARVESTING OF FRUIT PLANTS UTILIZING A GRAPHIC PROCESSOR UNIT

CROSS REFERENCE TO RELATED APPLICATION

This application claims benefit of U.S. Provisional Patent Application No. 62/533,596 filed on Jul. 17, 2017, and claims benefit of U.S. Provisional Patent Application No. 62/394,904 filed on Sep. 15, 2016.

TECHNICAL FIELD

This invention relates to methods for pruning fruit plants and methods for harvesting fruit.

BACKGROUND OF THE DISCLOSURE

There currently is no automated system, machine nor method that can prune fruit plants or harvest fruit and maintain the premium quality needed for the fresh market. Available pruning and harvesting systems remove limbs by general toping or straight side cutting of the tree, and remove fruit indirectly by shaking or knocking the fruit loose. New systems, machines and methods are needed.

While the subject matter of this application was motivated in addressing pruning and harvesting, it is in no way so limited. The disclosure is only limited by the accompanying claims as literally worded, without interpretative or other limiting reference to the specification, and in accordance with the doctrine of equivalents.

Other aspects and implementations are contemplated.

BRIEF DESCRIPTION OF THE DRAWINGS

Exemplary embodiments of the various disclosures are described below with reference to the following accompanying drawings. The drawings may be considered to represent scale.

FIG. 13A is a detail of the position of the robotic arm in reference to the orchard trellis.
FIG. 13B is a detail of the GPS antenna GPS #1 and #2 located as RP-1 and RP-2 on the reference Datum line of the Matrix and the Vertical Reference Plane.
FIG. 13C is a detail of the Matrix size and the locations with respect to the Prototype Robotic arm and GPS antenna.
FIG. 13D is a detail of the vertical plane through axis P1 of the robotic arm.
FIG. 13D also shows the two locations for P2, and the arcs for P3 and P4.

FIG. 13E is a detail of the horizontal plane through P1.
FIG. 13E also shows the two locations for P2, and the arcs for P3 and P4.
FIG. 13F is a detail of the horizontal plane through RP1.
FIG. 13G is a detail of the vertical plane through P1 and perpendicular to the Reference Vertical Plane, also shows P2, and the arcs for P3 and P4.

DETAILED DESCRIPTION OF THE EMBODIMENTS

Figure 1:
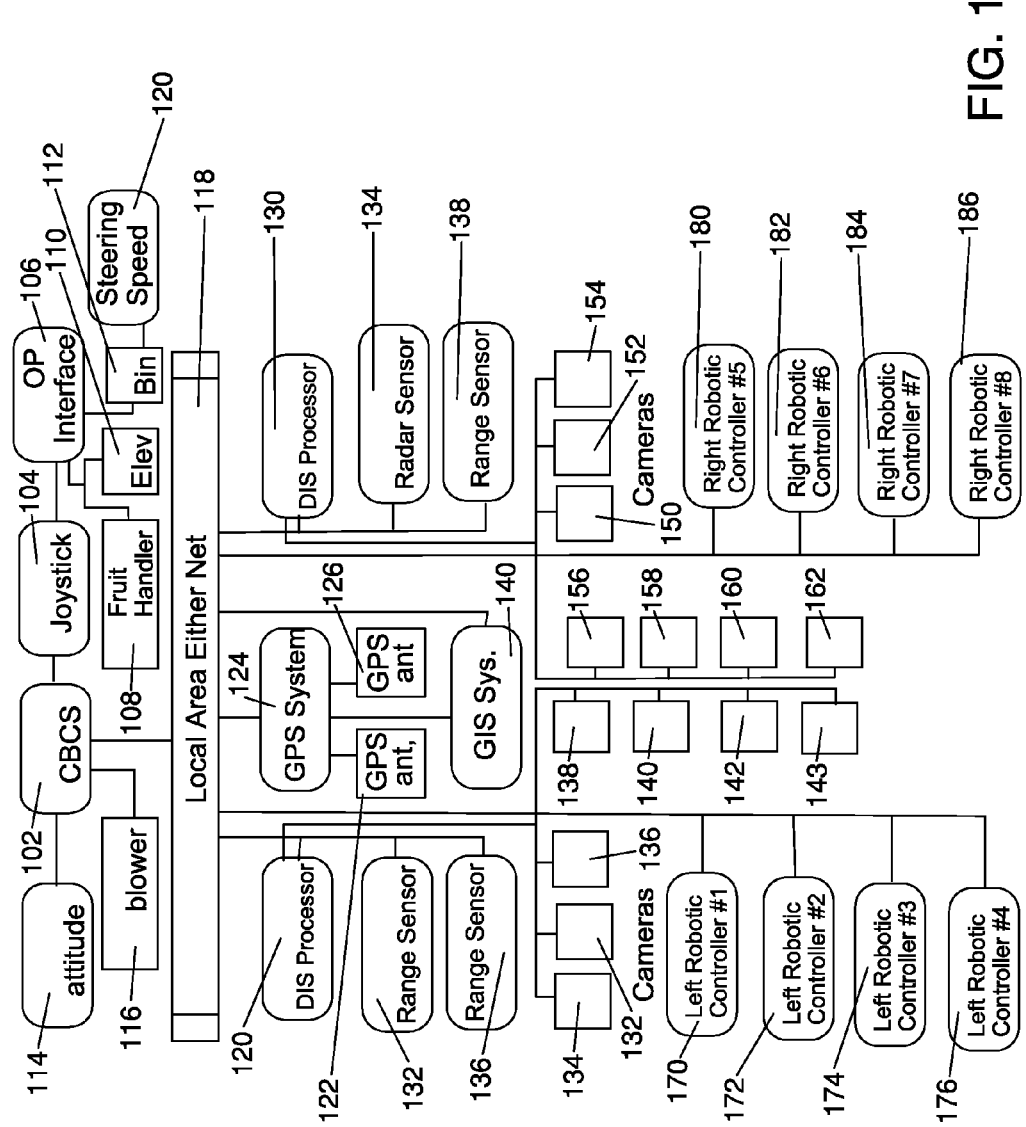
FIG. 1 is a block diagram of an exemplary robotic tree pruner and harvester machine according to an embodiment of the invention.

This disclosure is submitted in furtherance of the constitutional purposes of the U.S. Patent Laws "to promote the progress of science and useful arts" (Article 1, Section 8).

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

An exemplary purpose of the robotic control system is to control the robotic arms to prune the fruit trees and to control the robotic arms to harvest fruit. The inventive control system will allow for automatic operation that only requires set up and monitoring of two operations by an operator. This invention relies on automated control systems to select and target individual produce (for example, fruit) and limbs. The proposed control system uses a matrix to map items that come within the range of the harvester. For a Pruner (Pruning) Machine and a Harvester (Harvesting) Machine ("pruner" and "harvester," respectively, herein after for ease of discussion) to be economically viable, the machine needs to operate in an autonomous manner. It should be understood the pruner and harvester can be the same machine, or two different machines.

The inventive control system is more versatile than prior concepts of pruners and harvesters because for one exemplary embodiment, the robotic arms are not in fixed positions and the absolute location of the machine is always changing. This inventive exemplary control system will allow operation of the Pruner and Harvester in a completely autonomous mode (operator only monitoring the operation). In one embodiment, the control system is computer based system select the limbs for pruning, and locate and remove the fruit from the tree.

The proposed control system steers the machine and operates from one to N (in one embodiment, eight (8)) robotic arms to prune the tree. At harvest time, the control system will steer the machine and operates the robotic arms to locate and individually remove the fruit from the tree. In one embodiment, the control system receives inputs from at least one of the following components: cameras, robot range sensor, global position satellite (GPS) location, robotic control sensors and any combination of one or more components. Detailed information about each tree is stored in a global (sometime referenced as geographic or geographical) information system (GIS) database and uses the global position of the trunk of the tree as the primary field of reference.

The exemplary control system allows for the autonomous pruning and harvesting of fruits. This removes the need to have an individual person manually prune the trees, and, at harvest time, manually locate and remove the individual fruit from the tree. In an embodiment of the control system, compatible with embodiments presented previously, will include at least one of the following, and any combination of two or more of the following: a global positioning satellite (GPS) guidance system 16; a global information system (GIS) 40; a robot ranging system (RRS) (collectively, any various combination or references 52, 54, 56 and 58, and sometimes just referenced as 50), a digital imaging system (DIS) 18; a computer based control system (CBCS) 200 also referenced as CPU and a self-propelled vehicle (SPV) 3 with steering and speed controller 43.

This invention integrates the function and processes of the above components, systems and apparatuses shown in the figures and defines the design that will allow the Pruner and Harvester to operate as described. The operator interface FIG. 1, reference 42 allows for the operator to set a number of variable parameters based on the fruit type, tree row spacing, pruning parameters, and various operator overrides to allow the machine to be operated manually if needed, for example, for turning around at the end of the rows and transporting the machine from place to place.

Autonomous Operation Utilizing Automated Control System

Systems

The control system steers the machine and operates from one to N (eight robotic arms) that can accomplish tasks in an autonomous operation.

Control System

A block Diagram of the Robotic Control System 1141 (FIG. 2) shows the apparatus that make up the system.

Computer Processor Unit (CPU)

Figure 2:
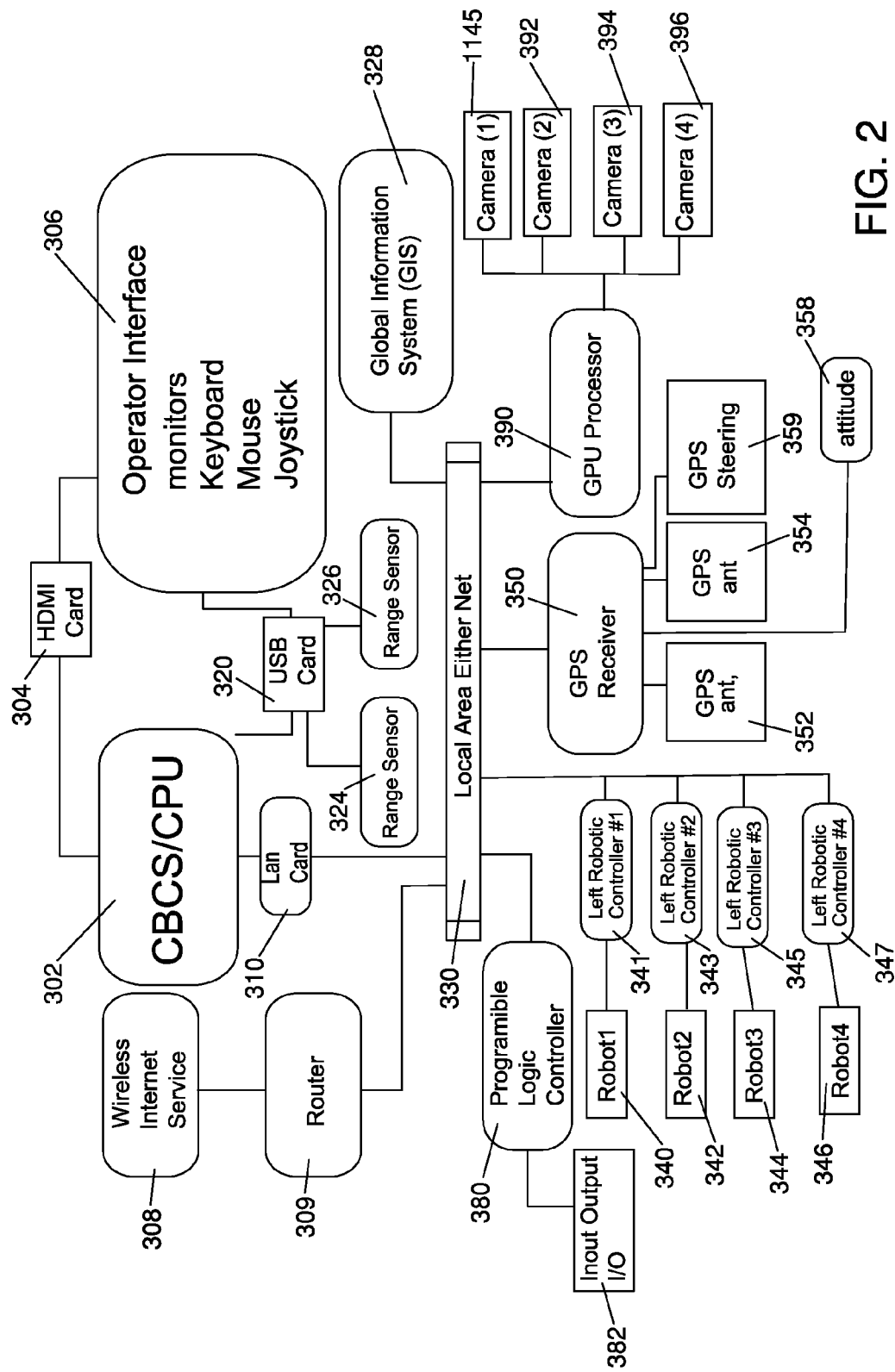
FIG. 2 is a block diagram of the robotic control system.

The Industrial computer FIG. 2, reference 302 will be mounted into a protective Cabinet. The cabinet will be air conditioned, have battery backup and regulated power. An operating system (Windows, UNIX) is installed on the CPU FIG. 2 reference 302. The main CPU will be a dual CPU processor unit as a minimum. The CPU will be purchased as industrial quality and the mother board will be installed in a chassis cabinet that will protect the electronic equipment from the elements. The CPU will have internet cards FIG. 2, reference 310, USB cards FIG. 2, reference 320 that will have ports for the operator interface components FIG. 2, reference 306. A Graphics Processor Unit (GPU) FIG. 2, reference 302, card will be installed. The cards will be installed on the mother board connectors. This GPU will connect to the operator interface monitors through a HDMI card FIG. 2 reference 304. The cards will be installed on the mother board connectors. This CPU FIG. 2, reference 302, provides for the integration and overall control of the process. The CPU will connect to the other systems via local area network FIG. 2 reference 330, and can connect through the router FIG. 2 reference 309, to the internet service and programs can be backed up to company servers, and programs can be down loaded that were generated by other machines. Upgrades to the control system can be updated though the internet connections.

The CBCS-CPU FIG. 2 reference 302, will connect through the Local Area Network FIG. 2 reference 330, to the Global Information System FIG. 2 reference 328. The GIS FIG. 2 reference 328, will provide for the data storage for the control system.

The CBCS-CPU FIG. 2 reference 302, will connect through the Local Area Network FIG. 2 reference 330, to the GPU Processor FIG. 2 reference 390. The GPU Processor FIG. 2 reference 390, will process the images from the cameras FIG. 2 reference 1145, 392, 394, 396.

Operator Interface

Figure 3:
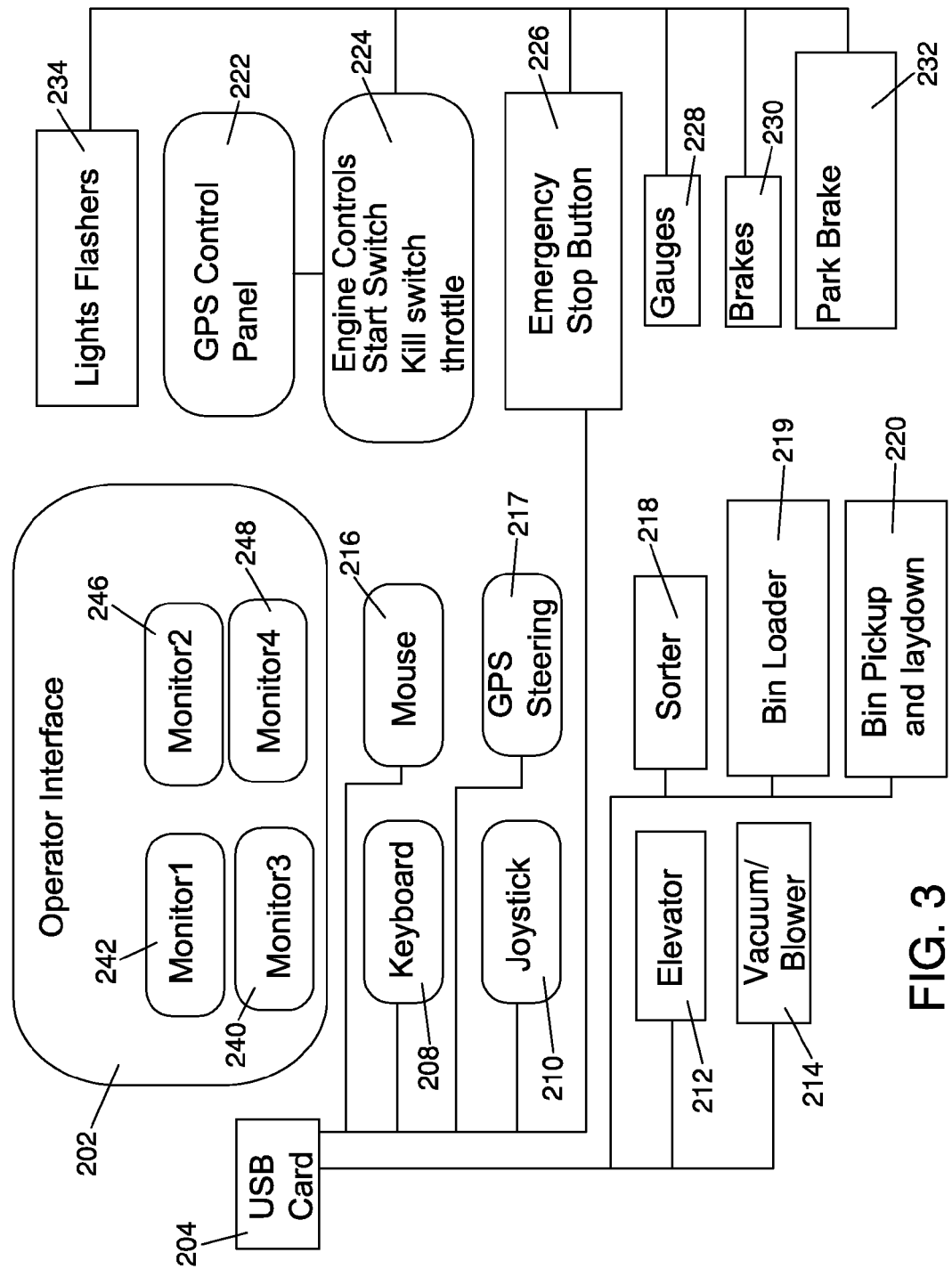
FIG. 3 is a block diagram of the operator interface.

In one exemplary embodiment, four touch screen monitors FIG. 2, reference 306 will be mounted in the operator cab along with Emergency Stop Button FIG. 3 reference 226, Keyboard FIG. 3 reference 208, Mouse FIG. 3 reference 216, Joy Stick FIG. 3 reference 210, hard wired interlocks. FIG. 3 is a block diagram of the apparatus of the Operator Interface FIG. 2, reference 306. The Operator will access the control system through the operator interface FIG. 3.

The monitors will be connecting through a DPI or HDMI connector, the Keyboard FIG. 3 reference 208, mouse FIG. 3 reference 216, and Joystick FIG. 3 reference 210 will connect through the USB ports FIG. 3 reference 204. The GPS steering FIG. 3 reference 217, will connect through the USB FIG. 3 reference 204, to the GPS Controller. The GPS will have a separate GPS Control Panel FIG. 3 reference 222, in the cab. An engine control panel FIG. 3 reference 224, will be provided with the machine. An Emergency Stop FIG. 3 reference 226 Switch will stop all apparatus in Place. A brake Control FIG. 3 reference 230, park brake switch FIG. 3 reference 232, is included. Controls for the Flasher lights FIG. 3 reference 234 used during transport is also included Other controls include gauges FIG. 3 reference 228, elevator controls FIG. 3 reference 212, Vacuum blower FIG. 3 reference 214, sorter FIG. 3 reference 218, bin loader FIG. 3 reference 219, bin pickup and laydown FIG. 3 reference 220, and others as needed.

GPS Receiver

The CBCS-CPU FIG. 2, reference 302, is connected to the GPS Receiver FIG. 2, reference 350, via the Local Area Network FIG. 2, reference 330. The GPS Receiver FIG. 2, reference 350, will continuously provide the location of the machine to the CBCS control system FIG. 2, reference 1141. An attitude instrument FIG. 2, reference 358 is connected to, or provided a part of the GPS System FIG. 2, reference 350.

Production Rates

For the above fruit harvesting to be economical feasible, the rate of harvesting fruit from the tree while maintaining the quality of the fruit for the fresh market needs to be faster than hand harvesting. The following rates are feasible for this fruit harvester and are competitive with the current harvesting costs for the medium to large orchards. This could also so be practical for custom harvester businesses. The following harvesting rates are exemplary and non-limiting, that is, other harvesting rates are contemplated.

Harvesting Rates

Training Production Rates 6000 apples per hour training speed for six arm machine.
        3 bins per hour (100 count apples 2000 apples per bin.
        24 bins per 8 hour day.
    1000 apples per hour per arm
        16.66 apples per minute; 3.6 seconds per apple per arm.
    Rate of apples entering handling system is 1.6 apples per second for six arm system
        Assuming 4.5 inch spacing of apples the speed is 7.5 inches per second or 450 inches per minute.
        37.5 feet per minute.
        Total travel distance for each fruit is approximately 30 feet.
    Ground travel rate of machine
        Tree row with 12 to 16 feet spacing.
        Tree spacing high density to 16 feet.
        Travel speed 8 ft/min to 88 ft/min.

Production Rates 24,000 apples per hour speed for six arm machine
        12 bins per hour (100 count apples 2000 apples per bin.
        96 bins per 8 hour day (Machine can run 12-18 hours per day).
    4000 apples per hour arm
        66.66 apples per minute.
        0.9 seconds per apple per arm.
    Rate of apples entering handling system is 5.4 apples per second for six arm system
        Assuming 4.5 inch spacing of apples the speed is 24.3 inches per second or 1456 inches per minute.
        121.5 feet per minute.
        Total travel distance 30 feet.
    Ground travel rate of machine
        Tree row with 12 to 16 feet spacing.
        Tree spacing high density to 16 feet.
        Travel speed 8 ft/min to 88 ft/min.

Set Up for Automated Operation

Systems

Automated Operation requires that the processes have to be defined and coding generated to allow the process to be automated. It is required to clearly describe the processes for each tree to automate the process. Following is the Set Up process for:

A. Pruning;
    B. Pick Path Generation
    C. Fruit Harvesting

The Set-Up process is described in the following paragraphs: The previous paragraphs describe the general systems and the interfaces between the systems. The systems will operate as an interactive process and will operate in parallel. The trees being processed is determined by the matrix of the machine and which trees are available to be processed, which depends on tree spacing and can be from one to four or five trees at the same time on each side of the machine.

The set up of the various systems is also described for the machine to have the information it needs to do the operational steps.

Set Up Global Information System (GIS)

Figure 4:
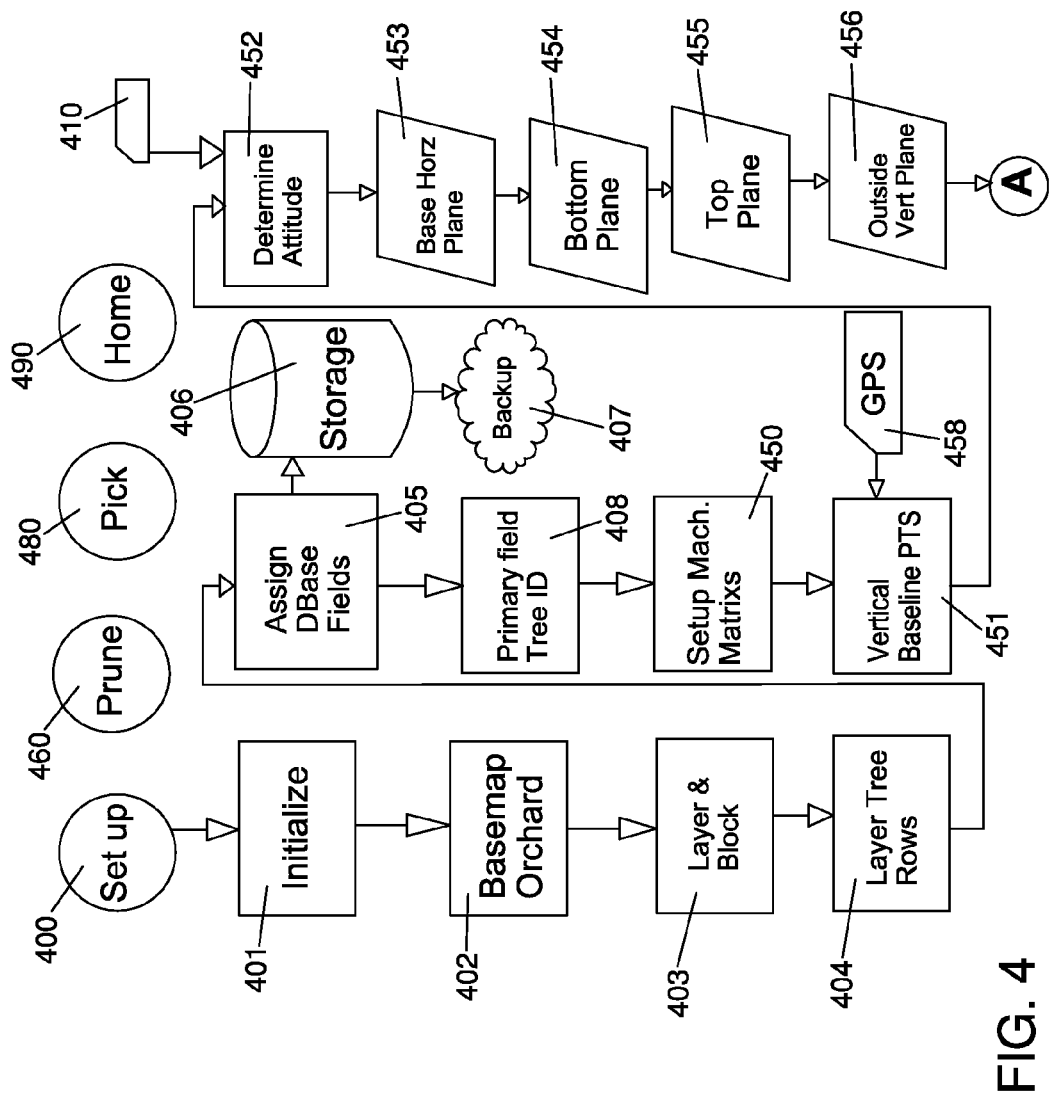
FIG. 4 is a flow diagram for GIS system.
Figure 5:
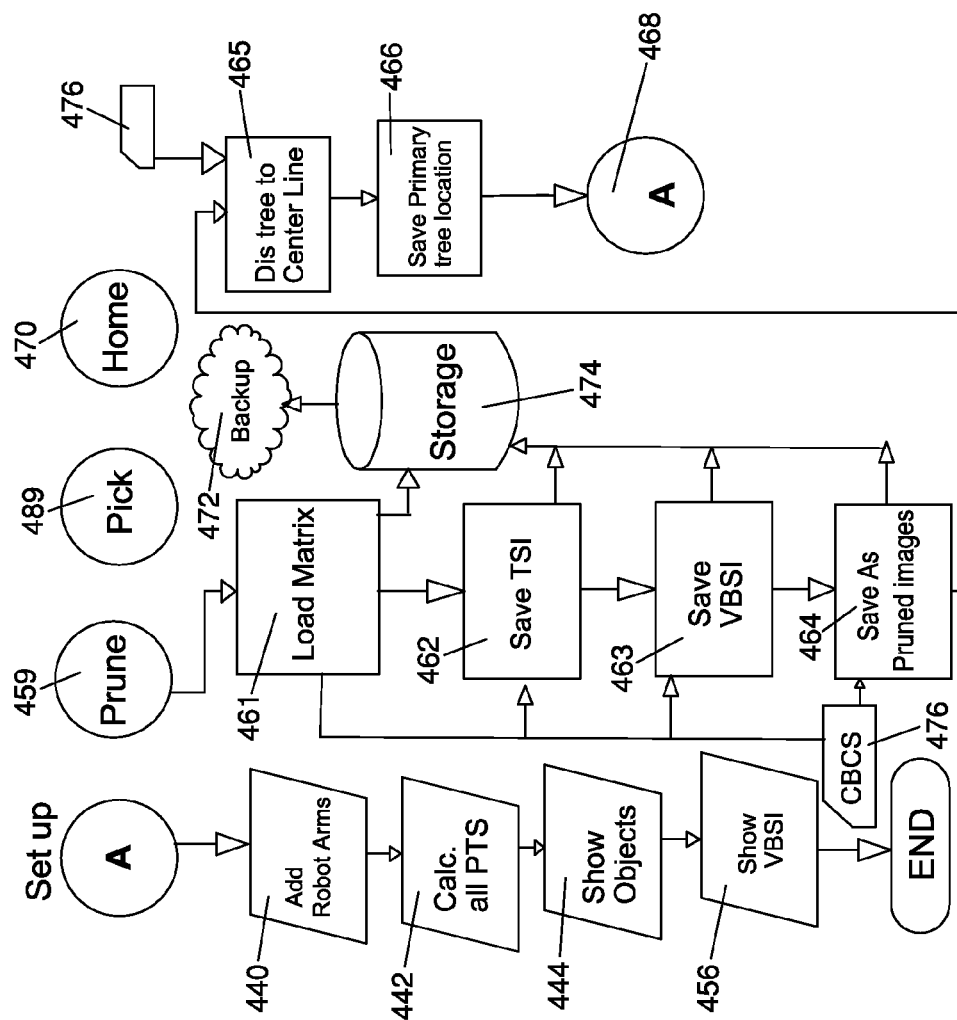
FIG. 5 is a flow diagram for GIS system.

Global Information System (GIS) set up is disclosed in FIGS. 4, 5. Store elements in the database to be utilized for various process.

a) Relational database: Commercial data base or Global Information Data Base Items input into the data base:
select an area of an orchard to be pruned.
go to google map or other global mapping system and get GPS coordinates by selecting the corners of area selected.
gives three coordinates, longitude, latitude, and elevation for each corner.
google map also provides acreage of the selected area.
save by manual or exporting the four data points to the database.
counts rows either from actually being in the selected area or from google map.
generate GPS locations of the ends of each row (maybe called bookmarking the ends of the row); alternative way takes GPS receiver (for example, cell phone) to each end of rows and record the GPS location and for both ends and save to database.

Matrix create a matrix in database which is defined as a three-dimensional set of data points for a three-dimension space, and the three-dimension space as we will define it is distance from centerline of SPV 3 to centerline of row, and a height distance of tallest plant.

distinguish the data points of the three-dimension space that include SPV 3 (red data points) versus the data points that do not include the SPV 3 (blue data points).

build a first subset of the blue data points that represent the three-dimensional space that can be occupied by the robotic arms.

build a subset of the first subset which represents the space of the first subset that the robotic arm can operate.

Run GIS program which results in determining distance from centerline of SPV 3 (at a perpendicular angle) to all data points of the matrix.

Set-Up for CBCS

CBCS FIG. 1. 102 is a Block Diagram of the CBSC 102

CBCS 102 is Set Up for Processes as Described Below

The CBCS 102 is a computer based digital system (CBCS also called CPU). The systems are all connected by a main buss that networks the systems together. Ether net FIG. 1, reference 118, and/or universal serial bus will be used to connect the Systems together. The Industrial computer FIG. 1, reference 102, will be mounted into a protective Cabinet. The cabinet will be air conditioned, have battery backup and regulated power. Power will be provided by a generator on the SPV. Four touch screen monitors will be mounted in the operator cab Along with Emergency Stop Button, Keyboard, Mouse, Joy Stick, hard wired interlocks. Also, engine controls, brakes, park brakes are mounted and provided as part of the SPV. Additional switches and controls will be installed on a panel in the operator cab for turning on and off the vacuum blower, turning on and off the bin loader, turning on and off the fruit handling system and fruit elevator, and turning on an of the power to the end effector. The CBCS FIG. 1, reference 102, provides the integration function of interfacing the other systems. An operating system (Windows, UNIX) is installed on the CBCS. When the CBCS FIG. 1, reference 102, is turned on, the Operating system is booted and a computer program is loaded and runs a program that generates the screens for the control monitors. A number of operator interfaces are created to allow an operator with minimal training to operate the Pruner/harvester.

The Main operator screen will allow the operator to select a number of modes of operation. These will include but not limited to Manual Mode, Prune Mode, Pick Path Generation Mode, Pick Mode, Home Mode. The mode selected will load the specified programs and the desired Operator interface screens for the Mode selected. The operator will select the Manual Mode if the CBCS is not already in the Manual Mode. This will load the operator interface screens required for manual operations, enable the controls required for manual operations, including the joystick, the RRS, DIS, GPS, Robotic Controllers. The Operator will release the brakes and operate the SPV 3 to drive to the desired location in the orchard. The operator will determine the starting row to start a process. The operator will align the SPV 3 beside the row or between the two rows that are to be pruned. Once the machine is aligned and initialized the operator then checks that all interlocks are good and selects the mode for the auto-pruning operation. This completes the setup steps for the CBCS.

Set Up Steps for GPS

Figure 14:
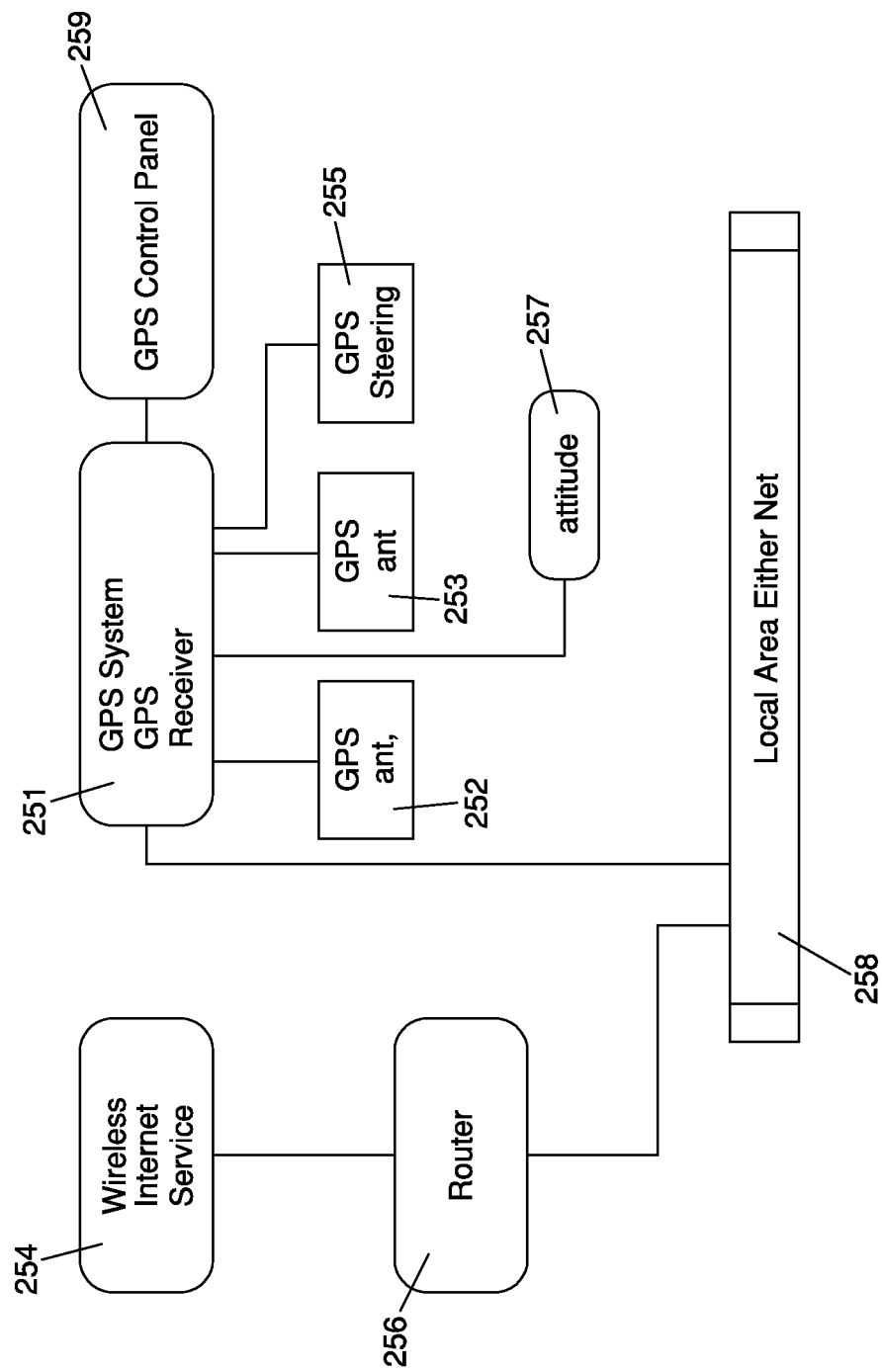
FIG. 14 is a block diagram of the global position satellite (GPS) system.
Figure 15:
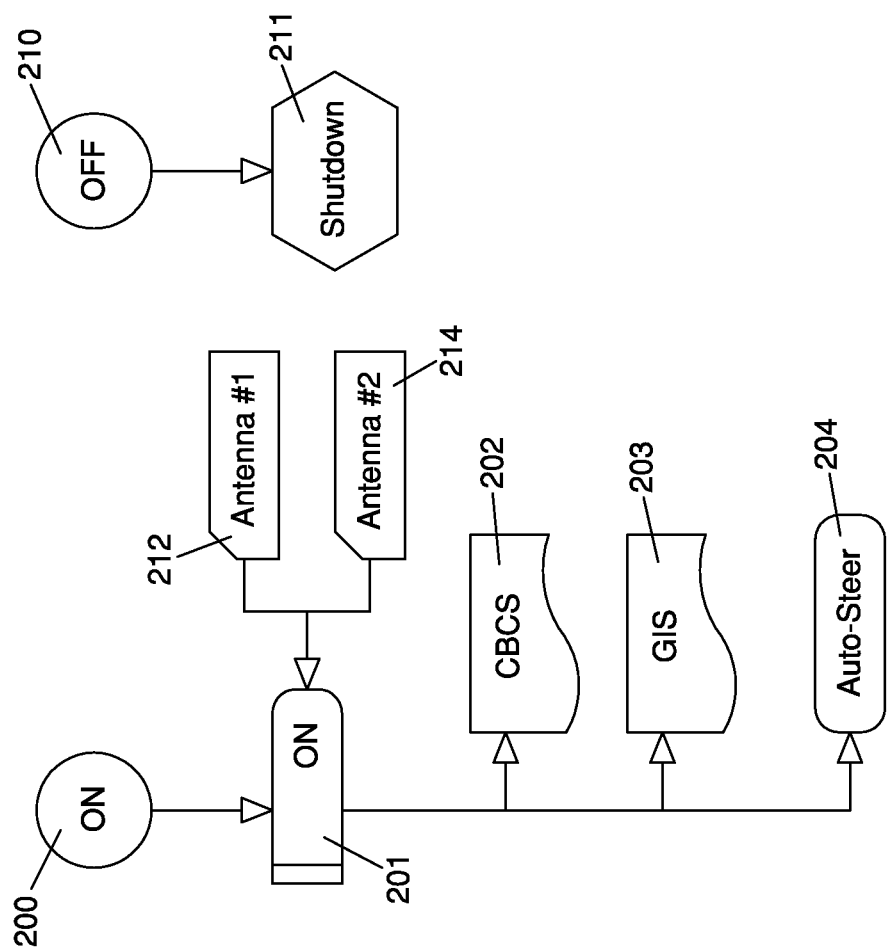
FIG. 15 is a flow diagram for the GPS system.

See FIGS. 14 and 15: GPS Block Diagram and FIG. 1, Reference 124 FIGS. 6 and 7; GPS Flow Diagram A commercial GPS auto steering system FIG. 1, reference 124, like the Trimble® Autopilot™ automated steering system provides integrated, high-accuracy steering in any field type—hands free. The Autopilot system automatically steers your vehicle on line for maximum precision. The Autopilot™ operate at higher efficiency by using the Autopilot system, and stay on line, all the time. When your vehicle is offline, the Autopilot system signals it to adjust its position to follow the correct path—no matter the field pattern or terrain type—so you can focus on the job ahead of you. Autopilot system integrates directly into your vehicle's hydraulics, allowing you to obtain clear access to cab controls. It also plugs into many guidance-ready vehicles, minimizing the need for additional equipment. The GPS System consists of two GPS antenna FIG. 14, reference 252 & 253, GPS Steering FIG. 14, reference 255, a GPS control Panel FIG. 14, reference 259, an attitude instrument FIG. 14, reference 257. This or equivalent automated steering equipment is installed during assembly of the SPV 3 and interfaced to the CBCS FIG. 1, reference 102, to provide Global position of the one or two antennas on a continuous basis. The setup is based on instructions from the manufacture of the automated steering system. The GPS communicates with other systems through the Local Area Network FIG. 14, reference 258. Connection to GPS Services FIG. 14, reference 254 is through a Router FIG. 14, reference 256. The GPS System will be turned on either by the operator or by the CBCS when the SPV is started.

Setup for the Robot Ranging System (RRS)

Disclosed in FIG. 8 RRS Flow Diagram Setup is Described Below

Figure 28:
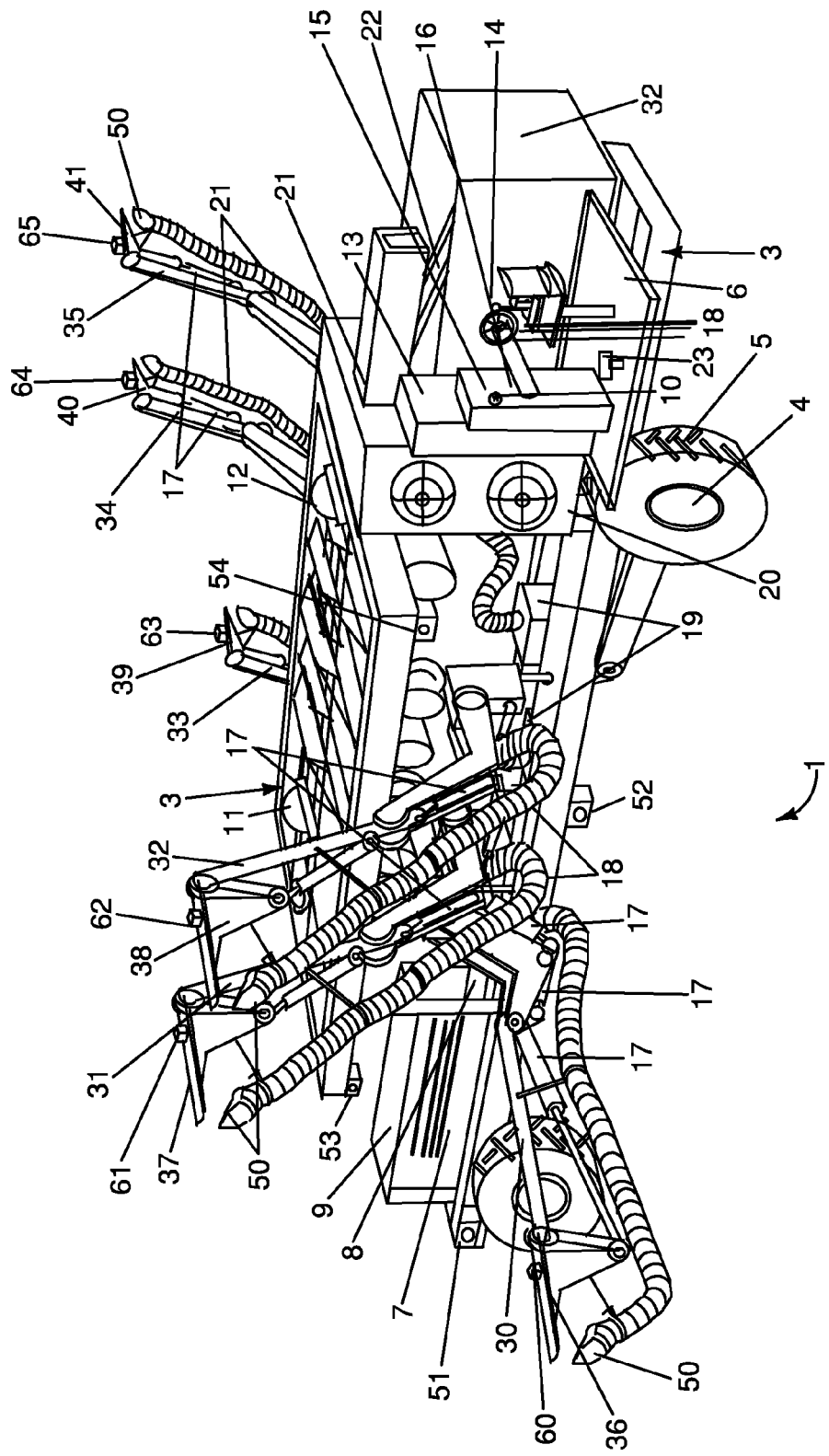
FIG. 28 is a perspective view of the pruner and harvester configured for harvesting.

Two Robot Range Sensors FIG. 1, reference 132, 134 are mounted low FIG. 28, reference 51, 52, on the SPV FIG. 28, reference 3, and toward the front end of the SPV. The sensor needs to measure distance in a range of 2 feet to 6 feet. The accuracy needs to be + or −½ inch. The distance to the tree target is determined. The sensor utilizes either laser or ultra-sonics to provide the distance from the sensor to the tree trunk target. This information is provided to the CBCS. This distance is used to calculate the location of the tree trunk using the known location of the sensor from the Matrix reference point. The CBCS can determine the location of the tree in Latitude, and Longitude location and place the trunk target in the Matrix. The unit of measurement of arc seconds for Latitude is uniform regardless of the distance the machine is located from the equator. This makes the conversion of linear measurements of feet. inches, meters, centimeter a uniform constant number. The unit of measurement of arc seconds for Longitude is not uniform and is longest at the equator and decreases as the Latitude gets to be a more positive or more negative number depending the direction the machine is from the equator. The conversions variables are provided by the CBCS or GIS FIG. 8, reference 606 & 608. This makes the conversion of linear measurements of feet, inches, meters or centimeters a variable based on Latitude.

Setup Steps for the Robotic Controller

Figure 9:
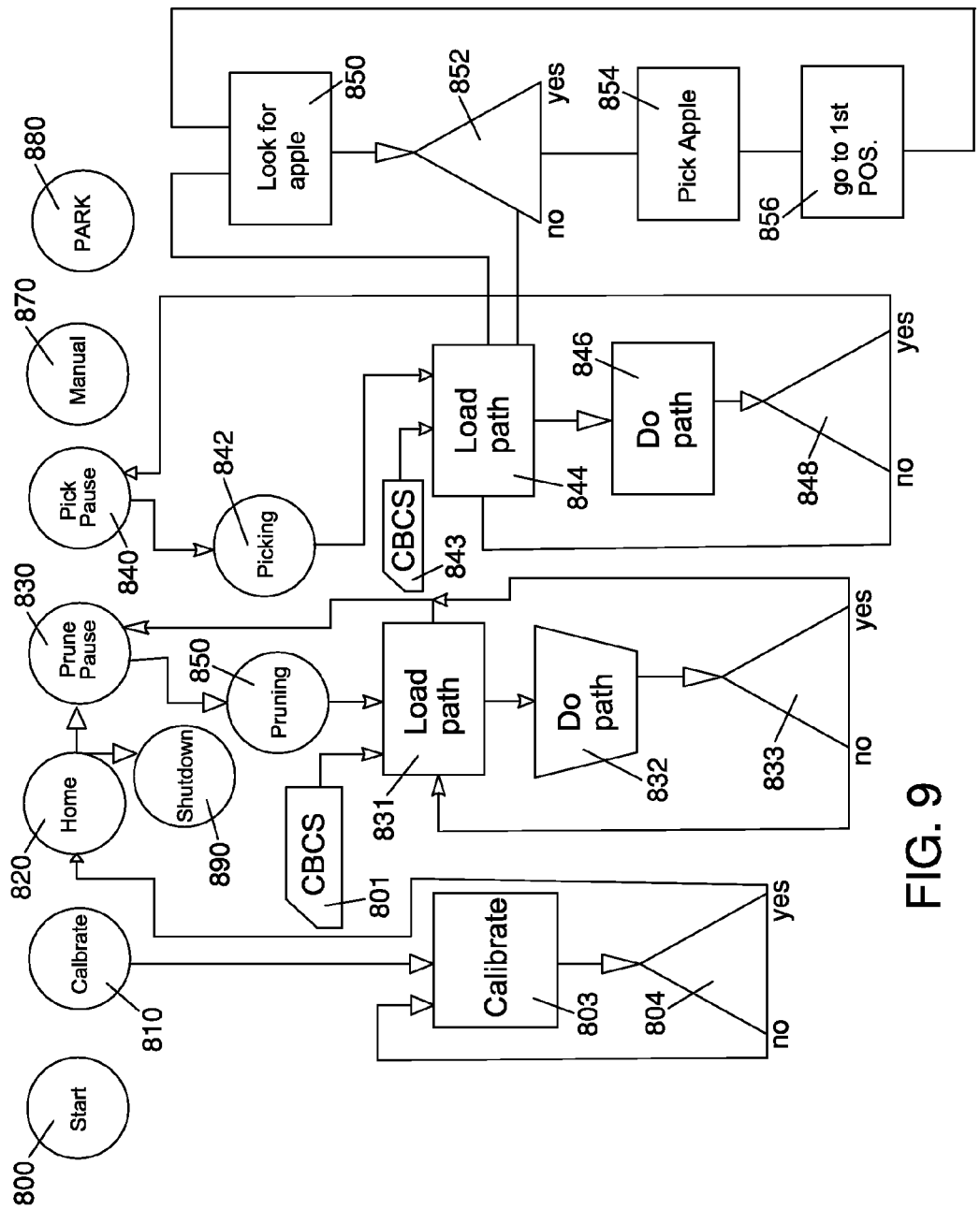
FIG. 9 is a flow diagram for robotic controllers.
Figure 10:
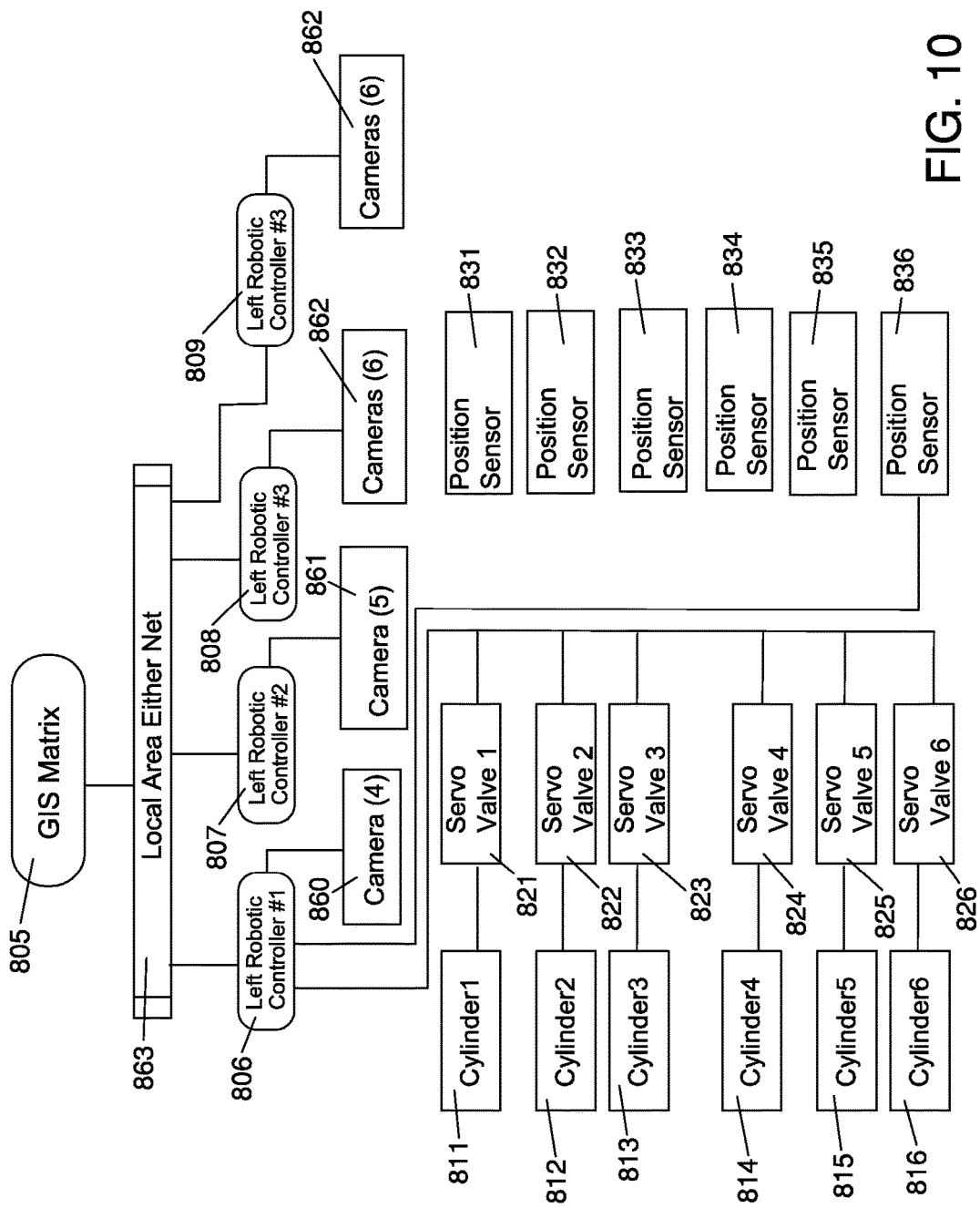
FIG. 10 is a block diagram of the robotic controllers.

Disclosed in FIG. 9 Robotic Controller Flow Diagram Setup is Described Below FIG. 10 is a Block diagram for the Robotic Controller. The Robotic Controllers FIG. 10, reference 806-809, communicates with the GIS Matrix FIG. 10, reference 805, to get all positions in GPS position format. The positions are converted to linear movements to provide to each link of the robotic arm. All the controllers for the robotic arm are the same so only one controller is described in the Block diagram. Four Robotic controllers are shown in FIG. 10, reference 806, 807, 808, & 809 which would make up one side of an 8-arm machine. The apparatus is shown for only Robotic Controller #1 FIG. 10, reference 806, It has controls for six servo valves FIG. 10, reference 821-826, that operate up to six hydraulic cylinders FIG. 10, reference 811-816. The Robotic Controller #1 FIG. 10, reference 806, receives input from position sensors FIG. 10, reference 831-836, that indicates the position of each cylinder. There is a close-up camera FIG. 10, reference 860-864, on each end effector to guide the arm to prune the tree.

The Robotic arm consists of a series of links that are made up of light rigid material such as aluminum, or strong plastics. The pivot points will be steel shafts and steel or aluminum sleeves with lubricated brass busing or roller bearings. The actuators will be hydraulic cylinders that are proven in the Agricultural industry. The cylinders will have position sensing associated an integrated with the cylinders. The maximum reach of the robotic arm can be either five feet or six feet standard reach, with special length end effectors as necessary. Standardized connectors will be used to connect the end effector to the end of the robotic arm. Each cylinder will be positioned by an electrohydraulic servo valve. The servo valve is positioned by inputs from the robotic arm controller. The hydraulic cylinders will be Intellinder Position Sensor Hydraulic Cylinders by Parker@ or equivalent product. The travel of the cylinders will be the travel of each pivot by design.

Figure 26:
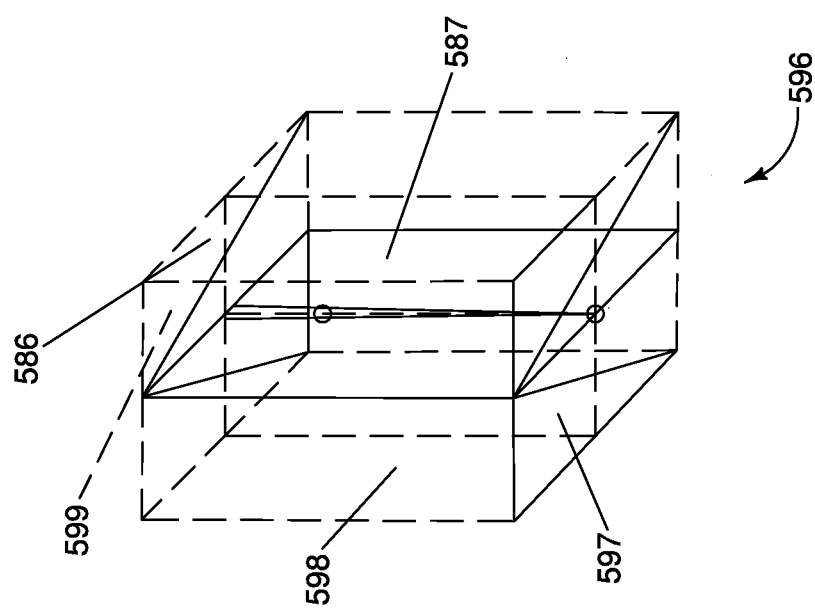
FIG. 26 is the view of the Machine Matrix.

The robotic arms FIG. 2, reference 340, 342, 343, & 344, are programmed links that provide for the instant location of the robot arms in the Matrix FIG. 26, reference 587.

All points of the matrix FIG. 5, reference 442, will include the absolute GPS location calculated from the GPS FIG. 1, reference 124 and attitude data FIG. 2, reference 114.

Also any object located at this GPS point will be indicated as the SPV 3 moves down the tree row FIG. 5, reference 444.

The Vector Based Image of the tree is also located at the GPS locations FIG. 5, reference 456. The GIS setup FIG. 4, reference 400 is only required once for an orchard and then can be used year to year.

Additions, deletions and revisions can be added each year.

Robotic Control system FIG. 2, reference 341-347, will control a robot arm with 3 horizontal pivots and one vertical Pivot point and including the end effector will have 4 to 5 degrees of freedom.

The Controller will consist of single board computers, PLC, or a commercial robotic controller that will control electrohydraulic servo valve (EHSV) or proportional valves as needed. The valves will control flow to hydraulic cylinders that will control the movement of each arm section around the pivot point.

A feedback loop is provided by linear position sensors provided as part of the cylinders.

The hydraulic cylinders will be commercial equipment and will be Intellinder Position Sensor Hydraulic Cylinders by Parker@ or an equivalent product.

Control 4 pivot axis

The control valves will be Danfoss PVE (proportional valve electronics) electrohydraulic actuators with Independent Metering or equivalent product.

Programs

The Robotic Controller will be a Programable Logic Controller.

The Robot arm controller FIG. 9, will run with these algorithms loaded as a minimum. There will be a Shutdown program FIG. 9, reference 890, a Startup program FIG. 9, reference 820, a Calibrate program FIG. 9, reference 810, that will be standard for the robot arms. It will have a Manual Program FIG. 9, reference 870, a Pick Path Program FIG. 9, reference 860, and a Pick Program FIG. 9, references 842-856.

The Shutdown Program FIG. 9, reference 880 will position the robot for transport, and proceed through a safe shutdown sequence including setting safe locks.

The Startup Program FIG. 9, reference 800, will start a warning alarm, check interlocks, and release locks and pressurizes the hydraulic system. And move each pivot approximately 1-2 inches and back to show operability.

The Home program FIG. 9, reference 820 will move the robotic arms to the home position for the robotic arms.

The Park Program FIG. 9, reference 880, will move the robotic arm to a position to allow the machine to be turned around at the end of row or in preparation for shutdown.

The Calibration Program FIG. 9, reference 810 sequences the robotic arms about the home position to allow for adjustments in the calibration of the sensors.

The Manual Program FIG. 9, reference 870, will allow the robotic arms to be manually controlled through the Joy stick to the Danfoss PVE electrohydraulic actuators with Independent Metering or equivalent product.

A Prune Program, FIG. 9, reference 850 loads a prune path based on the Rule Based program that calculated the pruning profiles and then programs the Path the robot arm will take to prune the limbs, and branches.

The programs will be sub programs for the different types of trellis'. The sub programs include but not limited to the following details:

Outer Profile
  Variables will be included for trellis,
  height,
  Angle,
  row spacing.
Fruit Zone Profile
  Number of Zones,
  Shape of fruit Zone,
  Height,
  Width.
Bottom Profile
  Height above ground,
  Weight.

This will be a set of subprograms that provide the path of the Robotic Arm to cut the desired profile for the profile selected by the operator. There will be a sub-program for the outer profile of the tree, a sub program for pruning the boundaries of the fruit zone, and a sub-program that will selectively prune within the fruit zone.

The Pick Program 1153, 1155 FIG. 9, consists of two sub-programs: a) Pick Path Program 1155; and b) Pick Apple Program 1153 (also termed Pick Fruit Program). The Pick Program 1153, 1155 loads the previously generated program stored in the GIS and determines the movements for each hydraulic cylinder and positions of the linear sensors for each effector GPS location provided by the Pick Path Program FIG. 9, 1155. At the interrupts, the program is turned over to the Pick Fruit Program FIG. 9, 1153. When the Pick Fruit Program FIG. 9, 1153 completes its sequence, the arm is returned to the interrupt position and control is turned back to the Pick Path Program 1155.

The pick-path for the robot arm will be a series of locations that each axis of the robot arm is to be at to maintain the end effectors at its Global Position location as it moves from point to point along the pick path. This will be handled by the robot controller with positional feedback on each axis of the robotic arm. Each Robot controller will start the pick path when the VBSI positions are in the bounds of the GPS locations in the matrix.

When Interrupt is encountered in the Pick Path Program FIG. 9, 1155, then the operation is turned over to the Pick Fruit Program FIG. 9, reference 1153.

When a robotic arm has finished with the current tree, the CBCS FIG. 1, reference 102, will check 848 to see if this is the last tree in the row, and if no, will return and load the paths for the next tree in the row.

Figure 8:
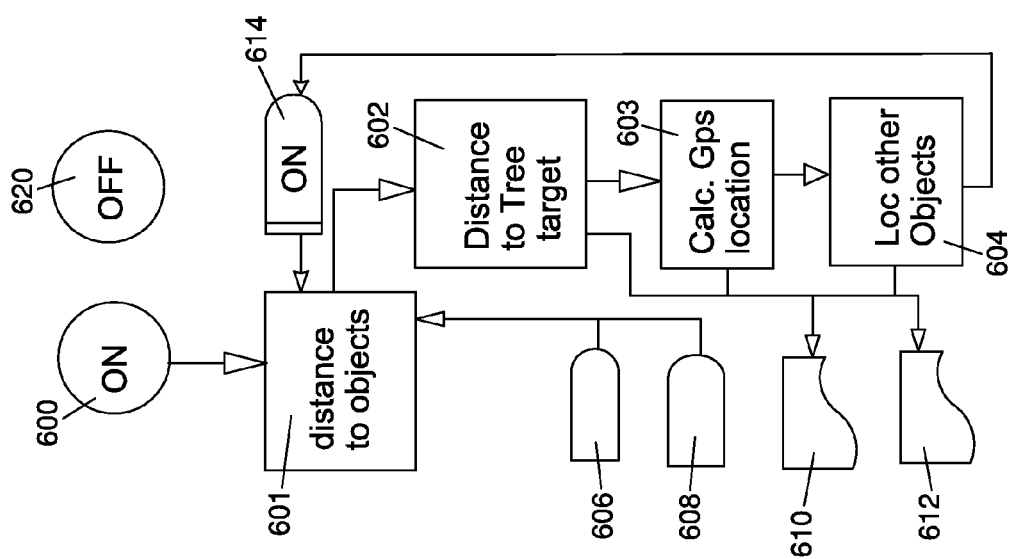
FIG. 8 is a flow diagram for RRS system.

If the tree is the last tree in the row, then if is yes, the robotic arm is sent a pick pause FIG. 8, reference 830, signal as each arm completes its current assigned pick paths.

When the last Pick path is completed the machine stops and returns the mode to manual FIG. 8, reference 870.

The Pick Program FIG. 9, 1153, 1155 receives control from the Pick Path Program 1155. The Path Program 1153, 1155 requests the DIS to find apples and the close up-camera obtains images FIG. 9, reference 850. The program looks for the proper color and if detected then it knows there is an Apple in view. It Puts a circle around the area of proper color and determines the center FIG. 9, reference 852. It sends movements to the robot controller to center the circle in the cameras view and moves from the interrupt location and moves toward the apple based on small adjustments from the DIS close-up camera until the fruit drops FIG. 9, reference 854. The effector is then returned to the interrupt position FIG. 9, reference 856, checks for another apple. If an apple is detected it is also picked. When no apple is visible then the control is returned to the Pick Path Program 1155. The program may have options selected to no pick if size is small, or if color is not correct.

The operator will be asked to assess the order the pick paths are assigned to the robotic arms, and will have an opportunity to re-assign a pick path to the Left Robotic Controller #1, Left Robotic Controller #2, Left Robotic Controller #3, or for the other side of the SPV for the Right Robotic Controller #4, Right Robotic Controller #5, or Right Robotic Controller #6, as appropriate.

Set Up for GIS

The GIS FIG. 1, reference 140 provides a method to store all the data based on geospatial location. The GIS FIG. 1, reference 140 provides for a database file that contains all the data collected and stored under a file Name for an orchard FIG. 4, reference 402. FIGS. 4, 5, 6 & 7 are the flow diagram for GIS System FIG. 1, reference 140. The GIS FIG. 1, reference 140 requires an initial setup FIG. 4, reference 400 prior to putting the machine into the orchard FIG. 5, reference 440. The database fields are setup for all the fields of images and data that can be collected for the orchard FIG. 4, reference 406. The orchard is shown on a base map that provides an image and area of the orchard FIG. 4, reference 402.

The blocks of trees of the same fruit variety is added as a layer and mapped FIG. 4, reference 403. The data fields are added to record all the data for each side of the trees to be pruned FIG. 4, reference 405. Finally, the tree rows are added as a layer and mapped FIG. 4, reference 404. GIS Setup is continued in FIG. 5 A. This data is entered by the operator at the orchard. It can be loaded from the data already stored in GIS FIG. 1, reference 140.

Enter Knowledge Based Engineering Data for Orchard being Pruned

Provide data and rules for the layout of the orchard:
V trellis
Row spacing (Range 8 ft to 15 ft)
  actual spacing is selected
  Trellis height (Range 6 to 15 ft)
  actual height is selected
Trellis angle
  Angle is determined by triangulation of 2 width and height
Wire spacing (12 in to 36 inches)
  Wire Spacing is selected
Wire size
  Select from pull down list of gauges or diameters
Wire material
  Aluminum, steel, SS steel, other
Trellis pole spacing
  Trellis pole types
  diameter shape
Trellis Pole Material
  Wood, steel, plastic
Straight trellis
  Row Spacing
  Trellis height
  Wire Spacing
  Trellis pole spacing
  Trellis pole types
  Trellis pole Material
Fruit type
  Apple
  Pear,
  Cherry
  Peach
Fruit variety
  Apple Varity
    Granny smith
    Fuji
    Gala
Provide data and rules for picking each fruit variety
  Blossom set location
    Limb tip
    Spur
    Both limb tip & spur
  Other data apples, pears, cherries
  Provide data of number of apples per fruit location
    Granny Smith; 1 to 4 flowers/bud
    Fuji; 1 to 3 flowers/bud
    Gala; 4 to 6 flowers/bud
  Other data
    Data of fruit bud images for image recognition algorithm
      Grammy Smith apples
      Fuji apples
      Gala apples
    Provide data and rules for apple zones
    Provide data and rules for outer profile of tree for trellis type, fruit variety,
      Fruit Zones
      Cylindrical
      Square
      Rectangular
      Trapezoid
      Cylinder
      Free style
  Provide fruit handling properties
    Skin thickness and toughness
    Puncher resistance
    Bruising pressures
    Stem properties
      Length
      Diameter
      Toughness This data is generally only required once at the first time the orchard block is pruned. All this information is stored in the database fields on the hard drive of the GIS.

Set Up for DIS

Figure 12:
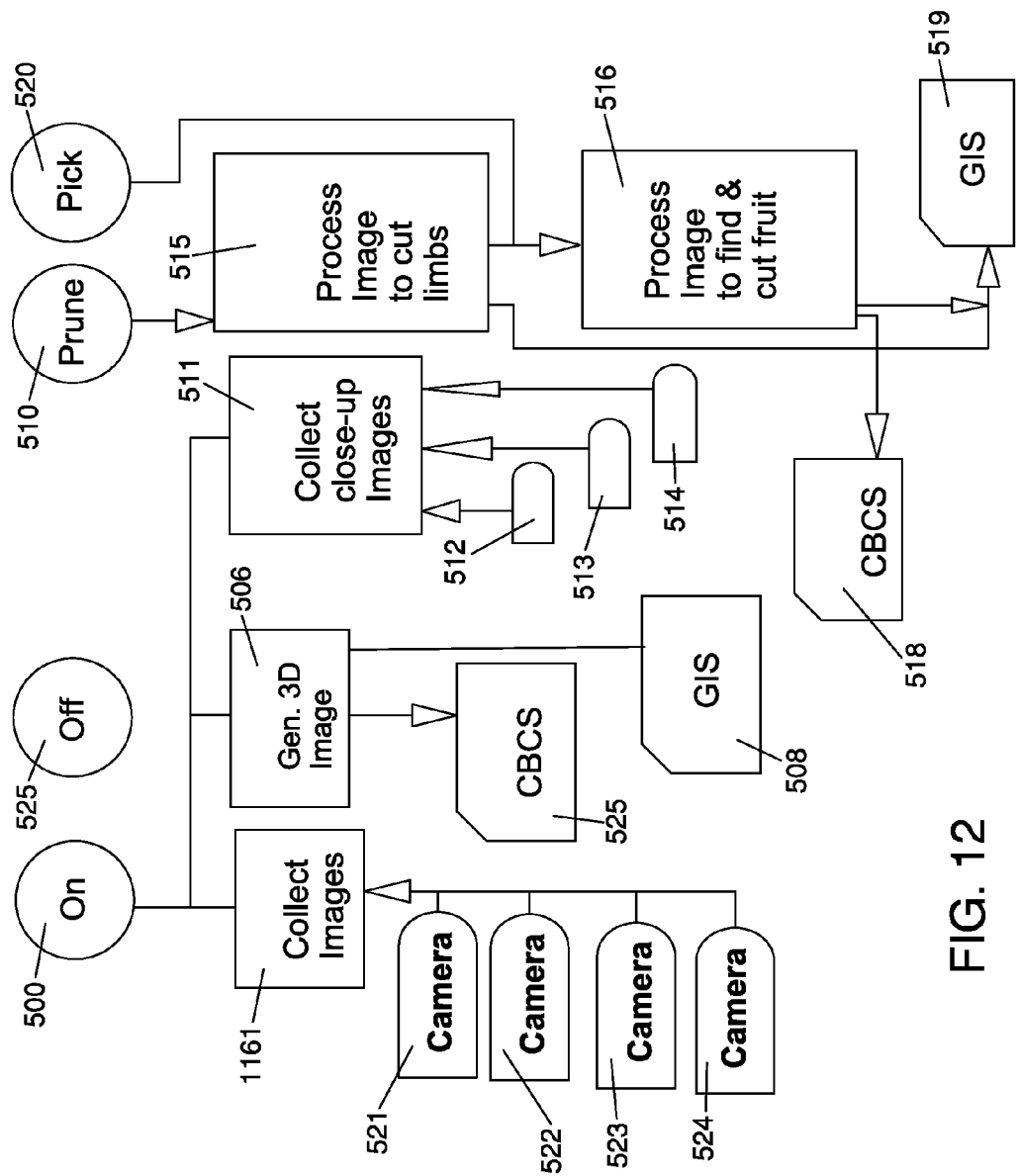
FIG. 12 is a flow diagram for DIS system.

FIG. 12 DIS Flow Diagram

Install required number of commercial digital cameras with proper lenses on the mounting points provided on the SPV FIG. 1, reference 3. Connect the Power cables to the SPV Power Supply. Install the Graphics Processor Unit (GPU) into the protective cabinet on the SPV 3. Connect the video cables to the image processor inputs. Connect the output cable to the CBCS and GIS via the Either net. Connect the image processor to Power.

The DIS will have the imaging processing programs installed into the GPU which will be an embedded System with CBCS as it Host. This is accomplished at installation of the DIS 120, 130 (FIG. 1) equipment. The DIS 120, 130 (FIG. 1) will be capable of recording video, still photos or frame grabs from video. The image will have a recorded date & time and location from the GPS 521 (FIG. 12) Cameras 522-524 input images in the DIS processor 1161. Images will be collected based on inputs from the CBCS host FIG. 17 reference 1016.

Figure 17:
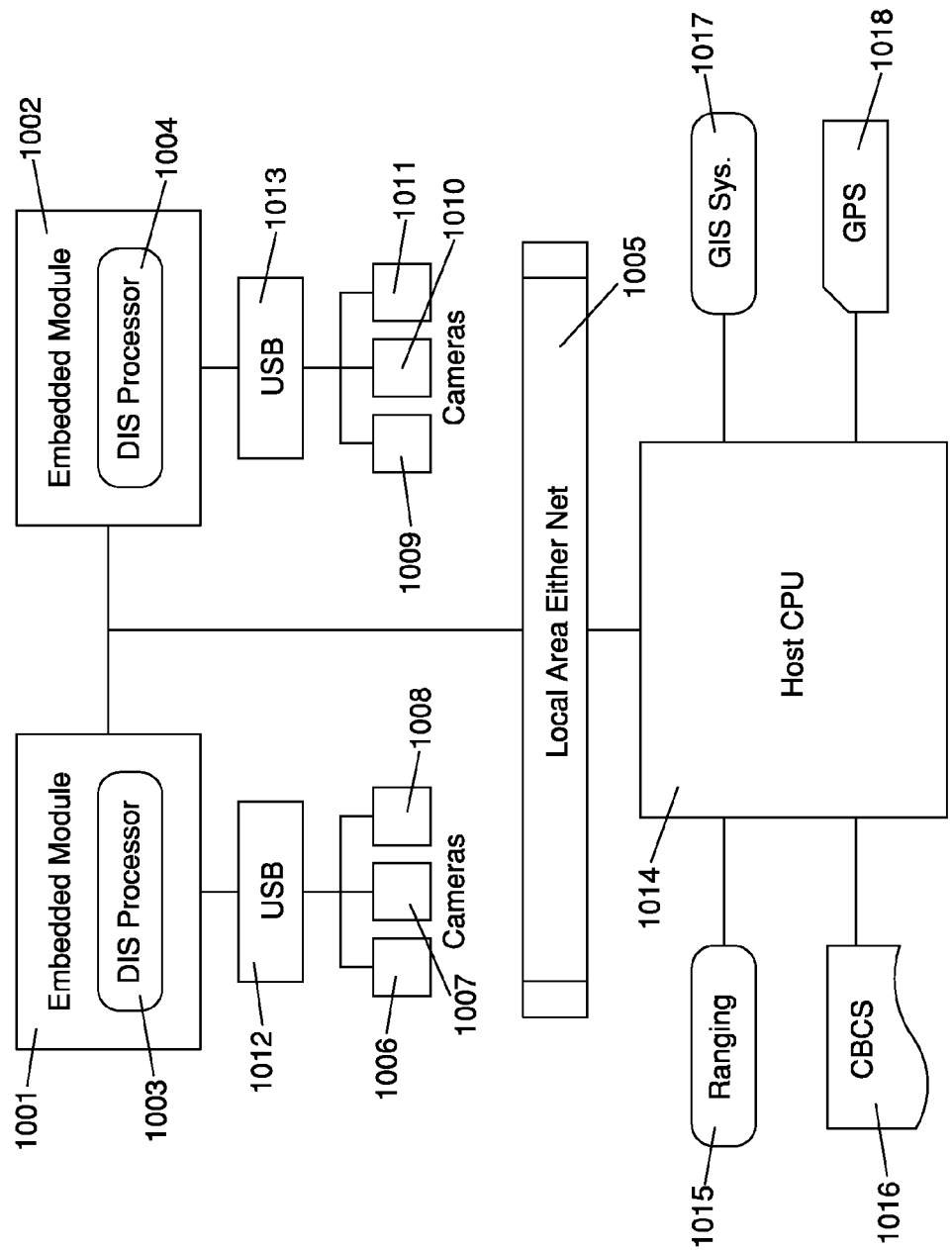
FIG. 17 is a block diagram of TSIB.

A block diagram of what is required for the TSIB is shown in FIG. 17. There are two Embedded System modules FIG. 17, reference 1001 & 1002 that will house the DIS Processor FIG. 17, reference 1003 & 1004, one for each side of the machine. The DIS processor FIG. 17 reference 1003 & 1004, for each side will process the camera for the same side of the machine. These include Cameras FIG. 17, reference 1006, 1007, 1008 and 1009, 1010, 1011. The DIS processor FIG. 17, reference 1003 & 1004, for each side will connect to the cameras through USB system FIG. 17, reference 1012 & 1013. The Embedded module will connect through the Local Area Network FIG. 17, reference 1005, to a Host CPU FIG. 17, reference 1014. The Host CPU will communicate with Ranging FIG. 17, reference 1015, GIS FIG. 17, reference 1017, CBCS FIG. 17 reference 1016, and GPS FIG. 17 reference 1018.

Images will be collected based on inputs from the CBSC FIG. 17 reference 1016.

The method presented is a code that generates the VBSI. The code is designated the Tree Stick Image Builder (TSIB) Program.

The Tree Stick Image Builder (TSIB) program is a program coded specifically for generation of VBSI of each tree 506 (FIG. 12). This will be installed in the GPU. The Tree Stick Image Program installed will process the individual images collected into Vector Based Stick Image (VBSI) and save this image to the GIS 508 (FIG. 12). as well and the high definition image to the GIS 508 (FIG. 12). The Tree Stick Image Builder (TSIB) program is a program coded specifically for generation of VBSI of each tree. This is accomplished with a Jetson TX1 Graphics Processor Unit (GPU) The TSIB will utilize several Software Packages including but not limited to; C++, Python, OpenCV, Public libraries. The program starts with a High Definition (HD) image of the tree collected by a camera mounted on the SPV 3. It can be a single image camera or a stereo image camera.

The process flow for the TSIB is presented below:
The image is first processed in where the back ground is turn to one shade of Blue.
This image is then processed using a Caney Algorithm that results in a edge detection of the edges of the tree.
Then this image is processed generating a red or other single color vector line starting at the trunk target and drawing a median line between the edges of the tree Caney image.
Then everything but the vector lines are converted to a white or black back ground.
This vector based image is saved as a vector file image.
The GIS 140 (FIG. 1) will also have a 3-D TSIB Program installed that will take at least two of the 2-D VBSIs and process them into a single 3-D VBSI.
This image will be Saved to GIS 140 (FIG. 1) and provided to the CBSC 102 (FIG. 1) for the final in fruit Zone pruning.

The 3-D VBSI is created from two 2-D VBSI using triangulation calculation and knowing the positions and distances. To obtain better accuracy a number of 3-D images can be generated of each tree and the averaged to get a more precise 3-D VBSI.

This image is stored in GIS 140 (FIG. 1) as well as provided to the CBCS 102 (FIG. 1) for the final pruning that is inside the fruit zone.

Methods

Method for Generation of the Matrix for Robotic Pruner & Harvester

Figure 18:
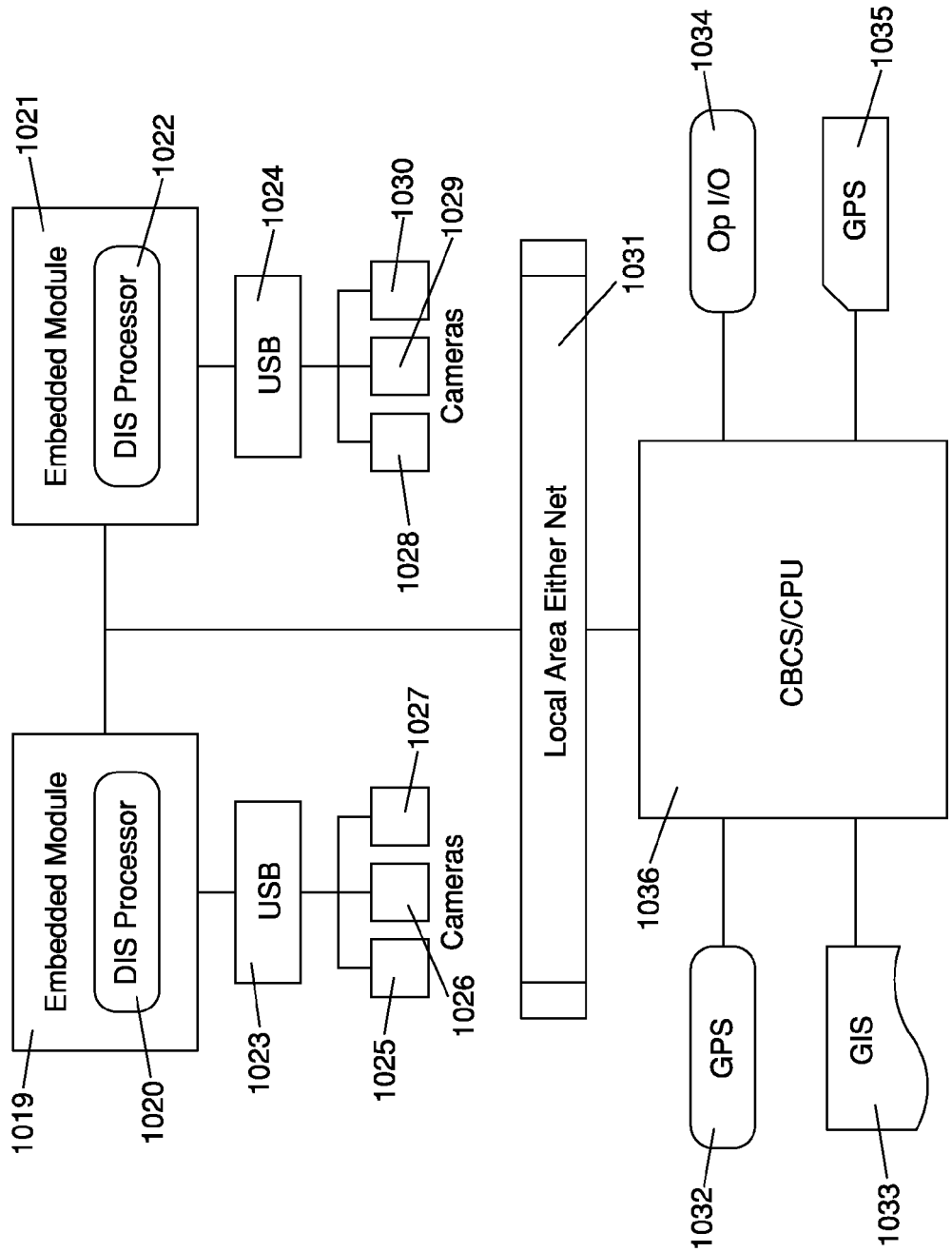
FIG. 18 is a block diagram of Matrix.

FIG. 18 is a Block Diagram of the Systems required to build the 3 Dimensional Matrix. There are two Embedded System modules FIG. 18, reference 1019 & 1021 that will house the DIS Processor FIG. 18, reference 1020 & 1022, one for each side of the machine. The DIS processor FIG. 18, reference 1020 & 1022, for each side will process the cameras for the same side of the machine. These include Cameras FIG. 18, reference 1025, 1026, 1027, and 1028, 1029, 1030. The DIS processor FIG. 18, reference 1020 & 1022, for each side will connect to the cameras through USB system FIG. 18, reference 1023 &1024.

The Embedded module will connect through the Local Area Network FIG. 18, reference 1031, to a Host CPU FIG. 18. reference 1036. The Host CPU will communicate with GPS FIG. 18 reference 1032, GIS FIG. 18, reference 1033, Operator Interface FIG. 18, reference 1034, and GPS FIG. 16, reference 1035.

The three-dimensional Matrix FIG. 26 reference 596, is the center of the Mapping System for the Robotic Pruner and Harvester. FIG. 26 reference 596, shows an Isometrix drawing of a depiction of the virtual Machine Matrix. There is a matrix for each side of the machine. Both virtual Matrix's share the Reference Vertical Datum Plane FIG. 26 reference 587, which is located on the center line of the harvester Frame, FIG. 28 reference 3. FIG. 26 reference 597, is a vertical plane which is located at the maximum reach of the forward robotic arm on the front of the machine. FIG. 26 reference 598, is a vertical plane which is located at the maximum reach of any robotic arm on the left side of the machine, and is just past the centerline of the left tree row. FIG. 26 reference 587, is a vertical plane which is located at the maximum reach of any robotic arm on the right side of the machine, and is just past the centerline of the right tree row. FIG. 26 reference 586, is a vertical plane which is located at the maximum horizontal reach of the most rear robotic arm of the machine. FIG. 26 reference 599, is the top horizontal plane which is located at the highest reach of any robotic arm. A series of 2-D arrays (much like the cards in a deck of cards) spaced at pre-determined spacing, make up the remainder of the 3-D Matrix.

Figure 13:
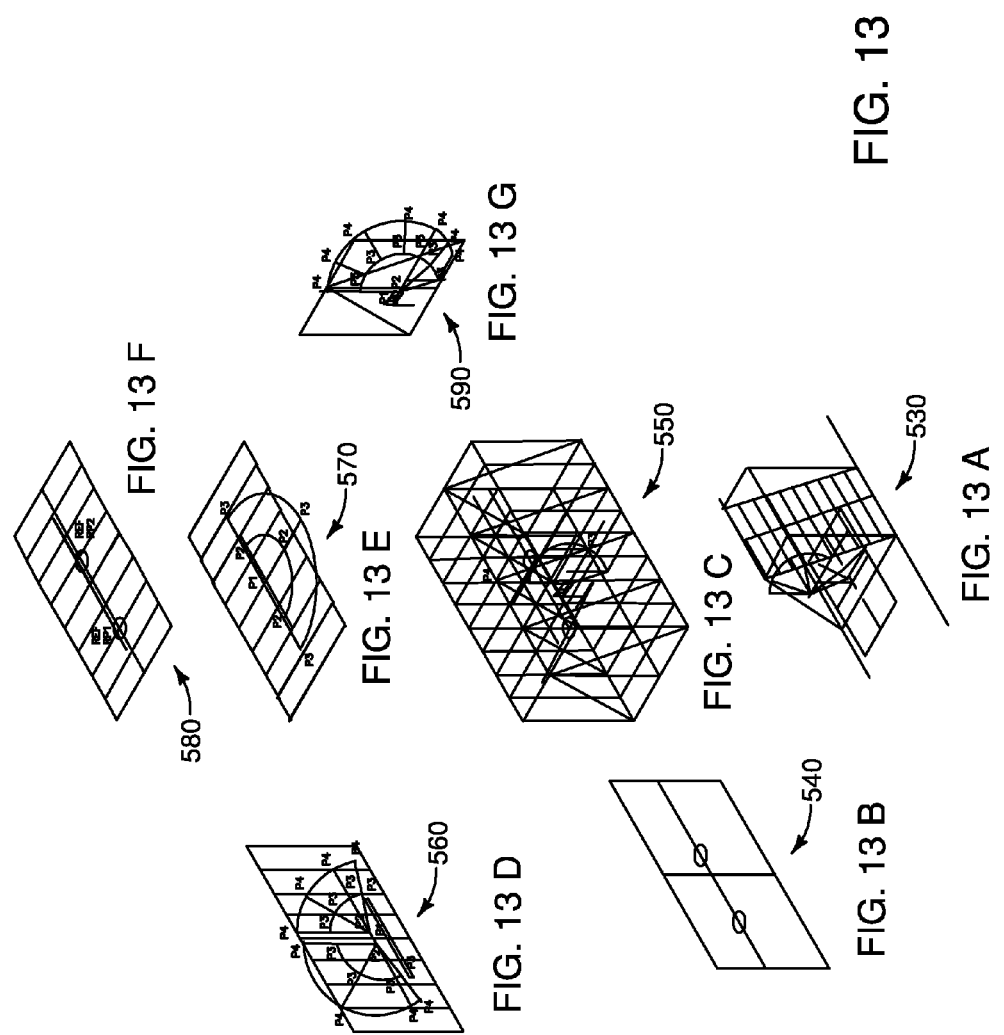
FIG. 13 Isometric drawings of Prototype Machine Matrix

FIG. 13, shows an Isometrix drawing of a depiction of the virtual Machine Matrix for the prototype robotic arm. FIG. 13 shows details FIG. 13 A-G which are projections from the matrix to show certain aspects of the Matrix.

FIG. 13 A reference 540 shows the relation of the prototype robotic arm items 532, 533, 534, 536 with the matrix envelope item 537, with the trellis wires item 538, and with the trellis poles or tree trunk item 539. FIG. 13 A reference 531, is the ground and the ground and ground plane of the matrix.

FIG. 13B reference 550, is the Vertical Reference Plane of the Matrix. The GPS antenna GPS #1 and #2 located as RP-1

FIG. 13B reference 564, and RP-2 FIG. 13B reference 565, on the reference Datum line of the Matrix.

FIG. 13C reference 560, shows the Matrix size FIG. 13C reference 560 and the locations with respect to the Prototype Robotic arm FIG. 13C reference 551, 552 & 548, and GPS antenna FIG. 13C reference 544 & 545. The relation of the matrix planes FIG. 13C reference 541,542, 543, 546, 547, 549, to the Orchard trees, trellis is shown.

The method for determining the GPS locations with respect to the orchard and the machine in the orchard is disclosed in the following disclosure.

FIG. 13D reference 570, shows a vertical plane FIG. 13D reference 571, through axis P1 FIG. 13D reference 572, of the robotic arm. FIG. 13D reference 570, also shows two locations for P2 FIG. 13E reference 574, and the arcs for P3 FIG. 13D reference 575, and P4 FIG. 13D reference 574 & 576. The Frame FIG. 13D reference 577.

FIG. 13E reference 580, shows a horizontal plane FIG. 13E reference 579. through P1 FIG. 13E reference 578. Also, shows the arc for P2 FIG. 13E reference 583, and the arcs for P3 FIG. 13D reference 587, and the Arcs for P4 FIG. 13D reference 588.

FIG. 13F reference 590, shows the GPS antenna GPS #1 and #2 located as RP-1 FIG. 13F reference 583, and RP-2 FIG. 13F reference 584, on the Reference Datum line of the Matrix and the Reference Horizontal Plane FIG. 13F reference 581. FIG. 13F reference 582 is the top Horizontal Plane of the Matrix as related to the Reference Horizontal Plane FIG. 13F reference 581.

FIG. 13G reference 585, shows a vertical plane through P1 FIG. 13G reference 582, and perpendicular to the Reference Vertical Plane. FIG. 13G reference 585 also shows P2 FIG. 13G reference 593, and the arcs for P3 FIG. 13G reference 594, and P4 FIG. 13G reference 595.

The matrix data points are mapped in GPS units which provides an Absolute Data Reference regardless of the machine that the Matrix is on. This makes the data interchangeable between machines. The data points consist of the global position numbers of Latitude; Longitude; and Elevation. The matrix is a 3-dimensional virtual rectangular box of which, one vertical plane surface makes up a Vertical Reference Plane FIG. 13B reference 550, and a perpendicular horizontal plane surface FIG. 13F reference 590, is the Vertical Reference Plane of the Matrix. At the intersection of the two planes is a Reference Datum Line on which two GPS antennas FIG. 13B reference 564, & 565, are reference points to the Global Position System. These two reference points FIG. 13B reference 564, & 565, are on the frame of the machine at a distance of approximately 81.00 inches above the ground plane and on the center line of the machine front-to-back FIG. 13F. The two points make up the Reference Datum Line through the centerline of the machine FIG. 13B reference 564, & 565.

The front GPS antenna is designated as GPS #1 and is the Reference Point number 1 (RP1). The second GPS antenna is designated as GPS #2 and is the Reference Point 2 (RP2). RP1 is the GPS coordinates that is determined by the GPS #1 as the current Latitude, Longitude, and Elevation. This is the GPS location of the first Reference Point RP1. Since the machine may be moving the location is sampled continually and updated. Likewise, GPS #2 determines the current Latitude, Longitude, and Elevation of RP2. Using RP1 and RP2 the datum line which is on the centerline of the machine is determined in Latitude, Longitude, and Elevation. Since the distance E between the two points is known all other data points can be determined along the Reference Datum Line using trigonometry. Using the same method, the difference in elevation can be used to determine the slope of the Reference Datum Line and calculate the elevation of each data point along the Datum line. An attitude instrument provides an overcheck of the slope of the datum line front to back on the machine. The data for each data point on the datum line is maintained in an array an updated constantly as the machine moves.

The Attitude Instrument FIG. 1 reference 114, confirms the slope of the Datum line and also determines the side to side tilt of a Horizontal Plane through the Reference Datum Line. Knowing the angle of tilt and using trigonometry every data point can be calculated for the horizontal plane through the Reference Datum Line. A vertical plane perpendicular to the horizontal plane can also be calculated using trigonometry. The data is stored in the Matrix Array for each plane. The data array is updated as the machined moves and the location changes. All other data points in the Matrix are also calculated by simple addition or subtraction of the delta distance in arc seconds S-N and arc sec E-W for each data point from both the Vertical Reference Plane and the Horizontal Reference Plane. All Matrix Data points are stored in a series of vertical plane arrays for the total Matrix.

The data points also have a minimum of three other data fields. The data can be either 0 or 1. 0 is Off and 1 is on. Field one is on if a part of the machine is at this location. If the field one is on, no other field is allowed to be on without a warning signal, since the machine is occupying that location. Field two is on if a part of the tree is at this location otherwise it is off. Field three is on if there is an object detected at this location. Field Three is for showing Trellis Poles, Trellis wires, Irrigation lines, spray heads, valves, and other solid obstacles.

The field data from the Array can be put in the format of a RGB display and presented to the operator of the machine as well as to the CPU.

The methods for calculating all the Matrix data points is presented below. See text below.

RP1 is GPS location Latitude—(LAT1), longitude—(Long1), elevation—(Elev1).

RP2 is GPS location Latitude—(LAT 2, longitude—(Long2), elevation—(Elev2). Distance between RP1 and RP2 is known as E in inches.

For Example: If the Prototype harvester is sitting at the end of Block 6, Row 10 in the Goose Ridge Orchard the GPS location of RP1 could be at: Latitude 46° 13'53.42"N Longitude 119° 22'56.88"W Elevation 600 ft. above sea level and 84 inches above ground. Assume for this example the Reference Datum Line on the Prototype Arm frame is off true North 14 degrees East and sloped front to back where RP1 is higher that RP2 by 6 inches and the side to side tilts down to the right when traveling North by 3 inches over 6 feet.

Distance between RP1 and RP2 is 102 inches on the Prototype Arm and is designated length E.

Length $A$=LAT1−LAT2=$A$ Lat arc seconds==0.08127 Lat arc sec

Length $A$=0.081270.08127 Lat arc sec.

Length $B$=Long1−Long2=$B$ Long arc seconds

Angle $ac$=14 degrees

Tan 14 degrees=$B/A$=0.24933

Cosine 14 degrees=$A/C$=0.97030

$C$=0.97030/$A$=101.82338 in $A = 101.82338 \text{ in} * 0.97030 = 98.79923 \text{ in} = 0.08127$ LAT arc sec $B = A * 0.24933 = 98.79923 * 0.24933 = 24.63362 \text{ in}$ Length $D = \text{Elev1} - \text{Elev2} = D \text{ inches} = 600' - 599'6'' = -6''$ Sine angle $ce = D/E = -6''/102'' = -0.05882$ Sine angle $ce = \text{Sine } D/E = 6''/102'' = 0.05882 = 3.37208$ degrees The calculations for the Reference Datum Line E are as such:

$C^2 = A^2 + B^2 =$ $E^2 = C^2 + D^2 = A^2 + B^2 + D^2$

Length $E$ is the linear Distance between the two Antennas $RP1 - RP2 = 102$ inches Length $E = 102$ inch $A^2 = E^2 - (B^2 + D^2) = 10404 - (B^2 + 36)$ $C^2 = E^2 - D^2 = 10404. - 36. = 10368 \text{ in}^2$ $C = \text{SQRT } 10368 \text{ in}^2 = 101.82338 \text{ in}$ Length $A \text{ inches} = \text{SQRT}(C^2 - B^2) = \text{SQRT}(10368 \text{ in}^2 - 606.8123^2) = 98\ 79872$ inches.

Convert A and B from inches to LAT arc sec and B to LONG arcsec:

In global position units, the LAT arc units remain constant, but the LONG arc sec units vary based on Latitude. At 46 Degrees Latitude use 0.847146928 inches for 0.001 LONG arc sec.

$A$ LAT arc sec $= 98\ 79872$ inches $* 0.001$ LAT arc sec$/1.2155628$ inches $= 0.08128$ LAT arc sec.

$B$ LONG arc sec $= 24.63362$ inches $* 0.001$ LONG arc sec$/0.847146928$ inches $= 0.02908$ LONG arc sec The Datum Reference Line array can now be generated in GPS Position of Latitude. Longitude and elevation.

The array is generated starting a RP1 and $X_i$ which is Latitude is incremented in increments of 0.00005 LAT arc sec and $Y_i$ which is longitude of the increment is calculated for each increment and checked at RP2 as follows:

Array is calculated for Points$+X_i i = +0.00005$ to $+0.05839$ and $-X_i i = -0.00005$ to $-I = -0.17735$.

$Y_i = X_i * \text{Tan of angle } ac = 0.24933 * 0.69692 \text{Long arc sec/Lat arc sec} * X_i$ $Z$ Sine angle $ce = D/E = -6''/102'' = -0.05882$ Once the Reference Datum Line is determined in GPS coordinates, the Vertical Datum Plane FIG. 13B reference 563, and the Horizontal Datum Plane FIG. 13F reference 581, can be calculated with the Datum Line at the intersection of the two planes. The calculation for the points in the Reference Vertical Datum Plane FIG. 13B reference 563, is as such:

The $X_i$ coordinate, Latitude remains the same as the Datum line $X_i$ and the $Y_i$ Coordinate Longitude remains the same as the Datum line $Y_i$, but the Z Coordinate Elevation is incremented by 0.0125 inch for array points $Z_i j = +0.0125$ to $+62.0$ and $-Z_i j = -0.0125$ to $-82$.

The calculation for the points in the Reference Horizontal Datum Plane FIG. 13F reference 581, is as such:

The $X_i$ coordinate, Latitude remains the same as the Datum line $X_i$ and the Z Coordinate Elevation remains the same as the Datum line $Z_j$, but The Y Coordinate Longitude is incremented by 0.00005 LONG arc sec for array points $Y_i$ $i = +0.00005$ to $+0.08499$ and $-Y_i$ $i = -0.00005$ to $-0.08499$.

The remainder of all the Vertical Data Planes are determined as such:

The $Y_i$ Coordinate Longitude remains the same as the Datum line $Y_i$, but the $X_i$ coordinate, Latitude the Datum line $X_i$ Coordinate Latitude is incremented by 0.00005 for array points $+X_i$ $i = +0.00005$ to $+0.05839$ and $-X_i$ $i = -0.00005$ to $-i = -0.17735$. and the Z Coordinate Elevation is incremented by 0.0125 inch for array points $Z_i j = +0.0125$ to $+62.0$ and $-Z_i j = -0.0125$ to $-82$. All GPS positions are recalculated as the machine moves through the field on a continues bases.

Figure 33:
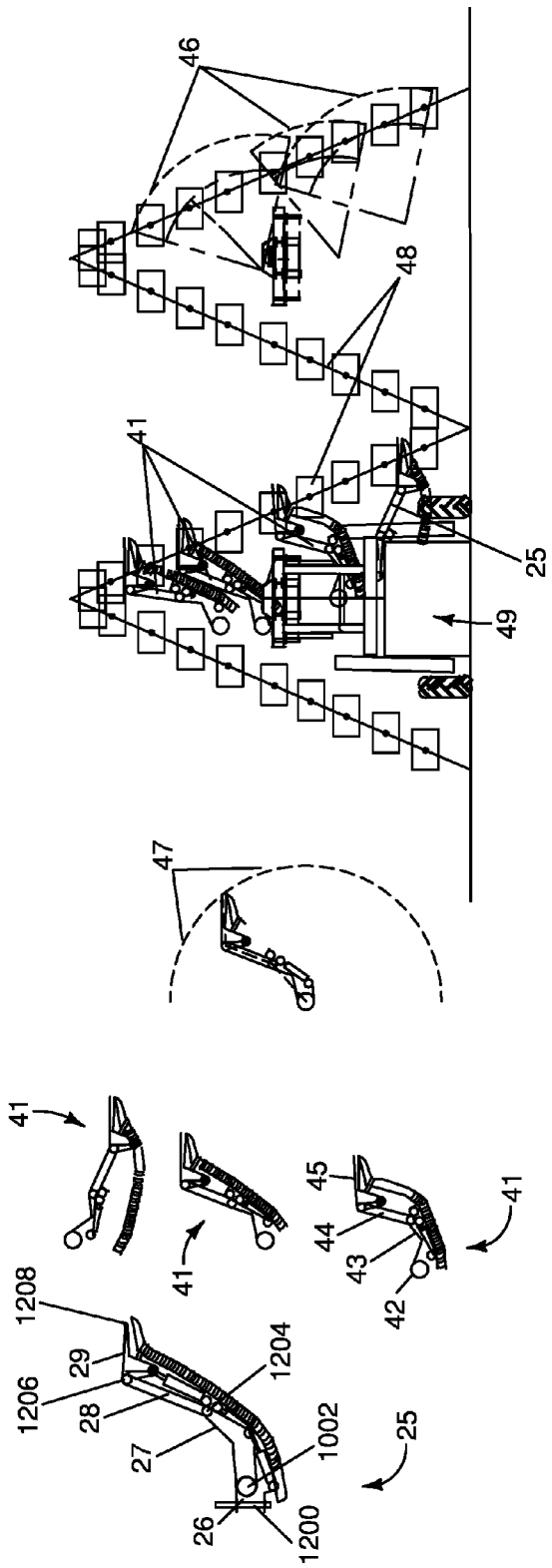
FIG. 33 is an assembly drawing for the robotic arm.

The positions of the robotic arm FIG. 33 reference 25, & 41, consist of sections of the arm that rotate about an axis at the end of each previous section of the articulating arm. P1 FIG. 33 reference 1200, is a vertical axis that slopes 10 degrees from vertical in the left-right direction of the trailer and matrix. The position of P1 FIG. 33 reference 1200, is fixed by a mounting system to the vehicle frame FIG. 33 reference 49, and is fixed in reference with RP1 FIG. 13F reference 583, and RP2 FIG. 13F reference 584, P2 FIG. 33 reference 1202, is a horizontal axis that is perpendicular to axis P1 FIG. 33 reference 1200, and at a fixed distance from P1 FIG. 33 reference 1200, and makes up the swing frame section of the arm FIG. 33 reference 26 or 42. P3 FIG. 33 reference 1204, is a horizontal axis that is perpendicular to axis P1 FIG. 33 reference 1200, and at a fixed distance from P2 FIG. 33 reference 1202, and makes up the boom section FIG. 33 reference 25 or 41, of the arm FIG. 33 reference 25 or 41, P4 FIG. 33 reference 1206, is a horizontal axis that is perpendicular to axis P1 FIG. 33 reference 1200, and at a fixed distance from P3 FIG. 33 reference 1204, makes up the goose neck section FIG. 33 reference 28 or 44, of the arm FIG. 33 reference 24 or 41. P5 FIG. 33 reference 1208, is a horizontal axis that is perpendicular to the P1 axis FIG. 33 reference 1208, and at a fixed distance from P4 FIG. 33 reference 1206, and makes the end effector FIG. 33 reference 29 & 45, of the arm. Each axis generates an arc with a fixed radius to the next axis about the pivot point.

The maximum reach of the 5-foot arm is indicated by FIG. 33 reference 47. The maximum reach of each robotic arm in the V-trellis FIG. 33 reference 48, is indicated by the arcs labeled by FIG. 33 reference 46.

In order to convert the polar coordinates to GPS locations the following methods for calculating all the pivot points P1, P2, P3, P4 and P5 to possible locations in the Matrix is presented below:

The calculation for converting the P1 axis to Matrix points in GPS arc sec is as such:

The P1 axis is part of the fixed frame of the robotic arm and its location can be measured from RPT-1 and RPT-2 in rectangular coordinates. An example of direct measurements on the prototype arm is presented below.

Axis P1 is determined by the location of the top end and bottom end of the pivot shaft.

This can be determined by direct measurement or from the design drawings.

P1 axis-top; $X = xx$, $Y = yy$, $Z = zz''$

P1 axis Bottom; $X = xx_1$, $Y = yy_1$, $Z = zz_1.''$

P1 axis top and P1 axis bottom make up the line in GPS coordinates.

P1 point perpendicular to P2 = LAT arc sec, LONG arc

Axis P1 is a Fixed line when referenced to RP1 and RP2.
X=65.871"Y=6.841"
Convert X to Lat arc sec and Y to long arc sec.
X=65.871 inches*0.001 LAT arc sec/1.2155628 inches=0.05419 LAT arc sec.
Y=6.841 inches*0.001 LONG arc sec/0.847146928 inches=0.00804 LONG Arc sec.
Axis P2 is determined by the location of the midpoint of the P2 axis.
P2-axis mid-points is an arc with a fixed radius and can be calculated by a series of points with P1 as the center and then converted to rectangular coordinates using trigonometry.
; X=xx", Y=yy" Z=zz"
P2 Arc angle is −180 degrees to +180 Degrees
P1 to P2 distance is a radius of 9.00"
At Arc angle Y=0 degrees X is −10 degrees.
Using trigonometry The X, Y, and Z coordinates can be calculated in inches.
P2 increment from P1 is;

| | | | |
|---|---|---|---|
| X = 0 | X = 0 | X = 0 | X = 0 |
| Y = 0 | Y = 0 | Y = +9.00" | Y = Yi to Yj .0125" to 8.875 |
| Z = −9.00" | Z = +9.00" | Z = 0 | Z = 9.0 * Sine angle Y/9.0" |

Convert inches to GPS coordinates.
A P2 position table of array points is constructed for all P2 points possible in the matrix.
P3-axis mid-points is the surface of a sphere and can be calculated by a series of arcs with P2 points as the center and then converted to rectangular coordinates using trigonometry.
; X=xx", Y=yy" Z=zz"
P3 Arc angle is −60 degrees to +90 Degrees
P2 to P3 distance is a radius of 53.00"
At Arc angle Y=0 degrees X is 0 degrees.
Using trigonometry The X, Y, and Z coordinates can be calculated in inches.

$$P3=X=$$

$$Y=$$

$$Z=$$

Convert inches to GPS coordinates.
A P3 position table of array points is constructed for all P3 points possible in the matrix.
Convert inches to GPS coordinates.
P4-axis mid-points is a series of Spheres of fixed radius which a desired point can only be reached by one set of axis positions and can be calculated by a series of spherical surfaces with P3 points as the center and then converted to rectangular coordinates using trigonometry;

$$X=xx", Y=yy"Z=zz"$$

P4 Arc angle is −90 degrees to +90 Degrees
P3 to P4 distance is a radius of 43.00"
At Arc angle Y=0 degrees X is 0 degrees.
Using trigonometry The X, Y, and Z coordinates can be calculated in inches.

$$P4=X=$$

$$Y=$$

$$Z=$$

Convert inches to GPS coordinates.
A P4 position table of array points is constructed for all P points possible in the matrix.
Convert inches to GPS coordinates.
P5-axis mid-points is a series of spherical solids can be calculated by a series of Spheres in which a desired point can have multiple positions of P2, P3, and P4 with P4 points as the center and then converted to rectangular coordinates using trigonometry.
The end effector-stem cutter location can be calculated by a series of spherical solids in which a desired point can have multiple positions of P2, P3, P4, and P5 with P5 points as the center and can approach a desired location from different angles, then converted to rectangular coordinates using trigonometry.

$$X=xx", Y=yy"Z=zz"$$

P5 Arc angle is −90 degrees to +90 Degrees
P5 to P6 distance is a radius of 6.00"
At Arc angle Y=0 degrees X is 0 degrees.
Using trigonometry The X, Y, and Z coordinates can be calculated in inches.

$$P5=X=$$

$$Y=$$

$$Z=$$

Convert inches to GPS coordinates.
The total number of P5 Positions is very large. Since the desired positions is restricted to the range of location of the trellis and fruit is known the number of points in the P5 position table size array is reduced. Position tables for P5 will indicate the preference order of possible position and angle of approach for P5. By having the arm position table arrays pre calculated. the time to put the arm in a desired position is much quicker and makes it possible for the machine to be moving in the orchard. The field that indicates where the robot arm is at any given time is provided to the matrix by the robot arm PLC controller.

Modes

Pruning Mode

Up on completion of the Set-Up activities the Pruner is ready. The Pruning is initiated when the Operator switches to the Prune Mode on the monitor in the operator cab.

Figure 19:
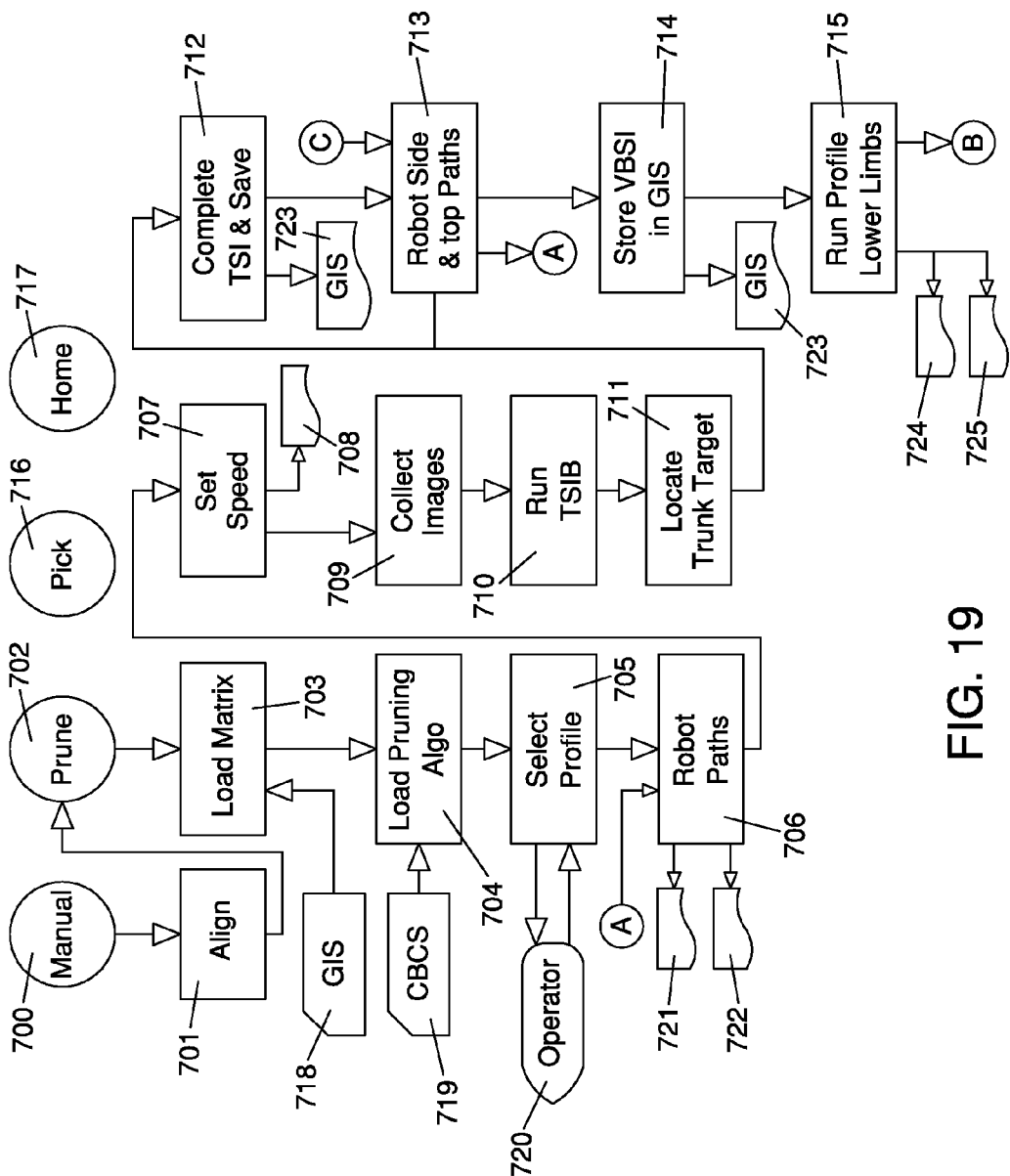
FIG. 19 is a flow diagram for the pruning mode 1.

FIG. 19. Pruning Steps

Figure 20:
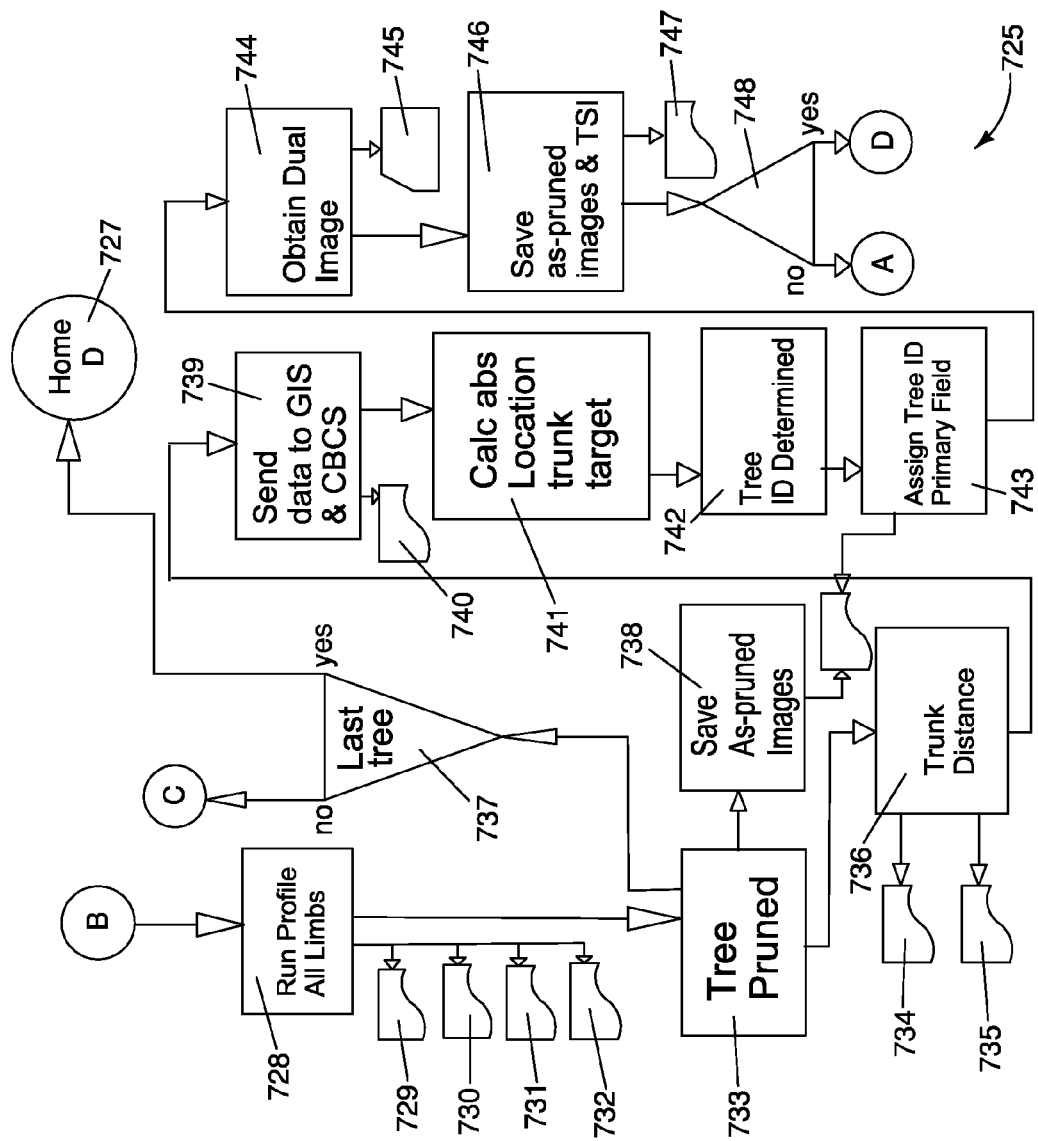
FIG. 20 is a flow diagram for the pruning mode 2.

Once the Prune Mode FIGS. 19, & 20 is selected the operating system will start up the list of programs that are on the hard drive. This will include:

1. the operator interfaces for the Prune Mode.
2. CBCS Pruning Programs
3. The GIS is Pruning mode program is started.
4. The RRS programs are started.
5. The DIS program is started.
6. The Robotic Controllers are started
7. The CBCS Program will load the Matrix from GIS.
8. The Pruning Program for the selected type of orchard will be loaded.

Figure 23:
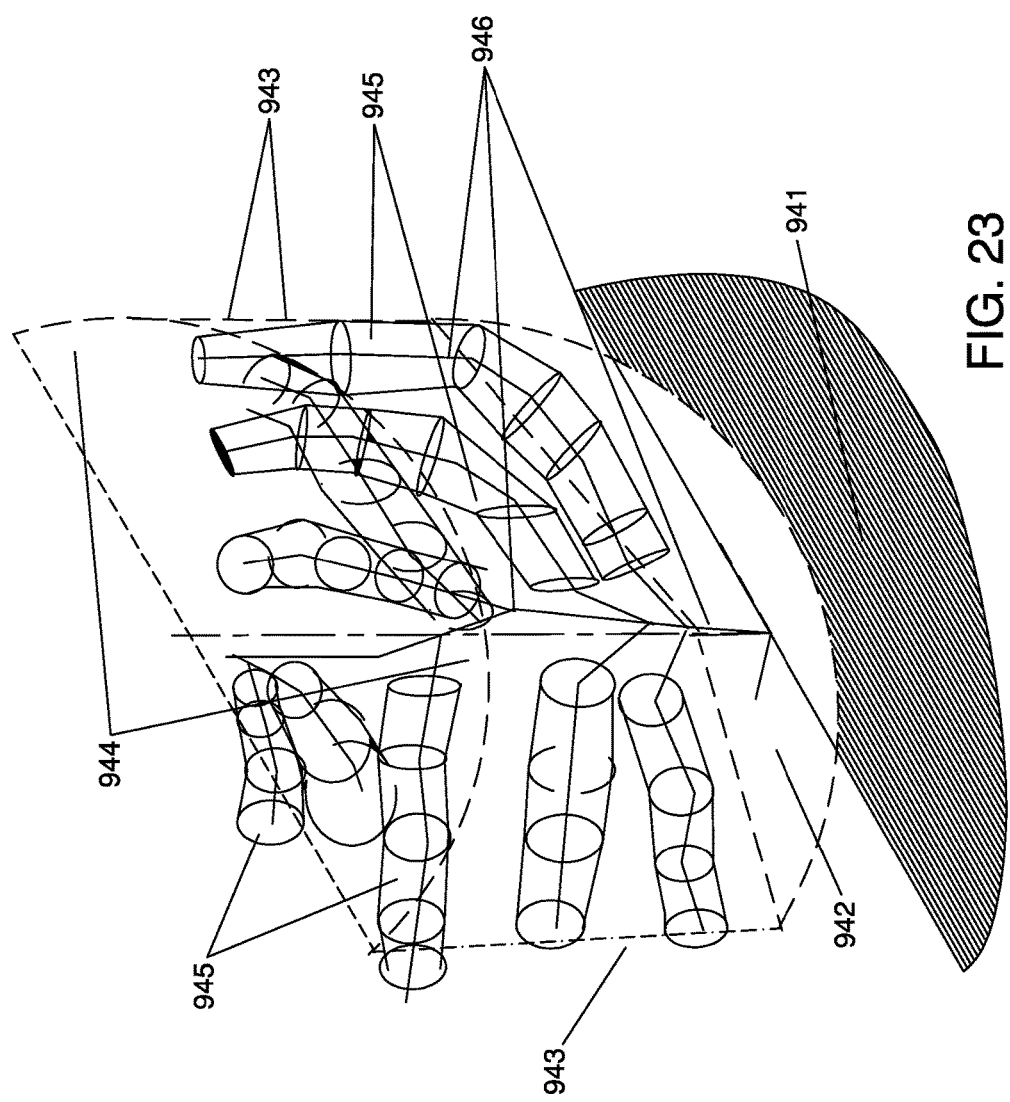
FIG. 23 is a depiction the Pruning profile an exemplary orchard.
Figure 24:
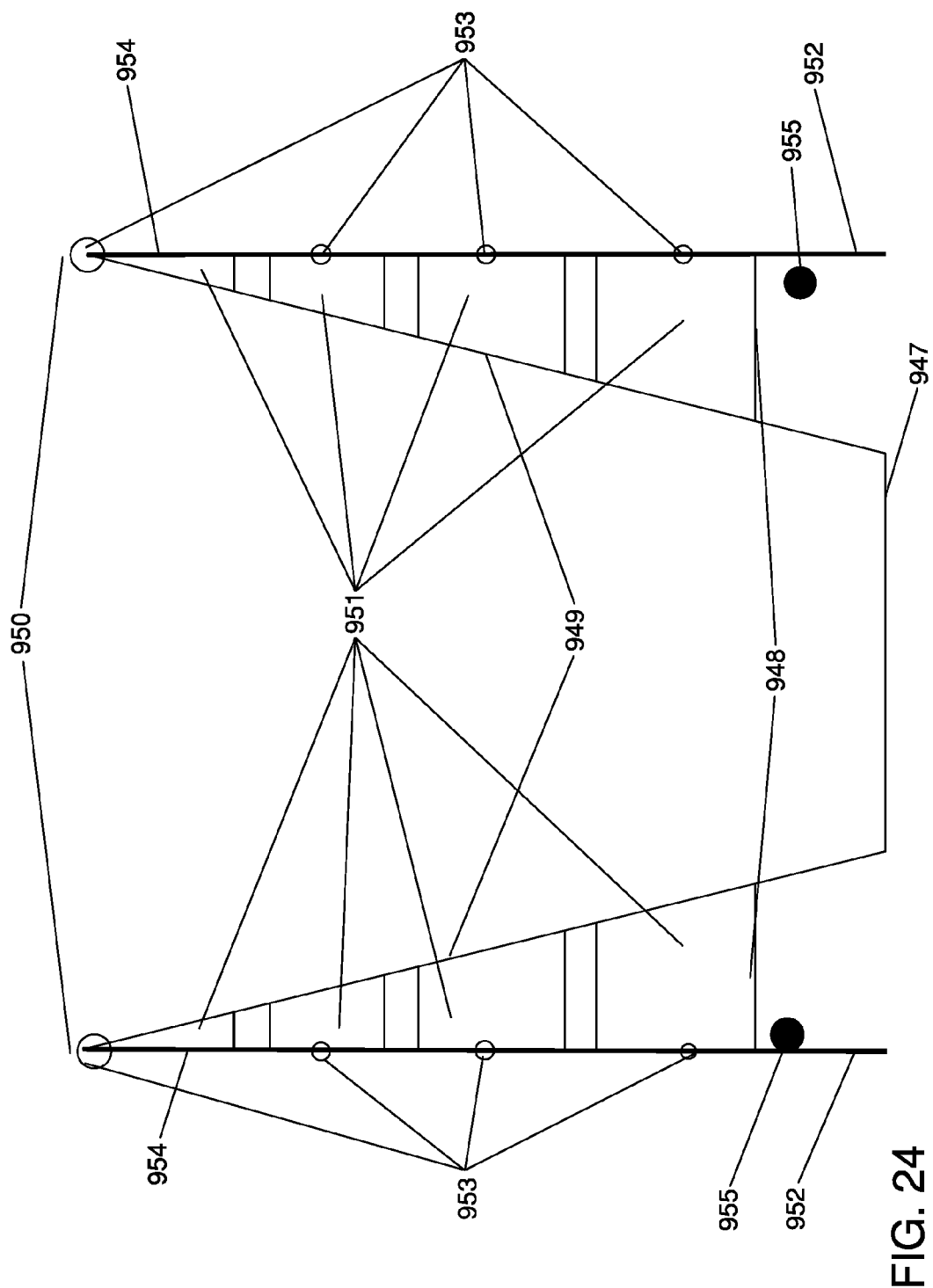
FIG. 24 is a depiction the Pruning profile for an exemplary straight trellis orchard.
Figure 25:
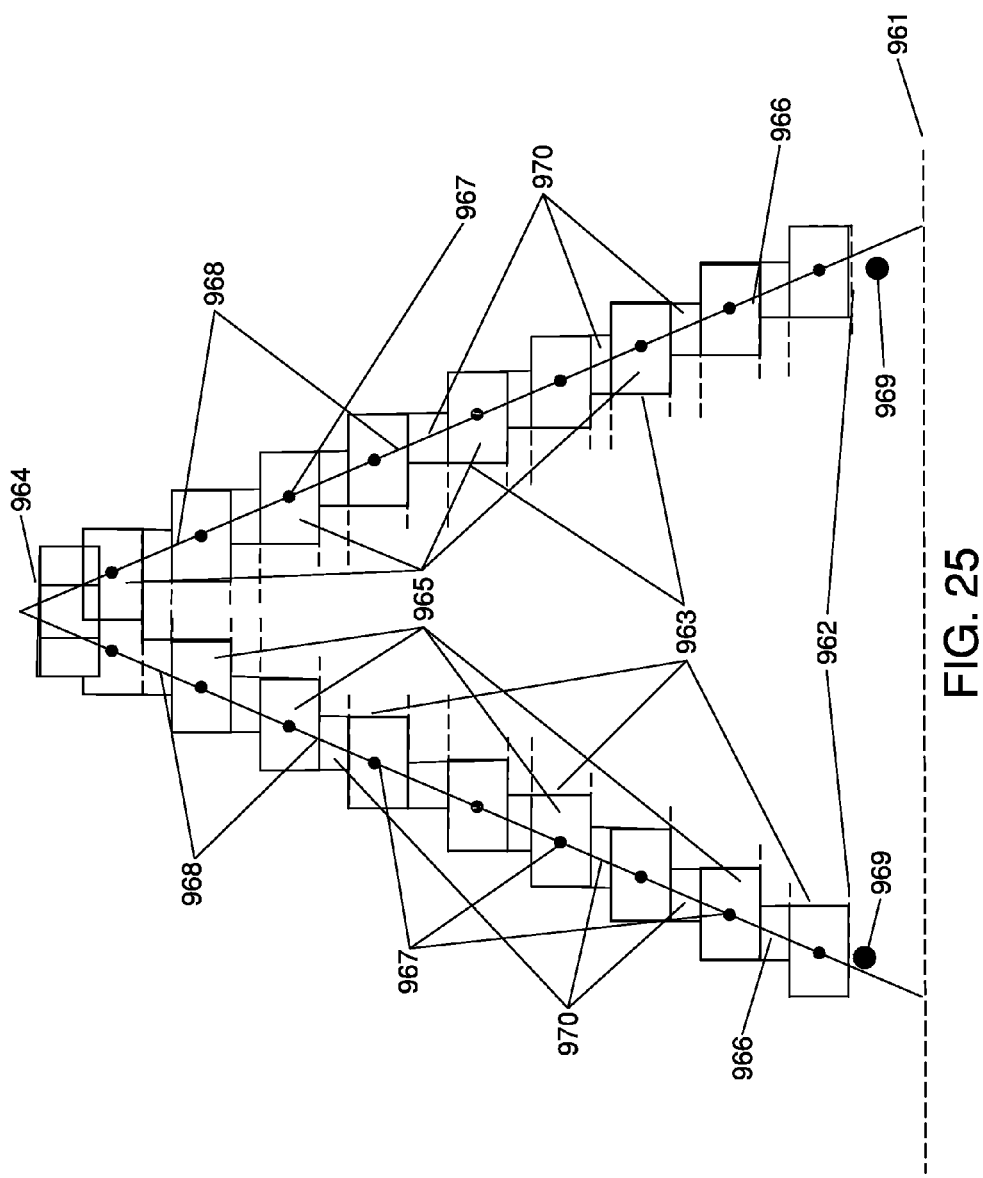
FIG. 25 is a depiction the Pruning profile for an exemplary V-Trellis orchard.

The pruning program FIG. 19, reference 704 will use input variables and functions based on the Knowledge Based Engineering Data for Orchard. The program will use the trellis type row spacing and row height, wire spacing, fruit type, fruit Varity, and shape of Exclusion Zone as shown in FIGS. 23, 24, and 25. The pruning program FIG. 19, reference 704 is a series of sub programs that are selected based on the input, variables. For example, if a V trellis apple tree, variety is Granny Smith with a fruit zone of rectangular section of 2 feet by 1 foot centered on the trellis wire is selected. Then an outer profile one foot from each trellis wire toward the SPV is calculated that is a vertical cut. An outer profile 1 foot away from the trellis wire away from the SPV is calculated that is a vertical cut. Horizontal profiles six inches below and six inches above each trellis wire is calculated for horizontal cuts. The result is the exclusion zones shown in FIGS. 23-25.

The CBCS Program FIG. 19, Reference 704 Will Request the Operator to Select the Pruning Profile, and or Confirm the Pruning Profile There will be initially 3 different pruning profiles developed for the pruning of the fruit trees. A large number of profiles can be developed to meet the orchardist needs. The Free Style Profile is for the older type orchards where the trees are free standing FIG. 23. The ground plane FIG. 23, reference 941, indicates the ground under the tree and determines the distance the lower profile FIG. 23, reference 942, is above the ground. This is pruned first. Then the outer profile FIG. 23, reference 943, is pruned next to remove the growth and to clear for more detailed pruning. The top profile FIG. 23, reference 944, is pruned by the upper robotic arms to remover the vertical shoots and fix the height of the tree. Once the rough pruning is complete then the twigs and limbs are removed back to the exclusion Zone (Fruit Zone). FIG. 23, reference 945. This is an area based on a profile of the major limbs and branches FIG. 23, reference 946. Finally the selective pruning is done with in the fruit zone using Rule Based pruning process.

Many of the new orchards are now straight trellis orchards. FIG. 24 is a profile for a straight trellis profile. Only the side nearest the machine is pruned. The ground plane is indicated by FIG. 24, reference 947. The lower profile is pruned first FIG. 24, reference 948 to remove low hanging limbs. The outer profile FIG. 24, reference 949, is then rough pruned to remove the growth. The top profile FIG. 24, reference 950, is pruned to remove the vertical shoots. Next the areas between the fruit zones FIG. 24, reference 951, is removed to provide access for harvesting. The selective pruning is done with in the fruit zone using Rule Based pruning process. The Tree Trunk are indicated by FIG. 24, reference 952, Sprinkler lines by FIG. 24, reference 955, Trellis poles are indicated by FIG. 24, reference 954, and trellis wires are indicated by FIG. 24, reference 953.

Another new orchard concept now in use is the V trellis. FIG. 25 is a profile for a V trellis profile. Both sides of the tree leaning toward the machine is pruned. The tree leaning away from the machine is not pruned. The ground plane is indicated by FIG. 25, reference 961. The lower profile is pruned first FIG. 25, reference 962, to remove low hanging limbs. The side profile nearest the machine is pruned next FIG. 25, reference 963, is then rough pruned to remove the growth. The top profile FIG. 25, reference 964, is accessed in openings between the trees in the row to remove the vertical shoots. Next the areas between the fruit zones FIG. 25, reference 970, is removed to provide access for harvesting and pruning the far side outer profile. The outer profile is then pruned. The selective pruning is done with in the fruit zone FIG. 25, reference 965, using Rule Based pruning process. The Tree Trunk are indicated by FIG. 25, reference 966, Sprinkler lines by FIG. 25, reference 969, Trellis poles are indicated by FIG. 25, reference 968, and trellis wires are indicated by FIG. 25, reference 967. Other pruning profiles can be developed to meet the orchardist needs.

When the pruning mode FIG. 19, reference 702 is selected, the Software for the pruning mode is loaded into the main CBCS computer if not already loaded from a previous operation. The CBCS FIG. 1, reference 102, will load and start the pruning algorithms FIG. 19, reference 704 when the pruning mode FIG. 19, reference 702 is selected. If more than one pruning profile is available, the operator will be requested to select the pruning profile FIG. 19, reference 705 through the operator interface FIG. 1, reference 106.

The CBCS then requests the GIS FIG. 19, reference 718 to load the matrix for the machine FIG. 19, reference 703. If this is the first time a machine has been in this orchard and there is no data in the GIS data base other than the basic global data from the initialization steps above which is obtained from for GIS maps, then the GIS FIG. 1, reference 140 is set to collect data for each tree in the orchard FIG. 19, reference 704 as shown in FIG. 4. If data already exists from a previous year, then data is updated. Also, the GPS position of the machine is determined for the beginning of the row FIG. 4, references 406, 407. This information is provided to the CBCS FIG. 1, 102.

The CBCS Will Send Prune Paths to the Robot Controllers FIGS. 1, 170 & 180, Respectfully Concurrently, the CBCS FIG. 19, reference 719 will request that the DIS cameras FIG. 1. reference 181, 183, & 182, 184 to process a number of dual images of the trees, FIG. 19, reference 709, and the superimposition of these images starting at the trunk target will provide data to the Tree Stick Image Builder (TSIB) algorithm software FIG. 19, reference 710. The first steps of the TSIB algorithm are to generate a continuous vector line(s) for the tree trunk starting at the absolute location of the target on the trunk FIG. 19, reference 711. This provides enough information for step 3.3 of Lower profile to be done.

The robots FIG. 2, reference 340 & 342 on each side of the SPV 3 will start pruning as the first tree comes into the matrix FIG. 26.

Robotic Controllers FIG. 2, reference 341 will load pruning path, and will Start the power pruner and will do the path as the path and tree comes into the matrix FIG. 26.

Pick Path Generation Mode

Figure 21:
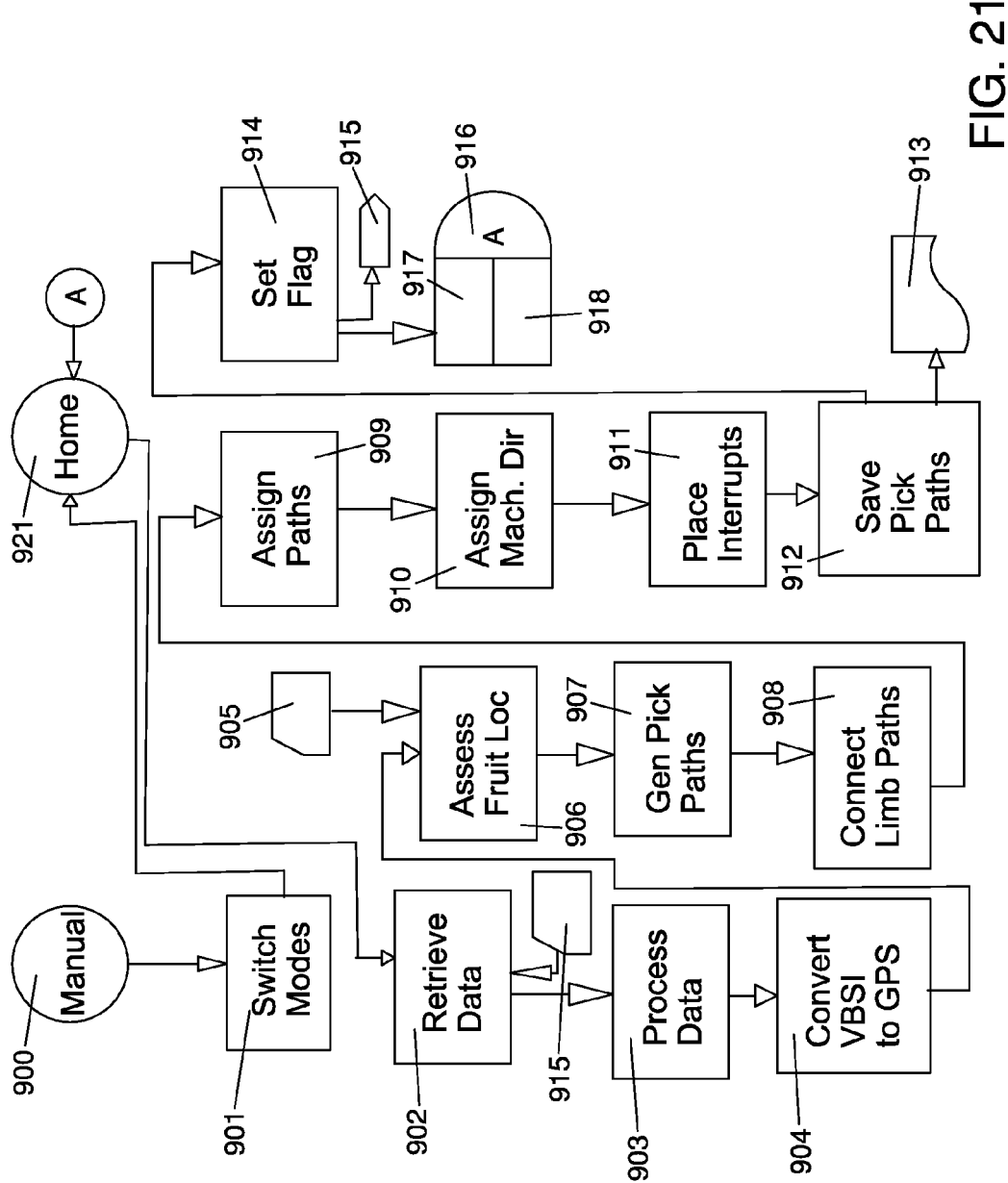
FIG. 21 is a flow diagram for Pick Path Algorithm generation mode

Up on completion of the Set-Up activities including data collection the Pick Path Generation Mode FIG. 21 is ready. The Pick Path Generation is initiated when the Operator switches to the Pick Path Generation Mode on the monitor in the operator cab. The set up for Pick Path Generation requires the CBCS FIG. 1, reference 102 and the GIS FIG. 1, reference 140 only. This can also be done with a reduced version of CBCS and GIS on a desktop or lap top with the proper GPU installed and the system is provided with the data in the GIS database. The Pick Path Generation Program FIG. 21, is programmed as part of the Harvester design. The Pick Path Generation program FIG. 21, will utilize several Software Packages including but not limited to; C++, Python, OpenCV, Public libraries. The Pick Path Generation software will use Image Recognition software. A large library of fruit buds will be generated, and a library of not fruit buds will be generated. The imaging steps are generally completed in the Pruning Mode and saved to GIS. The Pick Path Program FIG. 21, will input the 3-D VBSI and will generate a series of tables of data points that will represent the Path of the end effector path that is parallel to the 3-D VBSI. These paths are saved. A path will be generated for each main branch of the tree. This will be repeated until all the branches and limbs have a Pick Path parallel to the branch for limb. When completed the Control System is ready for the Harvesting Mode FIG. 22.

Harvesting Mode

Figure 22:
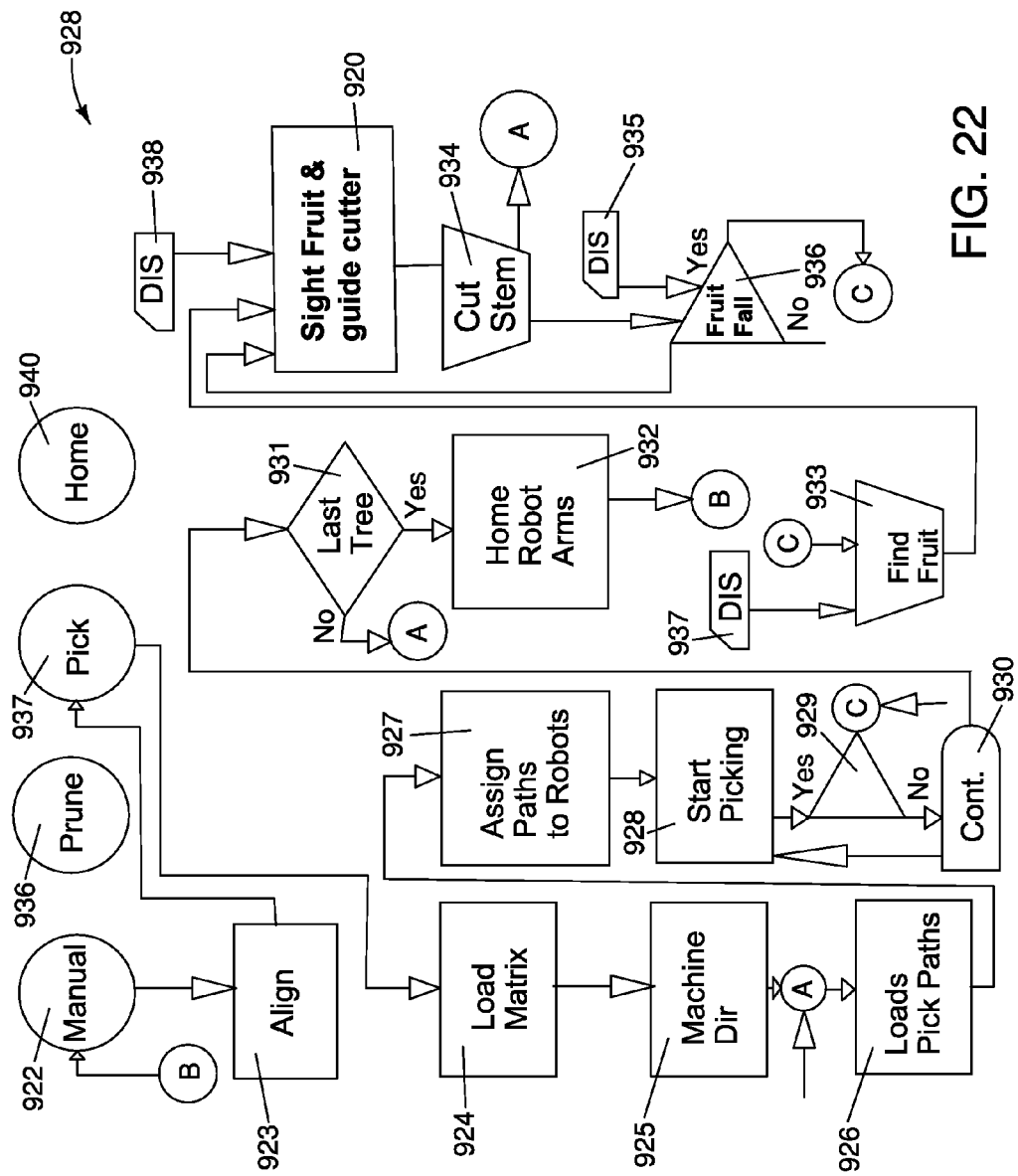
FIG. 22 is a flow diagram for harvesting mode.

Up on completion of the Set-Up activities the Harvester is ready. The Harvesting is initiated when the Operator switches to the Pick Mode FIG. 21, on the monitor in the operator cab. The process flow for harvesting is shown in FIG. 22 PROCESS FLOW DIAGRAM FOR HARVESTING MODE.

1. With the machine in the manual mode FIG. 22, reference 922, the operator uses information provided by the GPS FIG. 1, reference 124, to manually align the machine to the center of the row of two row trees, or in the case of an edge row one sets the distance of the SPV from the tree row.
2. The operator initializes each robotic arm FIG. 1, reference 170, 172, 174, 176, 180, 182, 184, & 186, to the start harvesting position FIG. 22, reference 923.
3. With the machine in the manual mode FIG. 22, reference 922, the operator uses information provided by the GPS FIG. 1, reference 124, to manually align the machine to the center of the row of two row trees, or in the case of an edge row one sets the distance of the machine from the tree row. The operator initializes each robotic FIG. 1, reference 170, 172, 174, 176, 180, 182, 184, & 186, to the start harvesting position FIG. 22, reference 923.
4. The operator will then locate the first tree trunk on left side of the SPV 3 by guiding the most forward left robotic arm 170 to the starting position. The operator will do this task by operating the joystick FIG. 1, reference 104.
5. Then the operator will locate the first tree on the left side of the SPV 3 by guiding the most forward robotic arm FIG. 28, reference 30 until the end effector just touches the target on the trunk of the first left tree. Note: the left side robotic arms are staggered ahead of the right side robotic arms on the machine.
6. Then the operator repeats the operation for the right side of the machine until the right side robotic arm's FIG. 28, reference 33 end effector just touches the target on the trunk of the first right tree.
7. Once the machine is aligned and initialized the operator then checks that all interlocks are good FIG. 22, reference 923 and selects the Pick Mode FIG. 22, reference 937.

Shut Down Mode

The Shutdown Mode is shown in FIG. 9 Flow Diagram for Robotic Controllers FIG. 9 reference 880.

1. The robotic arms are moved to the transport position and secured by safety locks.
2. The vacuum, fruit handling, sorting, and bin loading systems are shut off.
3. The leveling hydraulics lower the machine until it is sitting on the ground.
4. The CBCS is switched to shutdown which sequences all the systems controlled by the CBCS to a shutdown and then the CBCS shuts down itself.
5. Finally, the engine is switched off.

Methods for Set Up for Automated Operation

To clearly describe the processes for each tree a step-by-step of the Pruning, Pick Path Generation, and Fruit Harvesting process is described. Multiple systems will be operating in parallel but the process will be described for the steps occurring on an individual tree as the machine moves by.

Block Diagram

The previous paragraphs describe the Systems and the interfaces between the systems. The systems will operate as an interactive process.

FIG. 1 is a Block Diagram of the CBSC. The CBSC-CPU 102 is a computer based digital control system. The systems are all connected by a main buss FIG. 1, reference 118 that networks the systems together. The CBCS FIG. 1, reference 102, provides the integration function of interfacing the other systems to accomplish either the task of pruning or the task of harvesting. One of two different computer programs will be loaded for the type of fruit being harvested and depending whether the pruning mode FIG. 19, reference 702 or the harvesting mode FIG. 22, reference 937 is selected.

FIG. 1, Block Diagram of the control systems shows the relationship between the CBCS FIG. 1, reference 102, GPS Guidance System FIG. 1, reference 124 with the GPS antennas FIG. 1, references 122, 126. The GPS Guidance System FIG. 1, reference 124 provides global position data on a very frequent basis. This information is processed and supplied to the GIS FIG. 1, reference 140 through reference 118.

Figure 27:
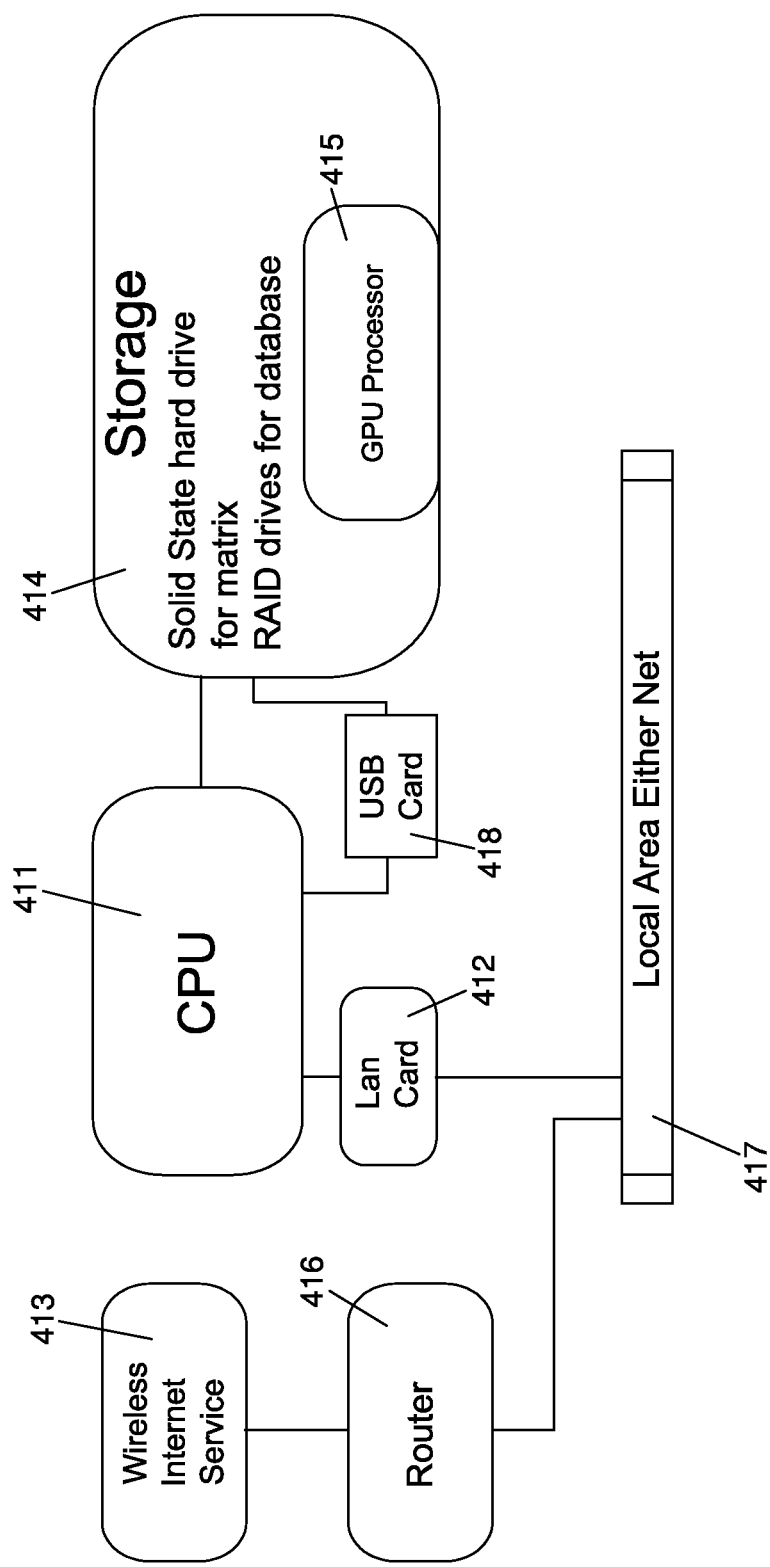
FIG. 27 is a block diagram of the geographical information system (GIS).

FIG. 27 is the Block Diagram of the Geographical Information System (GIS)

The GIS FIG. 1, reference 411 maintains an Absolute Position Database for the orchard. It is stored on a large solid state hard drive FIG. 27, reference 414. A CPU FIG. 27, reference 411, controls and handles the data transfers to and from the data files in the database. A GPU FIG. 27, reference 415 is close coupled to the data base to handle the image data transfers. It is connected to the CPU via USB card FIG. 27, reference 418. A Lan card FIG. 27, reference 412 provides a connection from the CPU to the Local Area Network FIG. 27, reference 417. A Router FIG. 27, reference 416, connects to a network service FIG. 27, reference 413, to allow the information to be uploaded or downloaded to protect. Save and manage the data for large orchards.

The GIS FIG. 1, reference 140 maintains an Absolute Position Database for the orchard. The GIS also maintains two Machine Matrix Data Bases depicted in FIG. 26. The machine matrix data base is three-dimensional absolute position map of the volume from the center line (Baseline) of the machine to the center line of the tree row. One matrix is for the left side of the SPV 3 and one matrix is for the right side of the machine. The position of the baseline of each matrix is determined from the GPS Guidance System FIG. 1, 124 location of the GPS antennas FIG. 28, references 11,12.

1. The Geographic Information System (GIS) is utilized to organize and store all the data for the orchard, Block, tree row, and each side of each tree in a relational data base.
    a. Store Pick-paths for each tree ID in the GIS.
    b. Provide an algorithm that identifies the direction of travel for picking. And determines which end of the tree the paths will be the start point for picking, left to right or right to left.
    c. Identify the default pick zones for each robotic arm
2. Utilize image recognition of fruit buds at various stages of development using deep learning techniques. Identify the fruit buds in the dual tree images and locate interrupts along the pick path that is nearest to the fruit bud location.
    a. End result is a series of pick-paths with interrupts along the path where fruit is expected.
    b. Save pick-paths associated with each tree ID and store in the GIS, until retrieved for verification and finally for harvesting.

The attitude of the machine is determined by an aircraft Attitude Instrument FIG. 1, reference 114, that provide degrees off level of the SPV FIG. 28, reference 3 top Structural Frame that makes up the base plane of the harvester. A secondary input is the speed of the SPV that can update the system if the GPS signal is lost for a short period of time. The absolute position data is changed continuously as the harvester moves along the tree row. Vector Base Stick Image (VBSI) for each tree is also located in the matrix. Also, any fixed objects that are located in the path of the SPV are also located on the matrix.

FIG. 1 Block Diagram of the Control System shows the relationship between the CBCS FIG. 1, reference 102, and the RRS FIG. 1, references 132,134,126, and 138. There is a RRS for each side of the SPV, one for the left side and one for the right side. The main purpose of the RRS is to accurately determine the location of a target on the trunk of the tree so an absolute location of the tree trunk can be calculated with respect to the reference plane on the SPV, and checked against the current GPS data for the tree in the GIS system FIG. 1, reference 124. This is the starting point for drawing the vector stick image of the tree. A secondary purpose is to locate objects that the machine needs to avoid.

There is a DIS FIG. 1, reference 120 and 130, for each side of the SPV FIG. 28, reference 3, one for the left and one for the right. The DIS's FIG. 1, reference 120 and 130, are image processors that processes the digital images. The DIS FIG. 1, reference 120 and 130, provides images of the tree as the SPV FIG. 28, reference 3, moves along. The absolute location of the camera is recorded, along with the camera image and is stored in the GIS FIG. 1, reference 140. Also, real time images are provided to the operator interface to allow the operator to monitor the operation. The close up cameras FIG. 1, references 138-143 & 156-162, provide an image to the CBCS FIG. 1, reference 102 to locate the branch to be cut during pruning, and to locate and cut the stem on the fruit during harvest. Also, a real-time images are provided to the operator interface FIG. 3, reference 202 to allow the operator to monitor the operation.

FIG. 1, Block Diagram of the Control System also shows the relationship between the CBCS FIG. 1, reference 102, and the Left Robotic Controller #1 FIG. 1, reference 170, Left Robotic Controller #2 FIG. 1, reference 172, Left Robotic Controller #3 FIG. 1, 174, Left Robotic Controller #4 FIG. 1, 176, Right Robotic Controller #5 FIG. 1, reference 180, Right Robotic Controller #6 FIG. 1, reference 182, and Right Robotic Controller #7 FIG. 1, reference 184, Right Robotic Controller #8 FIG. 1, reference 186. The CBCS divides the tree into three pick areas and provides pick paths to each of the Robotic Controllers.

Operation Modes

Process Flow for Pruning

FIG. 19 and FIG. 20 are flow diagram for the pruning mode. The process flow for pruning is shown in FIG. 19, FIG. 20 PROCESS FLOW DIAGRAM FOR PRUNING MODE. The machine is configured for pruning as shown in FIG. 5. With the machine in the manual mode FIG. 19, reference 700 the operator uses information provided by the GPS 124 to manually align the SPV FIG. 28, reference 3 to the center of two tree rows, or in the case of an edge row one sets the distance of the SPV FIG. 28, reference 3 from the tree row. The operator initializes robotic arms FIG. 2, reference 340, 342, 344, & 346 to the start pruning position FIG. 19, reference 701. The operator will then locate the first tree trunk on left side of the SPV FIG. 28, reference 3 by guiding the most forward left robotic arm FIG. 2, reference 340, to the starting position. The operator will do this task by operating the joystick FIG. 1, reference 102. Then the operator will locate the first tree on the left side of the SPV FIG. 28, reference 3 by guiding the most forward robotic arm FIG. 2, reference 340 until the end effector just touches the target on the trunk of the first left tree. Note: the left side robotic arms are staggered ahead of the right side robotic arms on the machine. Then the operator repeats the operation for the right side of the SPV FIG. 28, reference 3 until the robotic arm FIG. 2, reference 340 end effector just touches the target on the trunk of the first right tree.

The Pick FIG. 19, reference 716, and Home FIG. 19, reference 717, are only used if the operation is stopped by the operator.

Once the machine is aligned and initialized the operator then checks that all interlocks are good and selects the mode for the auto-pruning operation FIG. 19, reference 702. When the pruning mode FIG. 19, reference 702 is selected, then the Software for the pruning mode is loaded into the main CBCS computer FIG. 19, reference 704 if not already loaded from a previous operation. The CBCS then requests the GIS to load the matrix for the machine FIG. 19, reference 703. If this is the first time a machine has been in this orchard and there is no data in the GIS data base other than the basic global data that can be obtained from for GIS maps, then the GIS GIS FIG. 1, reference 140, is initialized to collect data for each tree in the orchard FIG. 4, reference 404 as shown in FIG. 4. Also, the GPS position of the SPV FIG. 28, reference 3 is determined for the beginning and end of each row FIG. 4, references 406, 407. This information is provided to the CBCS FIG. 1, reference 102.

The CBCS FIG. 1, reference 102, will load and start the pruning algorithms FIG. 26, reference 704 when the pruning mode FIG. 19, reference 702 is selected. If more than one pruning profile is available, the operator will be requested to select the pruning profile FIG. 19, reference 705, through the operator interface FIG. 19, Reference 720. The CBCS FIG. 19, Reference 706, will determine the robotic paths FIG. 19, reference 706 and provide them to the robotic arms controllers FIG. 19, references 721, and 722, which will first make several passes using the Power Pruner Assembly to clear the limbs on the lower profile set for the Trees as shown in FIGS. 23, 24, and 25. The CBCS will set the forward speed for the SPV FIG. 28, reference 3 and provide this information to the GPS steering and speed controller FIG. 19, reference 707 and request the SPV FIG. 28, reference 3 to move forward FIG. 19, reference 708. For the first pass in an orchard the speed will be set very slow due to the amount of data that will need to be processed to the GIS FIG. 1, references 140. The robotic arms controllers FIG. 19, references 724 and 725 will prune the lower profile.

Figure 34:
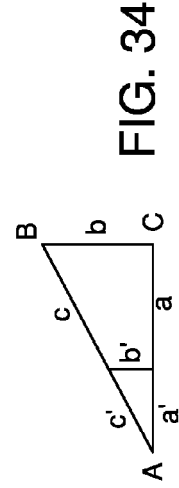
FIG. 34 is a drawing of a right angle.

The CBCS FIG. 1, reference 102, will load and start the pruning algorithms FIG. 26, reference 704 when the pruning mode FIG. 19, reference 702 is selected. If more than one pruning profile is available, the operator will be requested to select the pruning profile FIG. 26, 705 through the operator interface 106. The CBCS 102 will determine the robotic paths FIG. 19, reference 706 and provide them to the robotic arms controllers FIG. 19, references 170, and 180, which will first make several passes using the Power Pruner Assembly FIG. 34, to clear the limbs on the lower profile set for the Trees as shown in FIGS. 23, 24, and 25. The CBCS will set the forward speed for the SPV FIG. 28, reference 3 and provide this information to the SPV steering and speed controller FIG. 19, reference 707 and request the SPV 3 to move forward FIG. 19, reference 708. For the first pass in an orchard the speed will be set very slow due to the amount of data that will need to be processed to the GIS FIG. 1, references 140. The robotic arms controllers FIG. 1, references 170 and 180 will prune the lower profile.

The CBCS 102 will request that the DIS cameras FIGS. 1, 132, 134, & 150, 152 to process a number of dual images of the tree, FIG. 19, reference 709, and the superimposition of these images starting at the trunk target will provide data to the Tree Stick Image Builder (TSIB) algorithm software FIG. 19, reference 710. The first steps of the TSIB algorithm are to generate a continuous vector line(s) for the tree trunk starting at the absolute location of the target on the trunk FIG. 19, reference 711. The next step, starting at the Trunk Target move up and build a VBSI of each branch on the side of the tree facing the machine FIG. 19, reference 712. The average tree will have between ten and fifteen major branches (large limbs) connected to the tree trunk. The VBSI is saved to the GIS 140 and CBCS 102.

Retrieve the Final Vector Based Stick Image (VBSI) Stored in GIS to be Used During Pick-Path Generation
  a. The VBSI is stored as a series of 3-dimensional data points of X,Y,Z coordinate system.
  b. The first series of data points start at the trunk target which is the beginning of the first line, and the next data point is the end of the first line and the start of the second line of the trunk of the tree. The series ends at the highest elevation achieved.
  c. The next series of data points will be the first limb toward the bottom of the tree starting at the trunk. The data point will be the start of the first line of the branch and the next data point will be the end of the first line of the branch and the start of the second line. A junction is indicated and can have more than one line series with the junction as it starting point.
  d. The trunk will have an identifier for example "T" for trunk, and the branches will have a sequential number and identifier for example "B" resulting in B001, B002, . . . .
  e. The VBSI lines must be continuous from the base of the trunk. VBSI verification will assure that the trunk and branches are continues.

At the same time the robotic arm's FIG. 1, references 170 and 180 will be pruning the outer side profile and top profile of the tree, FIG. 19, reference 713. The Forward Robot Arm FIG. 1, reference 170 is released to start Pruning the next tree FIG. 19, reference A. When the initial Vector Based Stick Image is generated the images and the vectors are sent to the GIS FIG. 19, reference 723, for the tree that was identified by the trunk target FIG. 19, reference 714. When the stick image is available for the lower branches in the GIS FIG. 19, reference 723, then the CBCS FIG. 1, references 102, determines the profile for pruning the lower individual limbs FIG. 19, reference 715. The will calculate the robotic paths based on the branch profiles and provide these paths to the robotic controllers FIG. 19, references 729, 730, 731, and 732; FIG. 20, reference 728. The CBCS FIG. 1, references 102, determines the profile for pruning each limb moving up the tree until the top profile of the tree is reached. The final pruning will be completed as the SPV FIG. 1, references 3, moves slowly forward FIG. 20, reference 728.

Robot Ranging System (RRS) FIG. 8, will be scanning for hard reflective items and specifically for the reflective target on the tree trunks FIG. 20, reference 736. The distance from the RRS will be measured and provided to the GIS FIG. 20, reference 735, and the CBCS FIG. 20, reference 734. Using the GPS data FIG. 1, references 124 for the location of the machine and the distance from the RRS FIG. 2, references 352, 354. The location of the trunk is determined FIG. 20, reference 741. An absolute location is calculated FIG. 20, reference 741, and this absolute location will be the Identifying Number FIG. 2, references 742, for the tree FIG. 20, reference 739. The Identifying Number is then entered as the primary field in the GIS FIG. 20, reference 743. All data associated with the specific side of the tree will be entered in the GIS FIG. 20, reference 739 global data base under the primary field containing the Identifying Number for the side of the tree. Items that can be located by the RRS FIG. 1, references 132, &136, are irrigation lines and sprinkler heads, trellis frames and wires. The RRS FIG. 1, references 132, &136, will request the operator through the operator interface FIG. 1, reference 106 to identify and note if the machine must avoid the obstructions FIG. 20, reference 746. These obstructions will also be associated with the tree identification in the GIS FIG. 1, reference 140.
  a. The RRS sensor on the machine will obtain distance from the sensor to hard objects and utilize multiple scans to determine the location of the trellis poles, trellis wires, irrigation hardware, Irrigation piping
  b. The location of the sensor is known relative to the GPS data points and these items locations are calculated and converted to GPS data points that are mapped to the matrix. This will allow the machine to avoid obstacles even if they are not visible to the operator at the time of harvest.
  c. The RRS will locate the tree trunk target to an accurate GPS location that will become the Identification number for the tree in latitude and longitude.
    i. This will provide a unique identification number to collect all data associated with a specific tree. The accuracy will be +−1.0 inch.
    ii. This will allow the tree to be located even in the darkness of night.
    iii. During harvest this will give an over check as to the tree data to load for harvesting.

Once the CBCS FIG. 1, reference 102 is notified that the pruning paths have been completed by the robotic arm on either the left or right side of the SPV FIG. 28, reference 3, then the CBCS requests and final dual image by the DIS Cameras 186, 188 and 185, 187 for the side of the machine that a tree was completed FIG. 20, reference 744. These two VBSI are saved to the GIS GIS FIG. 20, reference 747, for the tree as the final as-pruned photos and VBSI of the tree FIG. 20, reference 746. The CBCS FIG. 1, reference 102 determines if this is the last tree in the row FIG. 20, reference 748. If no, the process returns to FIG. 20, reference, A, and if yes, the process returns to D, Home FIG. 20, reference 727.

By the time the final image of the first tree is obtained, the pruning of the next tree in line is well on its way. The next tree pruning is initiated when the front of the SPV 3 reaches a line that is perpendicular to the trunk of the tree FIG. 20, reference A. This location can be preprogrammed from global GPS data or determined by the initial detection by the RRS sensor. A temporary position can be assigned to the tree until a precise position of the tree trunk target is determined by the RRS FIG. 20, reference 742, and the absolute position is sent to the GIS FIG. 1, reference 140 as the tree primary Identifying Number, which is the absolute position of the target on the trunk of the tree.

This process is repeated for the next tree and CBCS FIG. 1, reference 102 will determine the robotic paths FIG. 20, reference 728 and provides them to the robotic arms controllers FIG. 20, reference 729, 730, 731, 732, which will first make several passes using the Power Pruner Assembly to clear the limbs on the lower profile set for the Trees, FIG. 20, reference 728 as shown in FIG. 23, FIG. 24, FIG. 25 as required. The As Pruned Images are saved of each tree as it is completed FIG. 20, reference 728. The process repeats itself FIG. 20, reference 733 as the pruner proceeds down the tree row until the end of the row is reached as determined by the initial end of tree row programmed into the CBCS FIG. 20, reference 737, If the Last Tree is No then the process go to C FIG. 20, reference 737. If the Last Tree is Yes then the process goes to D Home 727 FIG. 20, reference 727. The machine then proceeds to the Home mode and stops the machine FIG. 20, reference 727. The operator then switches to manual and moves the SPV to the next row to be pruned. The whole process is repeated and this continues until each row of the orchard is pruned.

Process Flow for Harvesting

The process flow for harvesting is shown in FIG. 21 PROCESS FLOW DIAGRAM FOR THE GENERATION OF PICK PATH ALGORITHM. The Pick Path Algorithm can be generated any time between the time of pruning of a tree and the time for harvesting of the fruit. This time is five to six months for the harvesting of apples. It can vary for different types of fruits. FIG. 21 can be accomplished by the CBCS FIG. 1, reference 102, and GIS FIG. 1, reference 140 that is associated with the machine in FIG. 28, or a desktop computer, or laptop computer with sufficient capacity and access to a copy of the GIS FIG. 1, reference 140 and the GIS data base for the orchard. This description is for the CBCS FIG. 1, reference 102 and the GIS FIG. 1, reference 140 that are on the machine for convenience. The machine is usually shut down in the Manual Mode FIG. 21, reference 900, so the Operator switches the machine to the Home Mode 921, FIG. 21. reference 901 and FIG. 6, reference 481.

Figure 6:
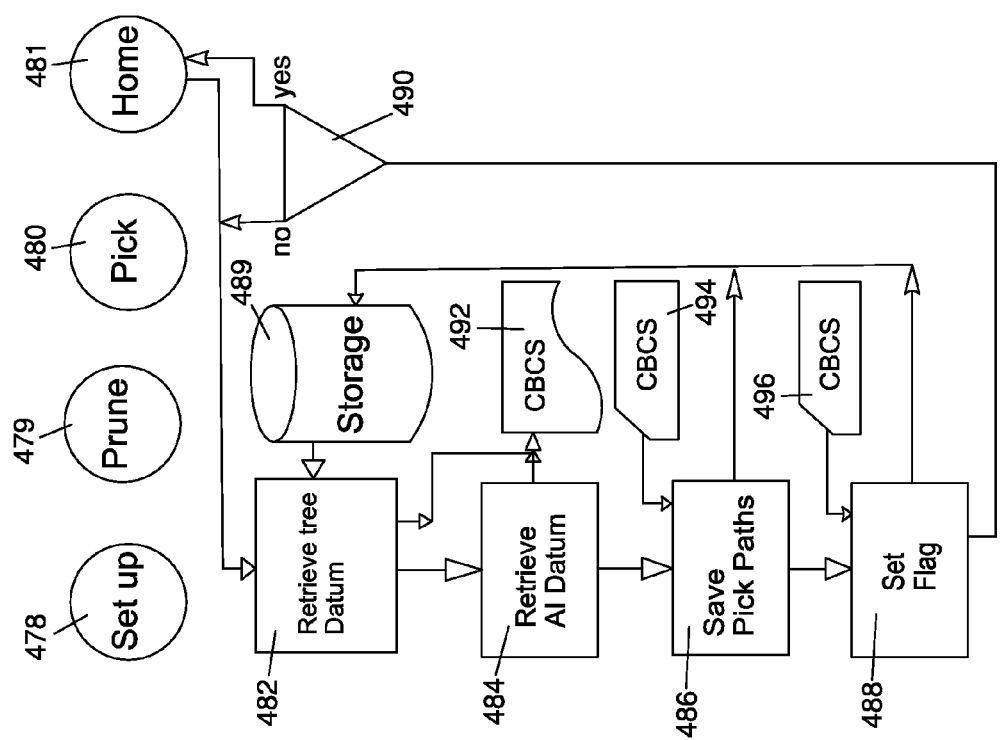
FIG. 6 is a flow diagram for GIS system.

The Setup FIG. 6, reference 478, is completed by this time. With the machine in the Home Mode FIG. 21, reference 921 the operator uses information provided by the GPS FIG. 1, reference 124 to and data stored in the GIS FIG. 1, reference 140 to get the tree identification number FIG. 21, reference 902

The data stored in the GIS FIG. 1, reference 140 under the Tree Identifying Number during the pruning process for each side of a tree is retrieved FIG. 21, reference 902 and processed FIG. 21, reference 903. The processing is accomplished by the Pick Path Algorithm which includes an expert system where and how the tree variety blooms and sets fruit on the limbs and other parameters found important to knowing where the fruit will be located on the tree.

The Vector Based Stick Image (VBSI) of the trunk and limbs of the tree is converted to absolute locations will be used to show the location of the tree on the machine matrix FIG. 21, reference 904. Also, a number of digital images of the as-pruned tree provides to the operator additional details as to where the fruit will be along the limbs. A Pick Path is a set of GPS absolute data points that is off set toward the machine from the tree limb VBSI FIG. 21, reference 905.

A Pick Path for each limb is generated FIG. 21, reference 906. And the paths between the limbs Pick Path can be connected by the operator or an automated limb path connector can be utilized FIG. 21, reference 907. This allows for the assignment of various limb pick paths to Forward Robotic Arm FIG. 1, reference 170, Middle Robotic Arm FIG. 1, reference 172, or Rear Robotic Arm FIG. 1, reference 176, FIG. 21, reference 908, and the assignment of the direction the machine is expected to be moving during the picking FIG. 21, reference 909.

Routing models will be utilized to help determine the optimum path for speed and access by the robotic arm. Once the path is generated than the Interrupts will be placed at each location along the path that fruit is expected FIG. 21, reference 910. The Pick Paths for each side of a tree will be stored in the GIS FIG. 1, reference 140 under the Tree Identifying Number FIG. 21, reference 911. Once a tree is completed a flag is set to show that both sides of the tree have been processed and ready to harvest FIG. 21, reference 912. The Program returns and processes the next Tree FIG. 21, reference 913, notifies the operator it is ready to process the next set of trees or row of trees FIG. 21, reference A.

a. The Pick Path Program is a sequential set of data points starting at one end of the path and moving in a line to the next point on the path which can be a change in direction or an interrupt point on the line. The data points will have a X, Y, Z location in Latitude, Longitude and Elevation.

b. The final steps will be to add any additional items that are required by the robotic arm controller c. The program is stored in GIS FIG. 1, reference 140 and ready for harvest day.

A 3-D simulator may also be developed to verify the Pick-Path Program is working as expected before the program is used at harvest time. Establish a pick-path that is offset toward the machine from the tree by VBSI data for each tree.

1. Utilize Navigation and Motion planning to determine the fastest pick path and an optional pick paths
2. The attitude of the machine is determined by an aircraft Attitude Instrument FIG. 1, reference 114, that provide degrees off level of the SPV FIG. 1, reference 3 top Structural Frame FIG. 1, reference 3 that makes up the base plane of the harvester.
   a. Provide input as to degrees off level to a self-leveling controls of the SPV FIG. 1, reference 3 hydraulics.
   b. Reduces or keeps the SPV FIG. 1, reference 3 within the range that can be handled by error compensation for alignment with the X, Y axis (absolute latitude and longitude) and to a lesser degree elevation.

Harvesting Mode

With the machine in the manual mode FIG. 22, reference 922 the operator uses information provided by the GPS FIG. 1, reference 124, to manually align the machine to the center of the row of two row trees, or in the case of an edge row one sets the distance of the machine from the tree row. The operator initializes each robotic arm FIG. 28, reference 30, 31, & 32 to the start harvesting position FIG. 9, reference 842. The operator will then locate the first tree trunk on left side of the SPV FIG. 1, reference 3 by guiding the most forward left robotic arm FIG. 28, reference 30 to the starting position. The operator will do this task by operating the joystick FIG. 28, reference 15. Then the operator will locate the first tree on the left side of the SPV FIG. 28, reference 3 by guiding the most forward robotic arm 30 until the end effector just touches the target on the trunk of the first left tree. Note: the left side robotic arms are staggered ahead of the right side robotic arms on the machine.

Then the operator repeats the operation for the right side of the machine until the right side robotic arm's FIG. 28, reference 39 end effector just touches the target on the trunk of the first right tree. Once the machine is aligned and initialized the operator then checks that all interlocks are good FIG. 22, reference 973, and selects the mode for Picking FIG. 22, reference 937. The CBCS FIG. 1 reference 102, will load and start the Pick Paths and Pick Fruit algorithms FIG. 22, reference 926 when the picking mode FIG. 22, reference 937 is selected. The CBCS FIG. 1, reference 102, then requests the GIS FIG. 1, reference 140 to load the matrix 596 (FIG. 26) for the machine FIG. 22, reference 924. The direction the machine is expected to be moving during the picking is verified FIG. 22, reference 925. The CBCS FIG. 1, reference 102 then loads the Pick Path data for the side of the trees facing the machine from the GIS FIG. 1, reference 140; FIG. 22, reference 926. The operator will be asked to assess the order the pick paths are assigned to the robotic arms, and will have an opportunity to re-assign a pick path to the Left Robotic Controller #1, Left Robotic Controller #2, Left Robotic Controller #3, Right Robotic Controller #4, Right Robotic Controller #5, or Right Robotic Controller #6, as appropriate FIG. 22, reference 927. Upon authorization, the pick paths are sent to the appropriate Robotic controllers and the picking operation is started FIG. 22, reference 928. When an Interrupt is encountered in the pick path program FIG. 22, reference 929, then the operation is turned over to the Pick algorithm FIG. 22, reference C, to FIG. 22, reference 933.

1. Utilize the Digital Imaging System to direct the last six to eight inches of the end effector during the Pick mode FIG. 22, reference 933. Once the fruit is found the camera will guide the end effector to cut the stem FIG. 22, reference 934. The Image Processor FIG. 1, reference 120 or 130, will signal the robotic controller when the fruit drops and the robotic controller will move the end effector back to the position it was in at the interrupt FIG. 22, reference 929.
   a. The camera can also be used to make a determination on color, size and if multiple apples are on the same bud location.
   b. If the apple is under size it can stop the pick and move on to the next apple.
   c. If the apple is not the color for ripe the pick can be stopped and move on to the next apple.
   d. Detect when the apple drops and stops the robot from extending into the tree area.

When finished with the current tree the CBCS FIG. 1, reference 102 will check to see if this is the last tree in the row and if no will return and load the data for the next tree in the row FIG. 22, reference 926. If the tree is the last in the row, then if is yes, FIG. 22, reference 931, the robotic arm is sent a Home signal as each arm completes its current assigned pick paths FIG. 22, reference 932. When the last Pick path is completed the machine stops and returns the mode to manual FIG. 22, reference B.

The Pick Path algorithms will have interrupts at each location along the path where fruit is expected. When an interrupt is encountered FIG. 22, reference C, the operation is turned over to Pick Algorithm FIG. 22, references 933, 920, 934, & 936, that finds the closest fruit FIG. 22, reference 933 and cuts the stems FIG. 22, reference 934, using the DIS camera 138, 140, 142, or 143 (FIG. 1) mounted on the stem cutter assembly FIG. 28, references 60, 61, or 62. This is accomplished with a feedback loop that moves in on the detected fruit FIG. 9, reference 920, and the stem cutter is passed through the area of the stem on the fruit FIG. 22, reference 934. When a fruit drop is yes than an interrupt is set C, then the robotic pulls back to the location FIG. 22, reference 933 and looks for more fruit FIG. 22, reference 933, If no fruit is detected FIG. 22, reference A then the operation returns to the last interrupt and the Pick algorithm FIGS. 22, 933, 920, 934, & 836 returns to the Pick Path algorithm FIG. 22, reference 926 and continues to the next expected fruit location and then returns the operation back over to the Pick algorithm FIG. 22, references 926, 927, 928, & 929. This is repeated until each pick path is completed for the tree.

FIG. 15, is a flow diagram for GPS System FIG. 1, reference 124 and the GPS antennas FIG. 1, reference 122 & 126. The operation of the GPS FIG. 1, reference 124 is the same FIG. 15, for both harvesting and pruning. The GPS System FIG. 1, reference 124 provides two main functions. The GPS System FIG. 1, reference 124 obtains satellite data from antenna #1, FIG. 15, reference 213, and antenna #2, FIG. 15, reference 215, on a continuous sampling basis. The first function is inputs of the locations of the GPS antenna to the CBCS FIG. 1, reference 102, FIG. 15, reference 202, and GIS FIG. 14, reference 203 to update the base center line of the machine structure FIG. 28, reference 3 and the machine matrixes FIG. 15, reference 203. And the second function is an auto steer system that keeps the machine positioned in the tree row FIG. 15, reference 204. The GPS System is turned off by pressing the OFF button FIG. 15, reference 209. The GPS does an automatic shutdown that saves the current settings FIG. 15 reference 211.

FIG. 4, FIG. 5, FIG. 6, FIG. 7, is a flow diagram for GPS System FIG. 1, reference 140 and the GPS antennas FIG. 1, reference 122 & 126. The operation of the GPS FIG. 1, reference 124 is the same FIG. 15, for both harvesting and pruning. The GPS System FIG. 1, reference 124 provides two main functions. The GPS System FIG. 1, reference 124 obtains satellite data from antenna #1, FIG. 1, reference 122, and antenna #2, FIG. 1, reference 126, FIG. 15, reference 201 on a continuous sampling basis. The first function is inputs of the locations of the GPS antenna to the CBCS FIG. 1, reference 102, FIG. 22, reference 202, and GIS FIG. 1, reference 140 to update the base center line of the machine structure FIG. 28, reference 3 and the machine matrixes FIG. 15, reference 203. And the second function is an auto steer system that keeps the machine positioned in the tree row FIG. 15, reference 204. The GPS System is turned off by pressing the OFF button FIG. 15, reference 210. The GPS does an automatic shutdown that saves the current settings FIG. 15 reference 211.

FIG. 4 FIG. 5 FIG. 6 FIG. 7 is a flow diagram for GIS System FIG. 1, reference 140. The GIS FIG. 1, reference 140 provides a method to store all the data based on geospatial location. The GIS FIG. 1, reference 140 provides for a database file that contains all the data collected and stored under a file Name for an orchard FIG. 4, reference 402. The GIS FIG. 15, reference 140 requires an initial setup, FIG. 4, reference 400 prior to putting the machine into the orchard FIG. 4, reference 401. The orchard is shown on a base map that provides an image and area of the orchard FIG. 4, reference 402. The block of trees of the same fruit variety is added as a layer & mapped FIG. 4, reference 403. Finally, the tree rows are added as a layer and mapped FIG. 4, 404. A database is set up to record all the data for each side of the tree to be pruned FIG. 4, reference 405. The database fields are setup for all the fields of images and data that can be collected for the orchard FIG. 4, reference 406. The data base will collect data for pruning and harvesting, and can also collect other data that would be of value to the Orchardist. The database can be stored on the hard drive of GIS System FIG. 1, reference 140 or on the cloud that can be set up and provide backup to the hard drive FIG. 4, reference 407. A temporary Tree ID is assigned early in the pruning process, and once the GPS location of the trunk target is determined it becomes the Primary Field for each tree FIG. 4, reference 408.

All information about the tree sides is stored in this data base and can be recovered at a much later data and accumulates data about a tree over time.

A Matrix FIG. 26 reference 596, for each side of the machine is also set up FIG. 4, reference 450. The matrix is a 3-dimensional virtual rectangular box of which, one vertical surface makes up a plane that the two GPS FIG. 1, reference 122 &126 antennas are points and make up a base line through the vertical centerline of the machine FIG. 4, reference 451. The third point in the Base Vertical Plane is determined by the attitude instrument FIG. 1, reference 114 and FIG. 4, reference 410 also on the machine frame FIG. 28, reference 3. The top of the structural frame FIG. 28, reference 3 makes up a Base Horizontal plane that is perpendicular to the Base Vertical Plane FIG. 4, reference 453. The bottom of the matrix 596 (FIG. 26) is a fixed distance from the top frame plane and is near the ground FIG. 4, reference 454. The top plane is a distance above the top frame such that the maximum height that can be reached by the robot arm is within the Matrix FIG. 4, reference 455. The Outside Vertical Plane is farthest from the machine must include the maximum reach of the robot arms and be the maximum width of the tree row FIG. 26, reference 597. The fixed parts of the SPV FIG. 28, reference 3 are fixed on the matrix FIG. 4, reference 456 and the robotic arms FIGS. 28, 30, 31, & 22 are programmed links that provide for the instant location of the robot arms in the Matrix FIG. 5, reference 444. All points of the matrix will include the absolute GPS location calculated from the GPS FIG. 1, reference 124 and attitude data FIG. 4, reference 458. These points and also show any object located at this GPS point as the machine moves down the tree row FIG. 5, reference 444. The Vector Based Image of the tree is also located at the GPS locations FIG. 5, reference 456. The GIS setup FIG. 4, reference 400 is only required once for an orchard and then can be used year to year.

1. The map (matrix) 596 (FIG. 26) is a 3-dimensional virtual rectangular box that is generated and provides absolute data of the absolute location in GPS coordinates Latitude, Longitude, and elevation from ground. This is a scrolling set of data points that scrolls from the front toward the back of the SPV in sync with the machine moving forward.
   a. This will allow the robot arm stem cutter to be moved to a GPS location and stay at that location even if the SPV FIG. 28, reference 3 is moving. Visually think of it as a 3D virtual grid of location that stays in place as you move along the grid. The Robot arm will know the location of the fruit even if the fruit is mostly hidden by leaves at this time.
   b. There is a separate matrix 596 (FIG. 26) for each side of the SPV FIG. 28, reference 3. Each get the reference points from the GPS antennas and makes up the reference plane for the Matrix 596 (FIG. 26).
   c. Each matrix point will also indicate if occupied by SPV, Robot Arm, Effector, Tree or hard object.
   d. A Matrix 596 (FIG. 26) for each side of the SPV FIG. 28, reference 3 is provided FIG. 4, reference 450. The matrix is a 3-dimensional virtual rectangular box of which, one vertical surface makes up a plane that the two GPS FIG. 28, reference 11, & 12 antennas are points and make up a base line through the vertical centerline of the SPV FIG. 4, reference 451. The third point in the Base Vertical Plane is determined by the attitude instrument 114, FIG. 1 and FIG. 4, reference 452 also on the SPV frame FIG. 3, reference 4. The top of the structural frame of the SPV FIG. 28, reference 3 makes up a Base (reference) Horizontal plane that is perpendicular to the Base Vertical Plane FIG. 4, reference 453.
   e. The bottom of the matrix 596 (FIG. 26) is a fixed distance from the top frame plane and is near the ground FIG. 4, reference 454. The top plane is a distance above the top frame such that the maximum height that can be reached by the robot arm is within the Matrix FIG. 4, reference 455.
   f. The Outside Vertical Plane is farthest from the machine must include the maximum reach of the robot arms and be the maximum width of the tree row. The fixed parts of the SPV FIG. 28, reference 3 are fixed on the matrix FIG. 4, reference 456.

The GIS Storage FIG. 5, reference 474, will have an automatic back up FIG. 5, reference 472 to provide for secure storage.

FIG. 6, is a flow diagram for generation of the Pick Path. The Setup FIG. 6, reference 478, and Pruning FIG. 6, reference 479, is complete. FIG. 6 must be completed before Pick FIG. 6, reference 480 can be started. GIS, FIG. 1, reference 140 is used to provide and collect data for the Pick Path Algorithm generation FIG. 6, reference 482, to CBCS FIG. 6, reference 492. GIS FIG. 6, reference 489, is used to provide datum to CBCS FIG. 6, reference 484, and save the Pick Paths FIG. 6, reference 486, for each tree in the GIS database. The Tree Datum is retrieved from Storage FIG. 6, references 489, 482. The VBSI is processed and converted to GPS points. Additional information about the variety of fruit that the tree produces is retrieved from Storage FIG. 6, reference 484. Pick Paths are generated by CBCS FIG. 6, reference 494, and saved to GIS FIG. 6, reference 486. CBCS determines when the tree is completed FIG. 6, reference 496. A flag is set when the Pick Paths are completed for each tree FIG. 6, reference 488. If all the flags are set yes FIG. 6, reference 490, the process is returned Home FIG. 6, reference 481. If all the flags are not set then the decision is NO FIG. 6, reference 490, the process is returned to process the next tree.

Figure 7:
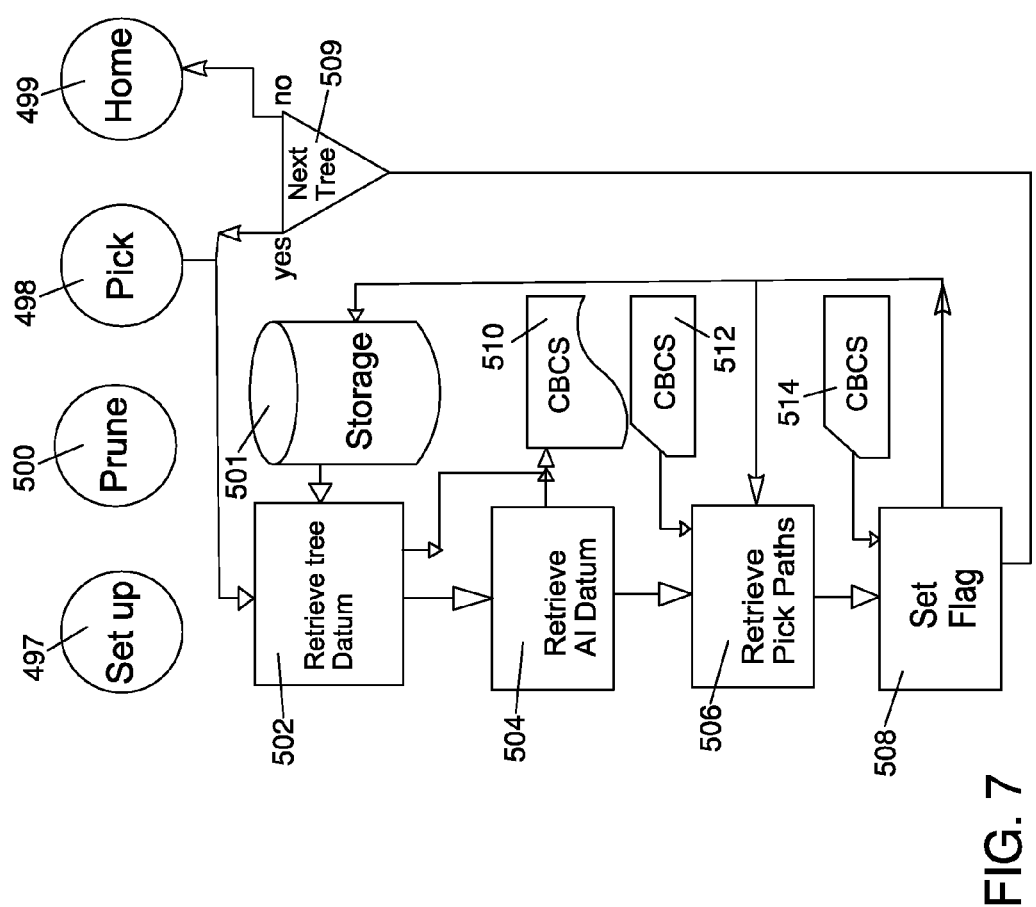
FIG. 7 is a flow diagram for GIS system.

FIG. 7, is a flow diagram for generation of the Pick FIG. 7, reference 498. The Setup FIG. 7, reference 497, and Pruning FIG. 7, reference 500, is complete. FIG. 6 must be completed before Pick FIG. 7, reference 498, can be started. GIS FIG. 1, reference 140 is used to provide data and collect data during harvesting FIG. 7, reference 501. GIS FIG. 7, reference 502, retrieves the machine matrix from storage and inputs CBCS FIG. 7, reference 504. GIS FIG. 1, reference 140 retrieves the machine direction from storage FIG. 22, reference 925. GIS retrieves Pick Paths for the Tree ID FIG. 7, reference 506. Save harvest data collected by CBCS FIG. 7, reference 508 and set flag. If all the flags are set yes then next tree is NO FIG. 7, reference 509, the process is returned Home FIG. 7, reference 499. If all the flags are not set then the decision next tree is Yes NO FIG. 7, reference 509, the process is returned to process the next tree If all the flags are set yes FIG. 6, reference 490, the process is returned Home FIG. 6, reference 481. If all the flags are not set then the decision is NO FIG. 7, reference 502, the process is returned to process the next tree.

FIG. 12 is a flow diagram for the Digital Imaging System FIG. 1, reference 120, 130. The system is powered on with the on-switch FIG. 12, reference 500. There are two DIS's that provides digital images for each side of the machine. The DIS provides four different images of a tree from four different known locations on the top frame of the machine FIG. 12, reference 501. Based on knowing the distance between the cameras a 3-D image FIG. 12, reference 503, can be generated that will allow a vector based image starting from the known position of the Trunk Target FIG. 12, reference 503. This 3-D image is provided to CBCS FIG. 12, reference 525 for pruning and stored in GIS FIG. 12, reference 508. During Prune Mode FIG. 12, reference 510, there are three close-up Cameras one on each of the Robot Arms that are on the same side of the machine as the cameras FIG. 12, reference 512, 513 & 514. The close-up camera provide images FIG. 12, reference 511 that allows the DIS processor to Prune limbs FIG. 12, reference 515. During Pick FIG. 12, reference 520, the close-up cameras provide images to locate the fruit and move in on the fruit, locate and cut the stem FIG. 12, reference 516. This information is feed to the CBCS FIG. 12, reference 518, to provide the information for the Pick fruit algorithm. Images are also provided to the GIS FIG. 12, reference 519, to be stored for later use.

FIG. 8 is a flow diagram for RRS System 132, 124, & 136, 138. There are two RRS Systems, one on each side of the machine. The system is powered on by the power switch FIG. 8, reference 600. Each RRS system has two distance sensors FIG. 1, reference 132, 136 & 134, 138 which provides distance reading to objects on each side of the machine FIG. 8, reference 601. The tree targets will provide a high reflective target and this distance is collected for both sensors at the same time FIG. 8, reference 602. The distance between the sensors is known and using triangulation the perpendicular distance from the machine can be calculated FIG. 8, reference 603. Also at the distance that the sensor to the tree target is the same as the perpendicular distance then target can be placed on the machine matrix and determine the GPS location FIG. 8, reference 604. Other objects can also be located but require the operator to identify the object FIG. 8, reference 604. The RRS System is powered off shuts off power to the system FIG. 8, reference 620.

FIG. 9 is a flow diagram for Robotic Controllers FIG. 1, reference #1 or 170, reference #2 or 172, reference #3 or 174, reference #4 or 176, reference #5 or 180, and reference #6 or 782 reference #7 or 184 reference #8 or 186. There are four Left Side Robotic Controllers and four Right Side Robotic Controllers. In one embodiment, the controllers are the same so only one flow diagram will be shown for all of the controllers. The Robotic Controllers will have a calibration program FIG. 9, reference 810, a home program FIG. 9, reference 820, pruning pause program FIG. 9, reference 830, picking pause program FIG. 9, reference 840, Pruning Program FIG. 9, reference 850, Picking Program FIG. 9, reference 842, Manual Program FIG. 9, reference 870, and a Park program FIG. 9, reference 880.

The calibration program cycles the robotic arm through a series of absolute locations based on the matrix FIG. 9, reference 801, adjustments are made to the positions of the arms if the control points are off FIG. 9, reference 803. Once calibrated the arms are returned to the Home position FIG. 9, reference 820.

When the pruning mode FIG. 19 is selected then each of the arms are moved to the pruning pause position FIG. 9, reference 830. This pause position is a location for each arm that reduces the distance the arm moves between pruning paths. Pruning is started when the paths assignments are completed to each robot arm and interlocks are clear FIG. 9, reference 850. The paths are loaded into the robot controller FIG. 9, reference 831. The paths are executed FIG. 9, reference 832. The controller determines if the paths are complete; If no, then the controller returns to load next path; if yes, then the control is returned to Prune Pause FIG. 9, reference 830.

When the picking mode FIG. 22, reference 937 is selected then each of the arms are moved to the Pick Pause position FIG. 9, reference 840.

This pick pause FIG. 9, reference 840 position is a location for each arm that reduces the distance the arm moves between pick paths. Picking is started when the paths assignments are completed to each robot arm and interlocks are clear FIG. 9, reference 842. The paths are loaded into the robot controller FIG. 9, reference 843. The pick paths are executed and the find fruit "do loops" are executed FIG. 9, reference 846.

The manual switch FIG. 9, reference 870 allows manual control through the operator interface and the joystick control FIG. 1, reference 104. The park mode switch puts the robot arms in the Park position FIG. 9, reference 880. The shutdown switch FIG. 9, reference 890 puts the robotic arms in the Park position and set brakes so the system can be parked or transported.

1. The robotic arms FIG. 28, reference 30, 31, & 32 are programmed links that provide for the instant location of the robot arms 457 FIG. 26, in the Matrix FIG. 26 reference 596.
   a. All points of the matrix will include the absolute GPS location calculated from the GPS FIG. 1, reference 140 and attitude data FIG. 4, reference 452.
   b. Also any object located at this GPS point will be indicated as the SPV FIG. 28, reference 3 moves down the tree row FIG. 5, reference 444.
   c. The Vector Based Image of the tree is also located at the GPS locations FIG. 4, reference 463 The GIS setup FIG. 4, reference 400 is only required once for an orchard and then can be used year to year.
   d. Additions, deletions and revisions can be added each year.
2. Robotic Control system will control a robot arm with 3 horizontal pivots and one vertical Pivot point and including the end effector will have 4 to 5 degrees of freedom.
   a. The Controller will consist of single board computers or a commercial robotic controller that will control electrohydraulic servo valve (EHSV) or proportional valves as needed. The valves will control flow to hydraulic cylinders that will control the movement of each arm section around the pivot point.
   b. A feedback loop is provided by linear position sensors provided as part of the cylinders.
   c. The hydraulic cylinders will be commercial equipment and will be Intellinder Position Sensor Hydraulic Cylinders by Parker@ or equivalent product.
   d. Control 4 pivot axis
   e. The control valves will be Eaton CMA Advanced Mobile Valve with Independent Metering or equivalent product.
   f. The single board Computers will be a Raspberry Pi or equivalent product.
3. The Robot arm controller FIG. 9 will run with a minimum of six algorithms loaded. There will be a Shutdown program FIG. 9, reference 890, a Start program, FIG. 9, reference 800, a Park program, FIG. 9, reference 880, a Home program, FIG. 9, reference 820, a Calibrate program FIG. 9, reference 810, that will be standard for the robot arms. It will have a manual program FIG. 9, reference 870, a Pick Program FIG. 9, reference 842, and a Pick Pause Program, FIG. 9, reference 830.
   a. The Shutdown Program will position the robot for transport, and proceed through a safe shutdown sequence including setting safe locks.
   b. The Startup Program will start a warning alarm, check interlocks, and release locks.
   c. The Home program will move the robotic arms to the home position for the robotic arms.

d. The Park Program will move the robotic arm to a position to allow the machine to be turned around at the end of row or in preparation for shutdown.
e. The Calibration Program sequences the robotic arms about the home position to allow for adjustments in the calibration of the sensors.
f. The Manual Program will allow the machine to be manually controlled through the Joy stick
g. The Pick Program loads the previously generated program stored in the GIS and determines the movements for each hydraulic cylinder and positions of the linear sensors for each effector GPS location. At the interrupts, the program is turned over to the Pick Program. When the Pick Program completes its sequence, the control is turned back to the Pick Path Program.

The operator will be asked to assess the order the pick paths are assigned to the robotic arms, and will have an opportunity to re-assign a pick path to the Left Robotic Controller #1, Left Robotic Controller #2, Left Robotic Controller #3, or for the other side of the SPV for the Right Robotic Controller #4, Right Robotic Controller #5, or Right Robotic Controller #6, as appropriate FIG. 22, reference 927.

4. The pick-path for the robot arm will be a series of locations that each axis of the robot arm is to be at to maintain the end effectors at its Global Position location as it moves from point to point along the pick path. This will be handled by the robot controller with positional feedback on each axis of the robotic arm. Each Robot controller will start the pick path when the VBSI positions are in the bounds of the GPS locations in the matrix FIG. 26 reference 596.
   a. When Interrupt is encountered in the Pick Path Program FIG. 9, reference 1155, then the operation is turned over to the Pick Program FIG. 9, reference 1153.
   b. When a robotic arm has finished with the current tree the CBCS FIG. 9, reference 843 will check to see if this is the last tree in the row FIG. 9, reference 848, and if no will return and load the paths for the next tree in the row FIG. 9, reference 844.
   c. If the tree is the last tree in the row FIG. 9, reference 848, then if is yes, the robotic arm is sent a Pause signal as each arm completes its current assigned pick paths FIG. 9, reference 848.
   d. When the last Pick path is completed the machine stops and returns the mode to manual FIG. 9, reference 870.

5. The Pick Program FIG. 9, reference 1153, moves from the interrupt location and looks for the apple FIG. 9, reference 850, and moves toward the apple based on small adjustments from the Pick camera until the fruit drops. The effector is then returned to the interrupt position FIG. 9, reference 856, checks for another apple. If an apple is detected it is also picked. When no apple is visible FIG. 9, reference 852, then the control is returned to the Pick Path Program FIG. 9, reference 844. The program may have options selected to no pick if size is small, or if color is not correct.

6. The operator will be asked to assess the order the pick paths are assigned to the robotic arms, and will have an opportunity to re-assign a pick path to the Left Robotic Controller #1, Left Robotic Controller #2, Left Robotic Controller #3, or for the other side of the SPV FIG. 1, reference 3, for the Right Robotic Controller #4, Right Robotic Controller #5, or Right Robotic Controller #6, as appropriate FIG. 21, reference 909.

Figure 29:
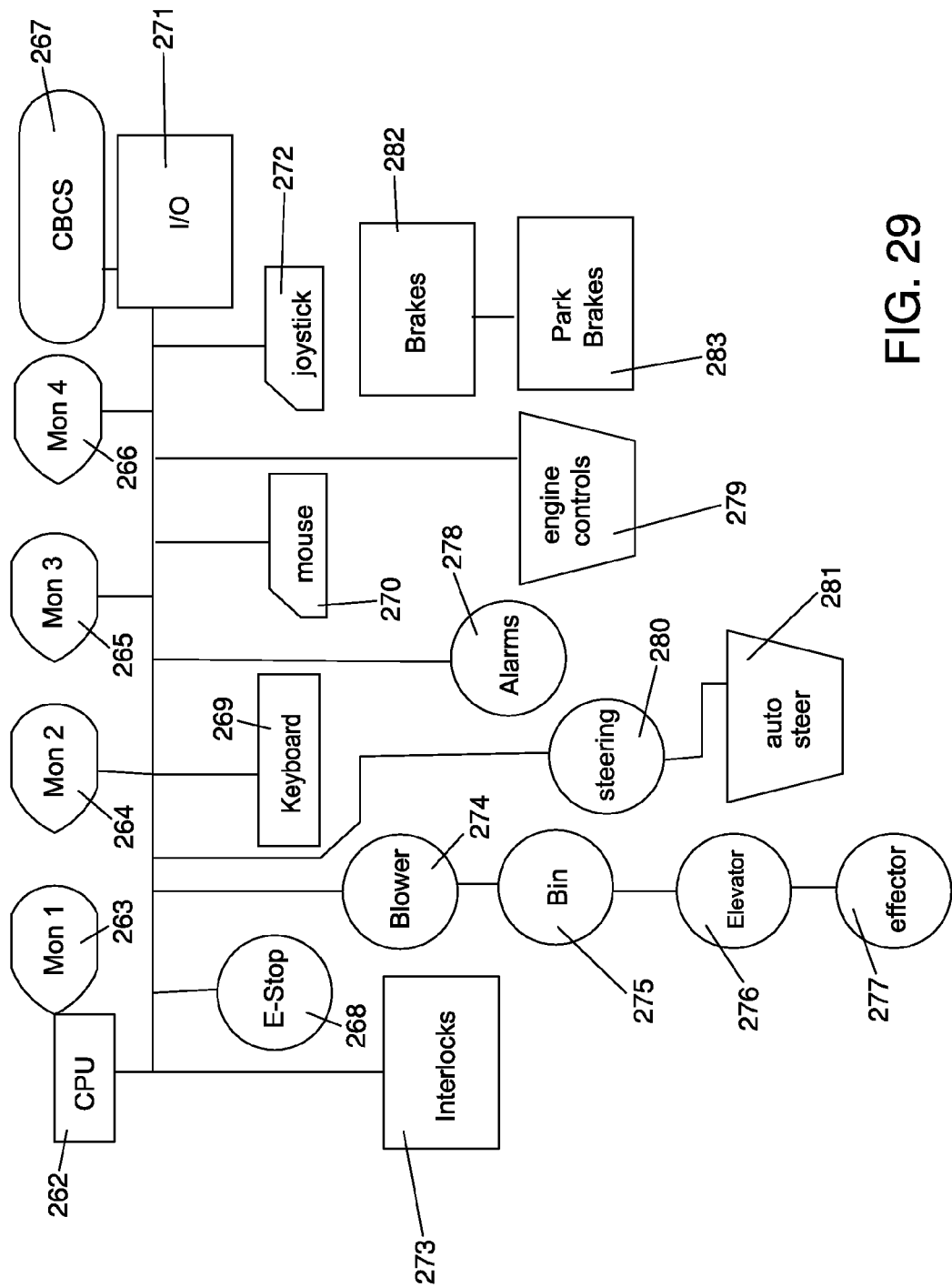
FIG. 29 is a flow diagram for operator interface.

FIG. 29, is a flow diagram for Operator Interface FIG. 1, reference 106. The Operator interface FIG. 9, reference 106, allows the Operator to operate the machine and enter the appropriate System manual inputs FIG. 19, reference 700, or FIG. 22, reference 922. There are also the interlocks FIG. 37, reference 701 and emergency overrides or emergency stops FIG. 37, reference 702. The Operator Interface FIG. 1, reference 106, will have a computer with four monitors FIG. 3, references 240, 242, 246, & 248, a Keyboard, FIG. 3, reference, 208, mouse pointer, FIG. 3, references 216 and joystick control FIG. 3, references 210. Hard wired alarms FIG. 29, reference 276, and interlocks FIG. 29, reference 273 that prevent the machine from operating when personnel are around the robotic arms is also part of the instrument panel. Also brakes FIG. 29, reference 282, parking brake FIG. 29, reference 283, engine controls FIG. 29, reference 279, will be provided on an instrument panel. The steering FIG. 29, reference 280, and auto steer interface FIG. 29, reference 281, will be part of the operator interface. On/Off switches for Blower FIG. 29, reference 274, Bin Loader FIG. 29, reference 274, Alarms, FIG. 29, reference 278, Elevator FIG. 29, reference 276, and end effector FIG. 29, reference 277.

Automated Pruning Control Systems

Set Up for Pruning

Configure the machine for pruning by removing Stem cutters and vacuum hoses and installing the power pruner assemblies. The machine is configured for pruning as shown in FIG. 2 and FIG. 5.

The setup steps in preparation for pruning start when the fabrication of the robot arms with a commercial fabricator. The robotic arms are installed on the SPV 3 on mounting systems that allows for the arm to be adjusted for the row width in the orchard and the heights of each arm to reach the desired area of the tree. The Robotic Arm width is set to where the end effector cutter can reach the center line of the orchard row. The power pruner end effector is required to be installed on the robotic arm and the electrical for the camera and the hydraulics to be connected and the air blead out of the system.

The robotic arm is then exercised through its range of motions and the position sensors are calibrated so that the accuracy of the cutter position is known and the home position of the arm is located within the known reference to the GPS Antenna locations. If the calibration program does not result in the arm being in the home position so that the home positions are indicated, then adjustments must be made and the calibration rerun. Once the Calibration is completed the robot arm is positioned at the home position. From the home position, the robotic arm controller can be switched to the Park shut down or switched to the prune position by the CBCS.

Set Up GIS for Pruning

Global Information System (GIS) set up. Disclosed in FIGS. 4,5. Store elements in the database to be utilized for pruning.

Relational Database. Commercial Data Base or Global Information Data Base

Items input into the data base:
   select an area of an orchard to be pruned.

go to google map or other global mapping system and get GPS coordinates by selecting the corners of area selected gives three coordinates, longitude, latitude, and elevation for each corner google map also provides acreage of the selected area.

save by manual or exporting the four data points on to the database.

counts rows either from actually being in the selected area or from google map.

generate GPS locations of the ends of each row (maybe called bookmarking the ends of the row); alternative way takes GPS receiver (for example, cell phone) to each end of rows and record the GPS location and for both ends and save to database.

create a matrix, FIG. 26 reference 596, in database which is defined as a three-dimensional set of data points for a three-dimension space, and the three-dimension space as we will define it is distance from centerline of SPV 3 to centerline of row, and a height distance of tallest plant.

distinguish the data points of the three-dimension space that include SPV 3 (red data points) versus the data points that do not include the SPV 3 (blue data points).

build a first subset of the blue data points that represent the three-dimensional space that can be occupied by the robotic arms.

build a subset of the first subset which represents the space of the first subset that the robotic arm can operate.

Run GIS program which results in determining distance from centerline of SPV 3 (at a perpendicular angle) to all data points of the matrix FIG. 26 reference 596.

Set Up CBCS for Pruning

CBCS FIG. 1. 102, is a Block Diagram of the CBSC

CBCS 102 is Set Up for Pruning as Described Below

The CBCS FIG. 1, is a computer based digital system (CPU). The systems are all connected by a main buss FIG. 3, references 118, that networks the systems together. Ether net and/or universal serial bus will be used to connect the Systems together. The Industrial computer will be mounted into a protective Cabinet. The cabinet will be air conditioned, have battery backup and regulated power. Power will be provided by a generator on the SPV. Four touch screen monitors will be mounted in the operator cab along with Emergency Stop Button, Keyboard, Mouse, Joy Stick, hard wired interlocks. Also, engine controls, brakes, park brakes are mounted and provided as part of the SPV. Additional switches and controls will be installed on a panel in the operator cab for turning on and off the vacuum blower, turning on and off the bin loader, turning on and off the fruit handling system and fruit elevator, and turning on an of the power to the end effector. The CBCS FIG. 3, references 102 provides the integration function of interfacing the other systems to accomplish task of pruning.

An Operating System (Windows, UNIX) is Installed on the CBCS

When the CBCS FIG. 1, references 102 is turned on the Operating system is booted and a computer program is loaded and runs a program that generates the screens for the control monitors. A number of operator interfaces are created to allow an operator with minimal training to operate the Pruner/harvester. The Main operator screen will allow the operator to select a number of modes of operation. These will include but not limited to Manual Mode, Prune Mode, Pick Path Generation Mode, Pick Mode, Home Mode. The mode selected will load the specified programs and the desired Operator interface screens for the Mode selected. The operator will select the Manual Mode if the CBCS is not already in the Manual Mode. This will load the operator interface screens required for manual operations, enable the controls required for manual operations, including the joystick, the RRS, DIS, GPS, Robotic Controllers. The Operator will release the brakes and operate the SPV FIG. 28, reference 3 to drive to the desired location in the orchard. The operator will determine the starting row to start or continue pruning of a Block. The operator will align the SPV FIG. 28, reference 3, beside the row or between the two rows that are to be pruned. Once the machine is aligned and initialized the operator then checks that all interlocks are good and selects the mode for the auto-pruning operation. This completes the setup steps for the CBCS.

Set Up Steps for GPS for Pruning

See FIG. 14 and FIG. 15: GPS Flow Diagram

A commercial GPS auto steering system like the Trimble® Autopilot™ automated steering system provides integrated, high-accuracy steering in any field type-hands free. The Autopilot system automatically steers your vehicle on line for maximum precision. The Autopilot™ operate at higher efficiency by using the Autopilot system, and stay on line, all the time. When your vehicle is offline, the Autopilot system signals it to adjust its position to follow the correct path—no matter the field pattern or terrain type-so you can focus on the job ahead of you. Autopilot system integrates directly into your vehicle's hydraulics, allowing you to obtain clear access to cab controls. It also plugs into many guidance-ready vehicles, minimizing the need for additional equipment. This or equivalent automated steering equipment. Is installed during assembly of the SPV FIG. 28, references 3 and interfaced to the CBCS FIG. 1, references 102 to provide Global position of the two antennas on a continuous basis.

The setup is based on instructions from the manufacture of the automated steering system. The GPS System will be turned on either by the operator or by the CBCS FIG. 15, reference 200, when the SPV is started. The operator will follow the instruction provided by the GPS manufacture on the GPS control Panel to set the auto steer FIG. 15, reference 204. in the line between the rows. The two antenna FIG. 15, reference 213 & 215. will receive the signals from the Global Position Satellites. The GPS will provide continuous GPS location to CBCS FIG. 15, reference 202. and GIS FIG. 15, reference 203.

Setup of the Robot Ranging System (RRS) for Pruning

Disclosed in FIG. 8 RRS Flow Diagram Setup is Described Below

Two Robot Range Sensors FIG. 1, references 130, 140, are mounted low on the SPV FIG. 28, references 3 and toward the front end of the SPV. The sensor needs to measure distance in a range of 2 feet to 6 feet. The accuracy needs to be + or −½ inch. The distance to the tree target is determined.

Configure the machine for pruning by removing Stem cutters and vacuum hoses and installing the power pruner assemblies. The machine is configured for pruning.

Setup the Robotic Controller for Pruning

Disclosed in FIG. 9 Robotic Controller Flow Diagram Setup is Described Below

FIG. 10 is a Block diagram for the Robotic Controller. The Robotic Controllers FIG. 10, reference 806-809, communicates with the GIS Matrix FIG. 10, reference 805, to get all positions in GPS position format. The positions are converted to linear movements to provide to each link of the robotic arm. All the controllers for the robotic arm are the same so only one controller is described in the Block diagram. Four Robotic controllers are shown in FIG. 10, reference 806, 807, 808, & 809 which would make up one side of an 8-arm machine. The apparatus is shown for only Robotic Controller #1 FIG. 10, reference 806, It has controls for six servo valves FIG. 10, reference 821-826, that operate up to six hydraulic cylinders FIG. 10, reference 811-816.
The Robotic Controller #1 FIG. 10, reference 806, receives input from position sensors FIG. 10, reference 831-836, that indicates the position of each cylinder. There is a close-up camera FIG. 10, reference 860-864, on each end effector to guide the arm.

The Robotic arm consists of a series of links that are made up of light rigid material such as aluminum, or strong plastics. The pivot points will be steel shafts and steel or aluminum sleeves with lubricated brass busing or roller bearings. The actuators will be hydraulic cylinders that are proven in the Agricultural industry. The cylinders will have position sensing associated an integrated with the cylinders. The maximum reach of the robotic arm can be either five feet or six feet standard reach, with special length end effectors as necessary. Standardized connectors will be used to connect the end effector to the end of the robotic arm. Each cylinder will be positioned by an electrohydraulic servo valve. The servo valve is positioned by inputs from the robotic arm controller. The hydraulic cylinders will be Intellinder Position Sensor Hydraulic Cylinders by Parker@ or equivalent product. The travel of the cylinders will be the travel of each pivot by design.

The robotic arms FIG. 28, references 30, 31, & 32 are programmed links that provide for the instant location of the robot arms in the Matrix FIG. 26, reference 287.

All points of the matrix FIG. 26 reference 596, will include the absolute GPS location calculated from the GPS FIG. 1, reference 124 and attitude data FIG. 1, reference 114.

Also, any object located at this GPS point will be indicated as the SPV FIG. 28, references 3 moves down the tree row FIG. 5, reference 444.

The Vector Based Image of the tree is also located at the GPS locations FIG. 64, reference 456 The GIS setup FIG. 4, reference 400 is only required once for an orchard and then can be used year to year.

Additions, deletions and revisions can be added each year.

Robotic Control system will control a robot arm with 3 horizontal pivots and one vertical Pivot point and including the end effector will have 4 to 5 degrees of freedom.

The Controller will consist of single board computers or a commercial robotic controller that will control electrohydraulic servo valve (EHSV) or proportional valves as needed. The valves will control flow to hydraulic cylinders that will control the movement of each arm section around the pivot point.

A feedback loop is provided by linear position sensors provided as part of the cylinders.

The hydraulic cylinders will be commercial equipment and will be Intellinder Position Sensor Hydraulic Cylinders by Parker@ or equivalent product.

Control 4 pivot axis

The control valves will be Eaton CMA Advanced Mobile Valve with Independent Metering or equivalent product.

The single board Computers will be a Raspberry Pi or equivalent product.

The Robot Arm controller will run with six algorithms loaded. There will be a Shutdown program FIG. 9, reference 890, a Startup program FIG. 9, reference 800, a Park program FIG. 9, reference 880, a Home program FIG. 9, reference 820, a Calibrate program FIG. 9, reference 810 that will be standard for the robot arms. It will have a Manual Program FIG. 9, reference 870, a Picking Program FIG. 9, reference 842, and a Pick Apple FIG. 9, references 864-867.

The Shutdown Program FIG. 9, reference 890 will position the robot for transport, and proceed through a safe shutdown sequence including setting safe locks.

The Startup Program FIG. 9, reference 810 will start a warning alarm, check interlocks, and release locks and pressurizes the hydraulic system. And move each pivot approximately 1-2 inches and back to show operability.

The Home program FIG. 9, reference 820 will move the robotic arms to the home position for the robotic arms.

The Park Program FIG. 9, reference 880, will move the robotic arm to a position to allow the machine to be turned around at the end of row or in preparation for shutdown.

The Calibration Program FIG. 9, reference 810 sequences the robotic arms about the home position to allow for adjustments in the calibration of the sensors.

The Manual Program FIG. 9, reference 870, will allow the robotic arms to be manually controlled through the Joy stick to the Eaton CMA Advanced Mobile Valve with Independent Metering or equivalent product.

The Picking Program FIG. 9, reference 842 loads the previously generated program stored in the GIS and determines the movements for each hydraulic cylinder and positions of the linear sensors for each effector GPS location provided by the Pick Path FIG. 9, reference 846. At the interrupts the program is turned over to the Pick Apple FIG. 9, reference 850-856. When the Pick Apple completes its sequence the arm is returned to the interrupt position and control is turned back to the Picking Program.

The pick-path for the robot arm will be a series of locations that each axis of the robot arm is to be at to maintain the end effectors at its Global Position location as it moves from point to point along the pick path. This will be handled by the robot controller with positional feedback on each axis of the robotic arm. Each Robot controller will start the pick path when the VBSI positions are in the bounds of the GPS locations in the matrix.

When Interrupt is encountered in the Path sequence FIG. 9, reference 844, then the operation is turned over to the Pick Apple sequence FIG. 9, reference 850-856.

When a robotic arm has finished with the current tree the CBCS FIG. 1, references 102 will check to see if this is the last tree in the row and if no will return and load the paths for the next tree in the row FIG. 22, reference 931.

If the tree is the last tree in the row, then if is yes, FIG. 22, reference 931, the robotic arm is sent a Home signal as each arm completes its current assigned pick paths FIG. 22, reference 932.

When the last Pick path is completed the machine stops and returns the mode to manual FIG. 22, reference 922.

The Pick Apple FIG. 9, references 850-856 receives control from the Picking Path Program. The Look for Apple FIG. 9, references 850, requests the DIS to find apples and the close up-camera obtains images FIG. 9, reference 850. The program looks for the proper color and if detected then it knows there is an Apple in view. It Puts a circle around the area of proper color and determines the center. It sends movements to the robot controller to center the circle in the cameras view and moves from the interrupt location and moves toward the apple based on small adjustments from the DIS close-up camera until the fruit drops FIG. 9, reference 844. The effector is then returned to the interrupt position FIG. 9, reference 844, checks for another apple. If an apple is detected it is also picked. When no apple is visible then the control is returned to the Load Path FIG. 9, reference 844. The program may have options selected to no pick if size is small, or if color is not correct.

The operator will be asked to assess the order the pick paths are assigned to the robotic arms, and will have an opportunity to re-assign a pick path to the Left Robotic Controller #1, Left Robotic Controller #2, Left Robotic Controller #3, or for the other side of the SPV for the Right Robotic Controller #4, Right Robotic Controller #5, or Right Robotic Controller #6, as appropriate FIG. 22, reference 927.

The setup steps in preparation for pruning start when the fabrication of the robot arms with a commercial fabricator. The robotic arms are installed on the SPV 3 on mounting systems that allows for the arm to be adjusted for the row width and of the orchard and the heights of each arm to reach the desired area of the tree. The Robotic arm width is set to where the end effector cutter can reach the center line of the orchard row.

The power pruner end effector is required to be installed on the robotic arm and the electrical for the camera and the hydraulics to be connect and the air blead out of the system. The robotic arm is then exercised through its range of motions and the position sensors are calibrated so that the accuracy of the cutter position is known and the home position of the arm is located within the known reference to the GPS Antenna locations. If the calibration program does not result in the arm being in the home position so that the home positions are indicated, then adjustments must be made and the calibration rerun. Once the Calibration is completed the robot arm is positioned at the home position. From the home position the robotic arm controller can be switched to the Park shut down or switched to the prune position by the CBCS.

Configure the machine for pruning by removing Stem cutters and vacuum hoses and installing the power pruner assemblies. The machine is configured for pruning.

Set Up GIS for Pruning

A three-dimensional Matrix FIG. 26 reference 596, is the center of the Mapping System for the Robotic Pruner and Harvester. The matrix FIG. 26 reference 596, data points are mapped in GPS units which provides an Absolute Data reference regardless of the machine that the Matrix FIG. 26 reference 596, is on. This makes the data interchangeable between machines. The data points consist of the global position numbers of Latitude; Longitude; and Elevation. The matrix is a 3-dimensional virtual rectangular box of which, one vertical plane surface makes up a plane and a perpendicular horizontal plane surface that the two GPS FIG. 1, reference 122 &126, antennas are reference points. The mapping system will reside in the GIS System since it will contain a large number of arrays that will need to be updated on a continuous basis.

a) Input for Vector Based Stick Image for Pruning

The method to locate the tree in the matrix FIG. 26 reference 596, utilizes vector graphics to place objects in the matrix at the proper locations. The method utilizes a Vector Based Stick Image (VBSI) of the tree trunks, branches and limbs that is generated from stereo images of the tree, or several single images from known locations when the tree is dormant. A VBSI is an image of the tree trunk, branches, and limbs is defined by a series of vectors and points in 3-D space. The image starts at the base of the trunk as the first point with a line (vector) to the next point going up the trunk. A series of short lines connecting points that is located at the mid-point of the diameter of the trunk as one progresses up the trunk until the trunk become less the ½ inch in diameter. Then starting at the line on the trunk a series of lines and points are determined for each branch coming from the trunk. When completed a stick image is generated of the tree trunk, branches and limbs using only a series of points (x,y,z) connected by vectors. Once the VBSI is created for a tree the tree can be placed in the matrix FIG. 26 reference 596, by locating the starting point on the tree trunk in the matrix space.

The GIS FIG. 1, reference 140 provides a method to store all the data based on geospatial location. The GIS FIG. 1, reference 140 provides for a database file that contains all the data collected and stored under a file Name for an orchard FIG. 4, reference 402. FIGS. 4-7 are the flow diagram for GIS System FIG. 1, reference 140. The GIS 40 requires an initial setup FIG. 4, reference 400 prior to putting the machine into the orchard FIG. 4, reference 401. The database fields are setup for all the fields of images and data that can be collected for the orchard FIG. 4, reference 406. The orchard is shown on a base map that provides an image and area of the orchard FIG. 4, reference 402. The blocks of trees of the same fruit variety is added as a layer and mapped FIG. 4, reference 403. The data fields are added to record all the data for each side of the trees to be pruned FIG. 4, reference 405. Finally, the tree rows are added as a layer and mapped FIG. 4, reference 404.

GIS Setup is continued in FIG. 5. This data is entered by the operator at the orchard. It can be loaded from the data already stored in GIS 140.

Enter Knowledge Based Engineering Data for
Orchard being Pruned

Provide data and rules for the layout of the orchard
V trellis
  Row spacing (Range 8 ft to 15 ft)
    actual spacing is selected
  Trellis height (Range 6 to 15 ft)
    actual height is selected
  Trellis angle
    Angle is determined by triangulation of ½ width and height
  Wire spacing (12 in to 36 inches)
    Wire Spacing is selected
  Wire size
    Select from pull down list of gauges or diameters
  Wire material
    Aluminum, steel, SS steel, other
  Trellis pole spacing
  Trellis pole types
    dia shape
    Trellis Pole Material
      Wood, steel, plastic
Straight trellis
  Row Spacing
  Trellis height
  Wire Spacing
  Trellis pole spacing
  Trellis pole types
  Trellis pole Material
Fruit type
  Apple
  Pear,
  Cherry
  Peach
Fruit variety
  Apple Varity
    Granny smith
    Fuji
    Gala
Provide data and rules for picking each fruit variety
Blossom set location
  Limb tip
  Spur
  Both limb tip & spur
Other data apples, pears, cherries
Provide data of number of apples per fruit location
Granny Smith; 1 to 4 apples/bud
Fuji; 1 to 3 apples/bud
Gala; 4 to 6 flowers/bud
Other data
Provide data
  Data of fruit bud images for image recognition algorithm
  Grammy Smith apples
  Fuji apples
  Gala apples
  Provide data and rules for apple zones
  Provide data and rules for outer profile of tree for trellis type, fruit variety,
    Fruit Zones
      Cylindrical
      Square
      Rectangular
      Trapezoid
      Cylinder
      Free style Provide fruit handling properties
  Skin thickness and toughness
  Puncher resistance
  Bruising pressures
  Stem properties
  Length
  Diameter
  Toughness
This data is generally only required once at the first time the orchard block is pruned. All this information is stored in the database fields on the hard drive of the GIS.

Set Up DIS for Pruning

FIG. 12 DIS Flow Diagram

Install four commercial digital cameras with proper lenses on the mounting points provided on the SPV 3. Connect the Power cables to the SPV Power Supply. Install the Graphics Processor Unit (GPU) into the protective cabinet on the SPV 3. Connect the video cables to the image processor inputs. Connect the output cable to the CBCS and GIS via the either net. Connect the Image processor to Power. The DIS will have the imaging processing programs installed into the GPU which will be an embedded System with CBCS as it Host. This is accomplished at installation of the DIS FIG. 1, references 120, & 130 equipment.

The DIS FIG. 1, references 120, & 130 will be capable of recording video, still photos or frame grabs from video. The image will have a recorded date & time and location from the GPS.

Figure 16:
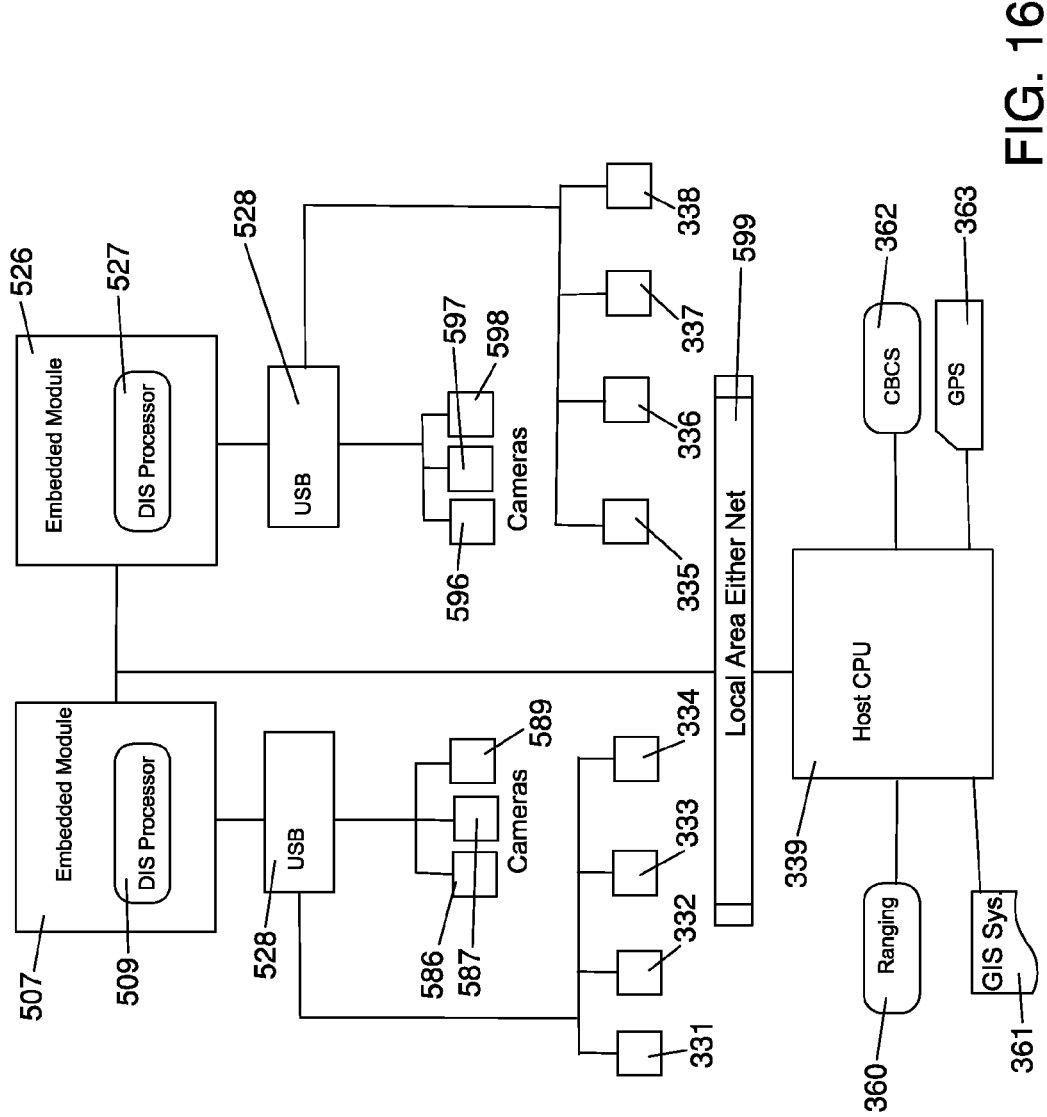
FIG. 16 is a block diagram of the DIS System

FIG. 16 is a Block Diagram of the DIS. There are two Embedded System modules FIG. 16, reference 507 & 526 that will house the DIS Processor FIG. 16, reference 509 & 527, one for each side of the machine. The DIS processor FIG. 16 reference 509 & 527, for each side will process the camera for the same side of the machine. These include Cameras FIG. 16, reference 331-334, and 335-338. FIG. 28, reference 53-59. They also include the close-up cameras FIG. 16, reference 586, 587, 589 and 596, 597, 598. The DIS processor FIG. 16, reference 509 & 527, for each side will connect to the cameras through USB system FIG. 16, reference 528.

The Embedded module will connect through the Local Area Network FIG. 16, reference 599, to a Host CPU FIG. 16 reference 339. The Host CPU will communicate with Ranging FIG. 16 reference 360, GIS FIG. 16 reference 361, CBCS FIG. 16 reference 362, and GPS FIG. 16 reference 363.

Images will be collected based on inputs from the CBSC FIG. 16 reference 362.

The GPU will have a program called the Tree Stick Image Program installed that will process the individual images collected into Vector Based Stick Image (VBSI and save this image to the GIS FIG. 1, reference 140 as well and the High definition image to the GIS.

The Tree Stick Image Builder (TSIB) program is a program coded specifically for generation of VBSI of each tree. This is accomplished with a Jetson TX1 Graphics Processor Unit (GPU) The TSIB will utilize several Software Packages including but not limited to; C++, Python, OpenCV, Public libraries The program starts with a High Definition (HD) image of the tree collected by a camera mounted on the SPV FIG. 28, references 3. It can be a single image camera or a stereo image camera.

The image is first processed in where the back ground is turn to one shade of Blue.

This image is then processed using a Caney Algorithm that results in a edge detection of the edges of the tree.

Then this image is process generating a red or other single-color vector line starting at the trunk target and drawing a median line between the edges of the tree Caney image.

Then everything but the vector lines are converted to a white or black back ground.

This vector based image is saved as a vector file image.

The GIS FIG. 1, references 140, will also have a 3-D TSIB Program installed that will take at least two of the 2-D VBSIs and process them into a single 3-D VBSI.

This image will be Saved to GIS FIG. 1, references 140, and provided to the CBSC FIG. 1, references 102, for the final in fruit Zone pruning.

The 3-D VBSI is created from two 2-D VBSI using triangulation calculation and knowing the positions and distances. To obtain better accuracy a number of 3-D images can be generated of each tree and the averaged to get a more precise 3-D VBSI.

This image is stored in GIS FIG. 1, references 140 as well as provided to the CBCS FIG. 1, references 102 for the final pruning that is inside the fruit zone.

Set Up Steps for Operator Interface

Disclosed in FIG. 3, Operator Interface Flow Diagram

The components for the operator interface is installed in the operator cab during the assembly of the SPV FIG. 1, reference 3. It will be air condition and will also have the electronic protective cabinet installed. All the components will be installed in an ergonomic fashion to allow the operator easy access to all the controls for the Pruner Harvester.

FIG. 29 is a Flow Diagram of the operator interface.

The CPU FIG. 29, reference 262 controls the process of the operator interface consisting of relay switches for the that turns on or off systems or equipment. The visual interface will be the monitors FIG. 29, references 263, 264, 265, 266, 267. There will be a hard-wired Emergency Stop switch FIG. 29, reference 268, that will stop everything in place. An I/O interface FIG. 29, reference 271, will provide controls for controlling items that is more complex then a simple relay. A keyboard FIG. 29, reference 269, mouse, FIG. 29, reference 270, and joystick FIG. 29, reference 272 controlled by the CPU FIG. 29, reference 262, will provide for operator inputs.

A specific card that contains logic for the interlocks FIG. 29, reference 273, will interface with the CPU and prevent unsafe operations from occurring. Relays for turning on and off the Blower FIG. 29, reference 274, Bin Handler FIG. 29, reference 275, Elevator FIG. 29, reference 276, and end effector motor FIG. 29, reference 277, are available for the operator.

A separate panel provided by the GPS manufacture will provide controls for steering FIG. 29, reference 280, and auto steering FIG. 29, reference 281, that includes the steering wheel.

Also, a separate panel for the engine controls FIG. 29, reference 279, will be provided by the SPV manufacture. A brake pedal FIG. 29, reference 282, and a Park Brake FIG. 29, reference 283 will also be in the operator cab.

Steps for Pruning

The Operator Interface FIG. 1, reference 106 allows for the operator to set a number of variable parameters based on the fruit type, pruning parameters, and tree row spacing in the specific orchard. Note the CBCS FIG. 1, reference 102, will parallel process one to four or five trees on each side of the machine depending on the tree spacing set by the operator. Various operator overrides are set to allow the machine to be operated manually for turning around at the end of the rows, and transporting the machine from place to place.

The process flow for pruning is shown in FIGS. 19-20, PROCESS FLOW DIAGRAM FOR PRUNING MODE. With the machine in the manual mode FIG. 19, reference 700 the operator uses information provided by the GPS FIG. 1, reference 124, to manually align the machine to the center of two tree rows, or in the case of an edge row one sets the distance of the machine from the tree row. The operator initializes robotic arms FIG. 28, reference 30, 31, & 32 to the start pruning position FIG. 19, reference 701. The operator will then locate the first tree trunk on left side of the SPV FIG. 1, reference 3, by guiding the most forward left robotic arm FIG. 28, reference 30 to the starting position. The operator will do this task by operating the joystick FIG. 28, reference 14. Then the operator will locate the first tree on the right side of the SPV 3 by guiding the most forward robotic arm FIG. 28, reference 33 until the end effector just touches the target on the trunk of the first right tree. Note: the left side robotic arms are staggered ahead of the right side robotic arms on the machine.

Once the machine is aligned and initialized the operator then checks that all interlocks are good and selects the mode for the auto-pruning operation FIG. 19, reference 702.

Systems for Pruning

Computer Based Control System (CBCS/CPU)

The CBCS will determine the robotic paths FIG. 19, reference 706 and provide them to the robotic arms controllers FIG. 1, references 34, and 37. The CBCS will contain programs that have Knowledge Based Systems. The CBCS will utilize programs based on rule based programming and based on the knowledge based data stored the CBCS will determine the data and programs to be used by the different systems. The program will use information input into the system to create the controls for various aspects of the machine. The CBCS will set the forward speed for the machine and provide this information to the SPV steering and speed controller FIG. 19, reference 707 and request the machine to move slowly forward FIG. 19, reference 708. The CBCS will provide input into the other systems that provide for controls or processing during operation. The CBCS will provide the programs to the robotic arm controllers to accomplish the task needed. The robotic arms controllers FIG. 1, references 34 and 37 will prune or harvest the tree on each side of the machine.

Once the CBCS FIG. 1, reference 102 is notified that the paths have been completed by the robotic arm on either the left or right side of the machine it assigns the next task. The CBCS FIG. 1, reference 102, determines if this is the last tree in the row FIG. 20, 748. If no, the process returns to the next available tree, and if yes, the process returns to Home FIG. 20, reference 727.

Global Position System (GPS) for Pruning

The GPS FIG. 1, reference 124 will provide to the machine two global data points to orient the machine for harvesting. The two antennas are placed of the centerline of the SPV frame FIG. 28, reference 3. Each GPS antenna serves as a Global-Reference-Point for alignment of the SPV to the orchard rows. If the GPS also has the ability to measure orientation with Gyro system than only one antenna is required. The GPS provides location in Latitude and Longitude for each tree and the Identification of each tree is its location in Latitude and Longitude. All data is stored in a data base under the tree's ID.

Global Information System (GIS) for Pruning

GIS FIG. 1, reference 140 maintains an Global Position Database for the orchard.

(GIS) Database

The GIS database utilizes currently available database software that is in current use by the commercial industry. The software may be SQL, or Oracle and has the ability to contain large amounts of data. The database will be set up based on the structure of orchards. The ability of the database to maintain and manage the data for large numbers of individual trees is critical to the automation control process. The database will allow for improvements and expansion of the automation capabilities of the pruner harvester and allow other orchard equipment to develop around the information in the database.

Matrix Details for Robotic Pruner & Harvester

A three-dimensional Matrix 596 (FIG. 26) is the center of the Mapping System for the Robotic Pruner and Harvester. The matrix 596 (FIG. 26) data points are mapped in GPS units which provides an Absolute Data reference regardless of the machine that the Matrix 596 (FIG. 26) is on. This makes the data interchangeable between machines. The data points consist of the global position numbers of Latitude; Longitude; and Elevation. The matrix is a 3-dimensional virtual rectangular box of which, one vertical plane surface makes up a plane and a perpendicular horizontal plane surface that the two GPS FIG. 1, reference 122 &126, antennas are reference points. The mapping system will reside in the GIS System since it will contain a large number of arrays that will need to be updated on a continuous basis.

Input for Vector Based Stick Image for Pruning

The method to locate the tree in the matrix 596 (FIG. 26) utilizes vector graphics to place objects in the matrix at the proper locations. The method utilizes a Vector Based Stick Image (VBSI) of the tree trunks, branches and limbs that is generated from stereo images of the tree, or several single images from known locations when the tree is dormant. A VBSI is an image of the tree trunk, branches, and limbs is defined by a series of vectors and points in 3-D space. The image starts at the base of the trunk as the first point with a line (vector) to the next point going up the trunk. A series of short lines connecting points that is located at the mid-point of the diameter of the trunk as one progresses up the trunk until the trunk become less the ½ inch in diameter. Then starting at the line on the trunk a series of lines and points are determined for each branch coming from the trunk. When completed a stick image is generated of the tree trunk, branches and limbs using only a series of points (x,y,z) connected by vectors. Once the VBSI is created for a tree the tree can be placed in the matrix 596 (FIG. 26) by locating the starting point on the tree trunk in the matrix space.

The VBSI requires significantly less memory and much less data to locate the tree in the matrix. This makes processing during actual harvesting much faster.

Robotic Ranging System (RRS) for Pruning
Robotic Ranging System

Using the GPS FIG. 1, reference, data for the location of the machine and the distance from the RRS FIG. 8, reference 602, an absolute location is calculated FIG. 8, reference 604, and this absolute location will be the Identifying Number for the tree. Items that can be located by the RRS FIG. 28, reference 52, &56, are irrigation lines and sprinkler heads, trellis frames and wires. The RRS FIG. 8, reference 52, &56, will alarm on solid obstacles that get to close to the machine and request the operator through the operator interface FIG. 1, reference 106 to identify and note if the machine must avoid the obstructions FIG. 8, reference 604. These obstructions will also be associated with the tree identification in the GIS, FIG. 1, reference 140.

Digital Imaging System (DIS) for Pruning

Input for Imaging Processing to Obtain Vector Based Stick Image for Pruning

The method to locate the tree in the matrix FIG. 26 reference 596, utilizes vector graphics to place objects in the matrix at the proper locations. The method utilizes a Vector Based Stick Image (VBSI) of the tree trunks, branches and limbs that is generated from stereo images of the tree, or several single images from known locations when the tree is dormant.

GIS FIG. 1, reference 140 is used to provide data and collect data for pruning to CBCS FIG. 5, reference 460. FIG. 5 is the process flow diagram for GIS FIG. 1, reference 140 during pruning mode FIG. 19, reference 702. GIS FIG. 1, reference 140, will load the Matrix FIG. 26 reference 596, for the machine FIG. 5, reference 461. The TSI will be saved to the fields for the specific tree ID FIG. 5, reference 462. The VBSI will be saved to the appropriate fields for the tree FIG. 5, reference 463. The As-Pruned-Images will be saved to the appropriate fields FIG. 5, reference 464. The distance the tree is from the center line of the machine is saved FIG. 5, reference 465. Store the absolute tree location in the Primary field that for the tree ID FIG. 5, reference 466.

The GPU will have a program called the Tree Stick Image Builder Program installed that will process the individual images collected into Vector Based Stick Image (VBSI and save this image to the GIS FIG. 1, reference 140, as well and the High definition image to the GIS.

The Tree Stick Image Builder (TSIB) program is a program coded specifically for generation of VBSI of each tree.

"The Definition of a Vector: A vector is a mathematical quantity that has both a magnitude and direction. It is often represented in variable form in boldface with an arrow above it. Many quantities in physics are vector quantities."

DESCRIPTION

A VBSI is an image of the tree trunk, branches, and limbs is defined by a series of vectors and points in 3-D space. The image starts at the base of the trunk as the first point with a line (vector) to the next point going up the trunk. A series of short lines connecting points that is located at the mid-point of the diameter of the trunk as one progresses up the trunk until the trunk become less the ½ inch in diameter. Then starting at the line on the trunk a series of lines and points are determined for each branch coming from the trunk. When completed a stick image is generated of the tree trunk, branches and limbs using only a series of points (x,y,z) connected by vectors. Once the VBSI is created for a tree the tree can be placed in the matrix FIG. 26 reference 596, FIG. 32, reference 1045, by locating the starting point on the tree trunk in the matrix space.

Figure 32:
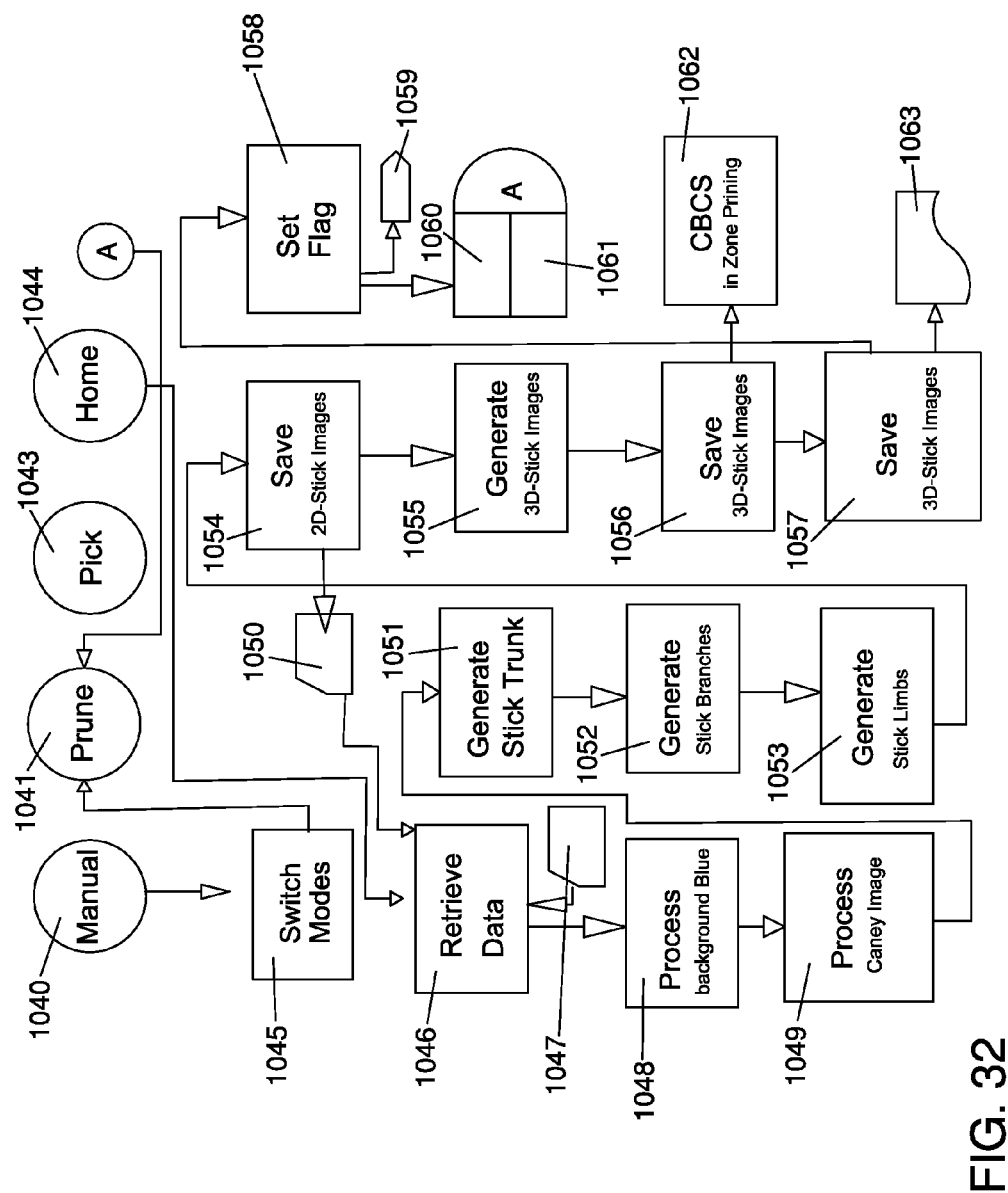
FIG. 32 is a flow diagram for the TSIB

The Tree Stick Image Builder (TSIB) program FIG. 32 is a program coded specifically for generation of Vector Based Stick Image (VBSI) of each tree. The program is written for a Graphical Processor Unit (GPU) to take raster based images of the tree and creates a vector image of the dormant Tree. The data is further reduced by creating a VBSI of just the tree.

Starting at a known location on the trunk of the tree and using vectors a map of a tree can be generated quickly and with a small number of data points to define the tree's major limbs and branches of the tree. The detail is enough detail to allow a pick path algorithm to be generated for the robotic system that uses vector based programming techniques to move the robotic arms. This greatly reduces the time to generate the necessary pick paths for the robotic arms to follow. When the vector-based-stick-image has its starting point at the tree trunk located in the absolute location of latitude, longitude, and elevation the tree and all its major limbs can be calculated in GPS location terms. This makes data collected by one machine easily used by another machine, and can be stored and recovered easily. The error associated by this process is on the order of +/− one half inch using today's technology.

Tree Stick Image Builder (TSIB) Process Flow Diagram

The function of the Tree Stick Image Builder (TSIB) program FIG. 32 is to use the data collected during the pruning process and previous years picking data FIG. 32, reference 1045, to generate the paths that the robotic arm will follow then stop and allow a second algorithm to see and cut the fruit from the tree. The function for generation of a pick path is based on the tree vector based stick image (VBSI) stored in the GIS that sets the rules for path generation. The pick-path programs will be generated for each tree pruned in the orchard. The paths will be stored in the same GIS system and shall be able to be recalled when the machine is starting to pick the fruit from a specific tree. The time frame to generate the large number of pick paths is to be accomplished between the end of pruning season and the start of the harvesting season for that variety of fruit.

The flow diagram is shown in FIG. 32, for the TSIB Software. This program will provide the methods to convert a raster based image of the tree into a vector graphics image and generate the VBSI in 3D-space. The TSIB software will process an image of the selected tree in a Graphics Processing Unit which is part of the hardware of the Control System. The machine is initially in the manual mode FIG. 32, reference 1040. The TSIB is loaded when the machine is switched to Prune Mode FIG. 32, reference 1041. The DIS retrieves previous data from GIS FIG. 32, reference 1050 if any or data FIG. 32, reference 1046 just collected during pruning from CBCS FIG. 32, reference 1047.

The Pick Mode FIG. 32, reference 1043, cannot be used for a tree until the TSIB has created a VBSI.

The GIS FIG. 1, reference 140 will also have a 3-D TSIB Program installed that will take at least two of the 2-D VBSIs and process them into a single 3-D VBSI. This also can be accomplished with the ZED stereo camera where a depth map is generated FIG. 32, reference 1055.

This image will be Saved to GIS FIG. 32, reference 1056 and provided to the CBSC FIG. 32, reference 1062 for the final in fruit Zone pruning FIG. 32, reference 1057. The 3-D VBSI is created from two 2-D VBSI using triangulation calculation and knowing the positions and distances. To obtain better accuracy a number of 3-D images can be generated of each tree and the averaged to get a more precise 3-D VBSI. This image is stored in GIS FIG. 32, reference 1063 as well as provided to the CBCS FIG. 32, reference 1062 for the final pruning that is inside the fruit zone.

Once the 3-D imaged is saved a flag is set FIG. 32, reference 1058, the flag is set in the GIS database FIG. 32, reference 1059 to indicate a VBSI exists for the tree identified. The next step is to check if more images need to be processed FIG. 32, reference 1060 an continue back to Prune FIG. 32, reference 1041, or if at the end of row then Gp To Home FIG. 32, reference 1061

Graphic Processing Units (GPU) for Pruning

The GPU's FIG. 1, reference 120 &130 will be either AMD or NIVIDIA graphics cards. CUDA is a parallel computing platform and application programming interface (API) model created by NVIDIA. It allows software developers to use a CUDA-enabled graphics processing unit (GPU) for general purpose processing—an approach known as GPGPU. The GPU's will be chosen to provide for parallel of images from the different cameras and image processing. The matrix map will also be process as a 3-D graphic image.

Cameras, for Pruning

The digital cameras FIG. 1, reference 132-136 & 150-154 shall be of the following Specifications:

Fixed lens digital cameras capable of photos and video. Resolution video, NTSP/PAL,1080p: 1920×1080p/30 fps/16.9 photo format JPEG 16MP, VGA and the processing speed shall be not less than 50 GHrz.

The on-board memory shall be at least 8 gigbites. Water Proof Industrial Housing with mounts.

Fixed lens close-up digital cameras capable of video. The close-up camera located on the end effectors shall be not less than resolution video, NTSP/PAL,1080p: 1920×1080p/30 fps/16.9 photo format JPEG 16MP, VGA and the processing speed shall be not less than 50 GHrz. and the focal length of the lens shall be from 3 inches to 18 inches. The on-board memory shall be at least 8 gigbites.

3-D stereo camera fixed lens, ZED 3D camera or another stereo camera may be selected. With its 16:9 native sensors and ultra-sharp 6 element, all glass lenses, you can capture 110° wide-angle video and depth. Capture 1080p HD video at 30 FPS or WVGA at 100 FPS and get a crisp and clear image.

Video

| Video Mode | Frames per second | Output Resolution (side by side) |
| --- | --- | --- |
| 2.2K | 15 | 4416 × 1242 |
| 1080p | 30 | 3840 × 1080 |
| 720p | 60 | 2560 × 720 |
| WVGA | 100 | 1344 × 376 |

Depth

Depth Resolution; Same as selected video resolution

Depth Range; 0.7-20 m (2.3 to 65 ft)

Depth Format; 32-bits
Stereo Baseline
120 mm (4.7")
Motion; 6-axis Pose Accuracy
Position: +/−1 mm
Orientation: 0.1°
Frequency; Up to 100 Hz
Technology; Real-time depth-based visual odometry and SLAM
Lens;
Wide-angle all-glass dual lens with reduced distortion
Field of View: 110° (D) max.
f/2.0 aperture
Sensors;
Sensor Resolution; 4M pixels per sensor with large 2-micron pixels
Sensor Size; ⅓" backside illumination sensors with high low-light sensitivity
Camera Controls; Adjust Resolution, Frame-rate, Exposure, Brightness, Contrast, Saturation, Gamma, Sharpness and White Balance
Sensor Format; Native 16:9 Format for a greater horizontal field of view
Shutter Sync; Electronic Synchronized Rolling Shutter, ISP Sync, Synchronized Auto Exposure
Connectivity;
Connector, USB 3.0 port with 1.5 m integrated cable
Power; Power via USB,
5V/380 mA
Mounting Options; Mount the camera to the ZED mini tripod or use its ¼"-20 UNC thread mount
Operating Temperature; 0° C. to +45° C. (32° F. to 113° F.)"
see ZED web page.

Machines for Pruning

Self-Propelled Vehicle (SPV) for Pruning Initialization Steps for Harvesting The process flow for harvesting is shown in FIG. 22 PROCESS FLOW DIAGRAM FOR HARVESTING MODE.

With the machine in the manual mode FIG. 22, reference 922 the operator uses information provided by the GPS FIG. 1, reference 124 to manually align the machine to the center of the row of two row trees, or in the case of an edge row one sets the distance of the machine from the tree row. The operator initializes each robotic arm FIG. 1, reference 170, 172, 174. 176, & 180, 182,184, 186, to the Pick position FIG. 22, reference 937.

With the machine in the manual mode FIG. 22, reference 922, the operator uses information provided by the GPS FIG. 1, reference 124 to manually align the machine to the center of the row of two row trees, or in the case of an edge row one sets the distance of the machine from the tree row. The operator initializes each robotic arm FIG. 28, reference 30, 31, & 32 to the start harvesting position FIG. 22, reference 923. The operator will then locate the first tree trunk on left side of the SPV 3 by guiding the most forward left robotic arm FIG. 28, reference 30 to the starting position. The operator will do this task by operating the joystick FIG. 1, reference 14. Then the operator will locate the first tree on the left side of the SPV FIG. 1, reference 3, by guiding the most forward robotic arm 30 until the stem cutter assembly just touches the target on the trunk of the first left tree. Note: the left side robotic arms are staggered ahead of the right side robotic arms on the machine.

Then the operator repeats the operation for the right side of the machine until the right side robotic arm's FIG. 28, reference 33 end effector just touches the target on the trunk of the first right tree. Once the machine is aligned and initialized the operator then checks that all interlocks are good FIG. 22, reference 923 and selects the mode for picking FIG. 22, reference 937.

Robotic Arms for Pruning

The Robot arm assemblies are shown in FIG. 33. There will be several sizes of robot arms including a 3 foot maximum reach, five-foot maximum reach arm and a six-foot maximum arm. The arms can be configured on the machine for various trellis types. The robot arms FIG. 40, references 110, 112, 114. 116 will be the five-foot maximum reach arms to fit the specific orchard that the testing will occur. Four different mounts will be part of the SPV to allow the Robot arm to be mounted in the desired location for the specific orchard that the machine will operate in. The FIG. 33, is for a V-trellis orchard and the right robot arms are not shown to clearly show the position of each robot arm that will allow all of the tree to be accessed. The robot arms will have a Power Pruner End Effector FIG. 33, mounted during pruning.

Robotic Controllers for Pruning

Robotic Control system FIG. 2, references 34, 35, 36 will control a robot arm with 3 horizontal pivots and one vertical Pivot point and including the end effector will have 4 to 5 degrees of freedom.

FIG. 10 is a Block diagram for the Robotic Controller. The Robotic Controllers FIG. 10, reference 806-809, communicates with the GIS Matrix FIG. 10, reference 805, to get all positions in GPS position format. The positions are converted to linear movements to provide to each link of the robotic arm. All the controllers for the robotic arm are the same so only one controller is described in the Block diagram. Four Robotic controllers are shown in FIG. 10, reference 806, 807, 808, & 809 which would make up one side of an 8 arm machine. The apparatus is shown for only Robotic Controller #1 FIG. 10, reference 806, It has controls for six servo valves FIG. 10, reference 821-826, that operate up to six hydraulic cylinders FIG. 10, reference 811-816.

The Robotic Controller #1 FIG. 10, reference 806, receives input from position sensors FIG. 10, reference 831-836, that indicates the position of each cylinder. There is a close-up camera FIG. 10, reference 860-864, on each end effector to guide the arm to prune the tree.

The Controller will consist of a commercial robotic controller that will control electrohydraulic servo valve (EHSV) or proportional valves as needed. The valves will control flow to hydraulic cylinders that will control the movement of each arm section around the pivot point. A feedback loop is provided by linear position sensors provided as part of the cylinders or separate rotational or linear sensors.

The controller will control 5 pivot axis

The control valves will be Danfoss PVE electrohydraulic actuators or equivalent product.

Robotic Position Sensors for Pruning

The hydraulic cylinders will be commercial equipment and will be Intellinder Position Sensor Hydraulic Cylinders by Parker@ or equivalent product.

The position sensors may be independent Penney+ Gilles® rotational and linear sensors or sensors integrated into the commercial equipment hydraulic cylinders and may be Intellinder Position Sensor Hydraulic Cylinders by Parker®, or equivalent product.

Programmable Logic Controllers for Pruning

AutomationDirect® PLC and Compact GuardLogix® controllers are ideal for small to mid-size applications that require safety, motion, and/or complex communications.

These controllers offer integrated serial, EtherNet/IP™ or ControlNet™ channels, and modular DeviceNet™ communications. They support as many as 30 I/O modules and as many as 16 motion axes." see Allen Bradley Web page. Siemens and GE PLC controllers are equivalent products.

Figure 11:
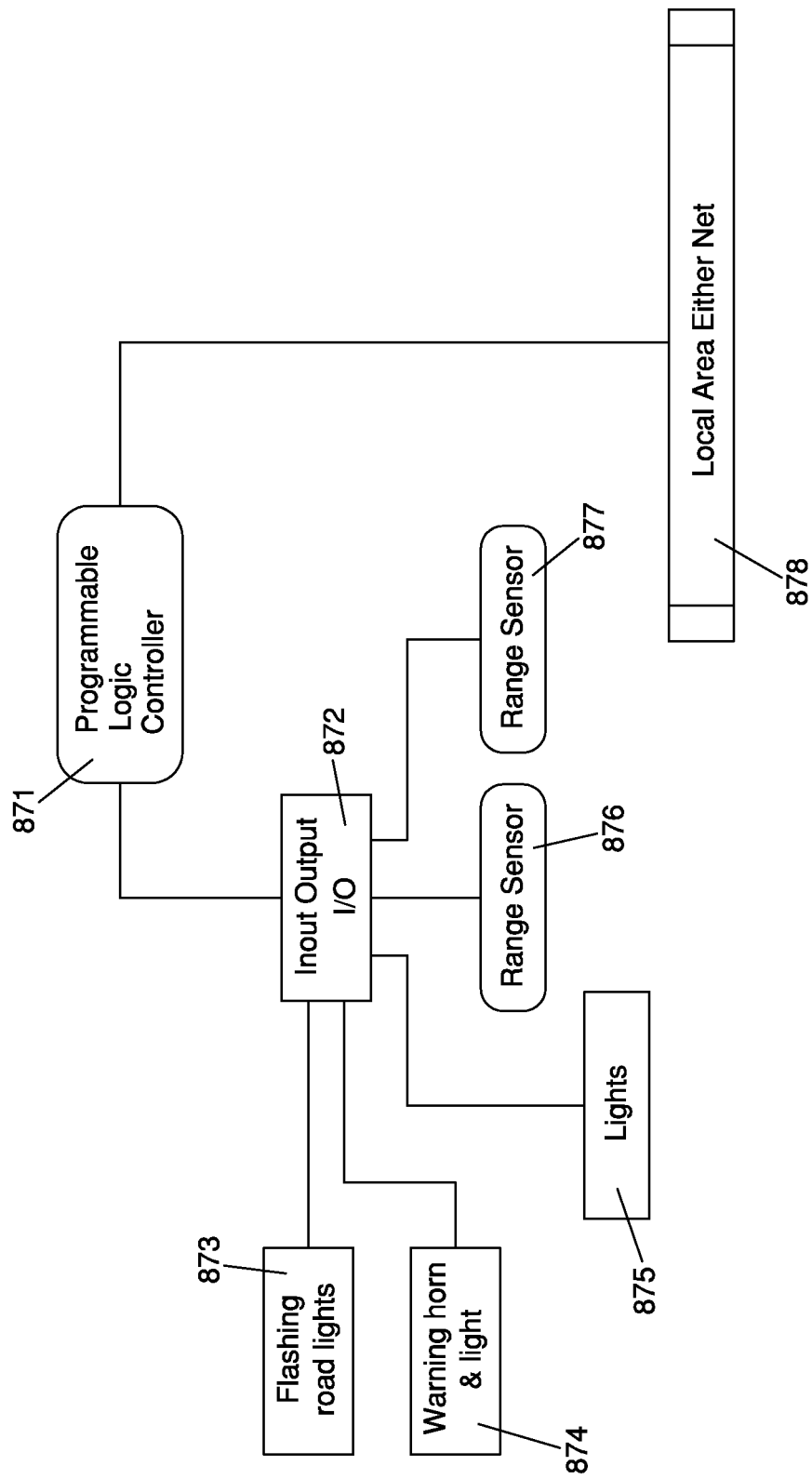
FIG. 11 is a block diagram of the programmable logic controllers (PLC).

FIG. 11 is a Block Diagram of the Programable Logic Controller (PLC). The PLC FIG. 11, reference 871, will utilized to control the remaining apparatus on the machine through the Input/Output Modules FIG. 11, reference 871.

Input/Output Modules

I/O modules will be selected to be compatible with the selected controllers required for the individual inputs and out puts. Modules will be required for Flashing Lights FIG. 11, reference 873, for Warning Horn & lights FIG. 11, reference 874, Running Lights FIG. 11, reference 875, Range sensors FIG. 11, reference 876 & 877. The PLC will communicate with the other Robotic Control systems through the Local Ara Network FIG. 11, reference 878.

Input/Output Modules

I/O modules will be selected to be compatible with the selected controllers required for the individual inputs and out puts.

Cameras for Pruning

The digital cameras FIG. 1, reference 132-133, & 150-162 shall be of the following Specifications:

Fixed lens digital cameras capable of photos and video. Resolution video, NTSP/PAL,1080p: 1920×1080p/30 fps/ 16.9 photo format JPEG 16MP, VGA and the processing speed shall be not less than 50 GHrz.

The on board memory shall be at least 8 gigbites. Water Proof Industrial Housing with mounts.

Fixed lens close-up digital cameras capable of video. The close up camera located on the end effectors shall be not less than resolution video, NTSP/PAL,1080p: 1920×1080p/30 fps/16.9 photo format JPEG 16MP, VGA and the processing speed shall be not less than 50 GHrz. and the focal length of the lens shall be from 3 inches to 18 inches. The on board memory shall be at least 8 gigbites.

3-D stereo camera fixed lens, ZED 3D camera or other stereo camera.

With its 16:9 native sensors and ultra-sharp 6 element, all glass lenses, you can capture 110° wide-angle video and depth.

Capture 1080p HD video at 30 FPS or WVGA at 100 FPS and get a crisp and clear image.

Video

| Video Mode | Frames per second | Output Resolution (side by side) |
| --- | --- | --- |
| 2.2K | 15 | 4416 × 1242 |
| 1080p | 30 | 3840 × 1080 |

-continued

| Video Mode | Frames per second | Output Resolution (side by side) |
| --- | --- | --- |
| 720p | 60 | 2560 × 720 |
| WVGA | 100 | 1344 × 376 |

Depth
Depth Resolution; Same as selected video resolution
Depth Range; 0.7-20 m (2.3 to 65 ft)
Depth Format; 32-bits
Stereo Baseline
120 mm (4.7")
Motion; 6-axis Pose Accuracy
Position: +/−1 mm
Orientation: 0.1
Frequency; Up to 100 Hz
Technology; Real-time depth-based visual odometry and SLAM
Lens;
  Wide-angle all-glass dual lens with reduced distortion
  Field of View: 110° (D) max.
  f/2.0 aperture
Sensors;
Sensor Resolution; 4M pixels per sensor with large 2-micron pixels
Sensor Size; ⅓" backside illumination sensors with high low-light sensitivity
Camera Controls; Adjust Resolution, Frame-rate, Exposure, Brightness, Contrast, Saturation, Gamma, Sharpness and White Balance
Sensor Format; Native 16:9 Format for a greater horizontal field of view
Shutter Sync; Electronic Synchronized Rolling Shutter, ISP Sync, Synchronized Auto Exposure
Connectivity;
Connector, USB 3.0 port with 1.5 m integrated cable
Power; Power via USB,
5V/380 mA
Mounting Options; Mount the camera to the ZED mini tripod or use its ¼"-20 UNC thread mount
Operating Temperature; 0° C. to +45° C. (32° F. to 113° F.)" see ZED web page.

Robotic Ranging System

Input Sensor Card

Range Sensors

Ultrasonic range sensor 6 inches to 15 feet range see FIG. 1, references 52, 54, 56, 58. or laser sensor, an approved equivalent.

Power Pruner End Effector for Pruning

The Power Pruner End Effector, will be powered by a hydraulic motor.

Outer Shaft for Stem Cutter Shear Blade

The Power Pruner End Effector utilizes a set of synchronized counter-rotating blades.

This includes

Shear Blade and knife blade when used to cut branches and limbs up to ¾". The two blades are powered by a gear set. The hydraulic motor drives the Power Shaft to turn the Pinion Gear. The pinion gear turns two Bevel Gears, one bevel gear turns clock wise and the other bevel gear turns counter clock wise when viewed from the top. Two spur gears that is just small enough to fit in between the two bevel gears is pined to a bevel gear, respectfully. The spur gear in turn turns a second spur gear that in turns a small spur gear. The spur gear on the top half of the assembly is mounted on the inner shaft, and has the Knife blade mounted on the other end of the inner shaft. The Spur gear on the bottom half of the assembly is mounted on the outer shaft. The two shafts rotate opposite directions of each other and provide for the action required for the shear and knife blades to cut branches and limbs.

Methods for Pruning

Methods for Automated Pruning Operation

The pruning program will use input variables and functions based on the Knowledge Based Engineering Data for Orchard. The program will use the trellis type row spacing and row height, wire spacing, fruit type, fruit Varity, and shape of exclusion Zone as shown in FIGS. 23, 24 and 25. The pruning program is a series of sub programs that are selected based on the input variables. For example, if a V trellis apple tree, variety is Granny Smith with a fruit zone of rectangular section of 2 feet by 1 foot centered on the trellis wire is selected. Then an outer profile one foot from each trellis wire toward the SPV is calculated that is a vertical cut. An outer profile 1 foot away from the trellis wire away from the SPV is calculated that is a vertical cut. Horizontal profiles six inches below and six inches above each trellis wire is calculated for horizontal cuts. The result is the exclusion zones.

Method Pruning for Shaping the Tree to Allow Access to Fruit During Harvest

In one embodiment, the inventive machine will focus on pruning trellised trees. Three types of trellises are considered in designing the machine to shape a tree. The v-trellis, a short v-trellis, and a straight trellis are the trellis designs used to develop the pruning algorithms to maximize access to fruit during harvest. Pruning Paths are generated based on the selected Profile desired for the orchard selected by the operator. The program is loaded and run for each tree. The profiles will be programmed in advance as part of the design. Each profile will be a sub-program that is loaded and run. Certain variables will be changed based on programming or operator input.

Method Pruning to Removing Branches and Limbs to Allow Light to Penetrate Tree

The initial machine will focus on pruning trellised trees. Three types of trellises will be considered in designing the machine to shape a tree. The v-trellis, a short v-trellis, and a straight trellis are the trellis designs used to develop the pruning algorithms to allow light to penetrate and reach fruit.

The operator will select the trellis type and the fruit variety and choose the desired sub program to load the pruning paths. The algorithm allows for pruning an area defined by the orchard between the trellis wires to remove unnecessary limbs and branches. In most orchards, this can be an area from 6 to 12 inches wide.

Method Pruning to Remove Shoots and Laterals to Allow for Control of Fruit Size and Growth Using AI The initial machine will focus on pruning trellised trees. Three types of trellises will be considered in designing the machine to shape a tree. The v-trellis, a short v-trellis, and a straight trellis will be the trellis designs used to develop the pruning algorithms to remove shoots and laterals to allow for control of fruit size and growth. The fruit varieties to be considered will be for apples of the following varieties: Granny Smith, Gala, and Fuji apples. The vertical shoots will be pruned to leave laterals between 6 to 8 inches apart; laterals can be up to 45 degrees' horizontal. Limbs will be pruned that are growing downward or located between the laterals. Limbs that cross each other will have the smallest limb removed. The number of buds can be controlled during this process to provide for control of the amount of possible fruit in each zone.

The method to selective pruning in the fruit zone is based on a set of Rule Based decisions using various types of IF Then statements. The result determines whether to prune or leave a branch or limb.

The Computer Based Control System (CBCS) FIG. 1, reference 102 will request that the DIS cameras FIG. 1, reference 132, 134, &150, 152, to process a number of dual images of the tree, FIG. 19, reference 709, and the superimposition of these images starting at the trunk target will provide data to the Tree Stick Image Builder (TSIB) algorithm software FIG. 19, reference 710.

The methods of the TSIB algorithm FIG. 32 are to generate a continuous vector line(s) for the tree trunk starting at the absolute location of the target on the trunk FIG. 19, reference 711. The method includes several image processing steps FIG. 32, reference 1048-1053. This includes:

The Mode is switched FIG. 32, reference 1045, from Manuel FIG. 32, reference 1040 to Prune FIG. 32, reference 1041.

The DIS is in the Home position FIG. 32, reference 1044, until a request to build a VBSI is received from the CBCS.

The TSIB is run and a request for data is issued FIG. 32, reference 1046.

Obtain two Raster Based images from Cameras FIG. 32, reference 1046, or retrieve images from GIS FIG. 32, reference 1047.

Processing the back ground and turning the back ground to one color of blue FIG. 32, reference 1048.

Then processing the image with a Caney algorithm to generate the edges of the images in the image FIG. 32, reference 1049.

Starting at the Trunk Target move up and build a 2D-VBSI of the trunk of the tree. This is based on knowledge that the tree must be continuous from the trunk to the end of each limb. The points are placed at the median point in a horizontal line between the Caney lines for the trunk FIG. 32, reference 1051.

Then build each branch on the side of the tree facing the machine FIG. 32, reference 1053. The average tree will have between ten and sixteen major branches (large limbs) connected to the tree trunk. The points are placed between the Caney lines and at the median point between the shortest distance between the Caney lines for the branches and limbs FIG. 32, reference 1052 & 1053.

The 2D-VBSI is an array of data points and vectors that reduces the amount data significantly.

The 2D-VBSI is saved to the GIS FIG. 1, reference 140 and CBCS FIG. 1, reference 102. The 2D-VBSI is stored as a series of 2D-dimensional data points of X (parallel to the Machine datum line), Z (Elevation), coordinate system FIG. 32, reference 1054.

The first series of data points start at the trunk target which is the beginning of the first line, and the next data point is the end of the first line and the start of the second line of the trunk of the tree. The series ends at the highest elevation achieved FIG. 32, reference 1054.

The next series of data points will be the first limb toward the bottom of the tree starting at the trunk. The data point will be the start of the first line of the branch and the next data point will be the end of the first line of the branch and the start of the second line. A junction is indicated and can have more than on line series with the junction as it starting point.

The trunk will have an identifier for example "T" for trunk, and the branches will have a sequential number and identifier for example "B" resulting in B001, B002, . . . .

The VBSI lines must be continuous from the base of the trunk. VBSI verification will assure that the trunk and branches are continues.

The GIS FIG. 1, reference 140 will also have a 3-D TSIB Program installed that will take at least two of the 2-D VBSIs and process them into a single 3-D VBSI. This also can be accomplished with the ZED stereo camera where a depth map is generated FIG. 32, reference 1055.

This image will be Saved to GIS FIG. 32, reference 1056, and provided to the CBSC FIG. 32, reference 102 for the final in fruit Zone pruning FIG. 32, reference 1057.

The 3-D VBSI is created from two 2-D VBSI using triangulation calculation and knowing the positions and distances. To obtain better accuracy a number of 3-D images can be generated of each tree and the averaged to get a more precise 3-D VBSI.

This image is stored in GIS FIG. 32, reference 1063 as well as provided to the CBCS FIG. 32, reference 1062 for the final pruning that is inside the fruit zone.

Method to Generate 3 D Stick Image

Steps to generate a 3-D stick image from Two 2 D Stick images are below.

Step 1 Obtain Two/2-D Stick Images FIG. 32

Information that is known about the 2-Stick image in relation to the imaging camera.
1. Assumptions or knowns
a. Distance between the two cameras when the two images were taken.
  i. 1 foot on Casio cameras
  ii. 12 centimeters on ZED camera
b. The image planes of the CCD chips are parallel
c. Distance to tree trunk at target ~6 inches above ground is 7 feet (84 Inches) from the camera on the horizontal plane.
d. Assume a pin hole lens and no lens distortion error for this work at this time.
e. Assume one picture is of tree target is perpendicular to an image.
f. This creates a right triangle with the camera at the 90-degree angle and the short leg of the triangle 12 inches (casio) to the second camera and the long leg of the triangle 84 inches to the tree target.
g. Trigonometry functions: for a right triangle.
  i. Sine of an Angle $A = \sin A = a/c$ (hypotenuse) $= a'/c'$.
  ii. Cosine of an Angle $A = \cos A = b/c = b'/c'$
  iii. Tangent of angle $A = \tan A = a/b = a'/b'$
  iv. $a^2 + b^2 = c^2$ (See FIG. 34)
2. Triangulation at tree trunk target at point A. $\sin A = b/c = b'/c' = 12/84 = 1/7 = 0.14$
3. Angle A=8 degrees B=82 degrees.
4. Length b is a constant at 12 inches.
5. The length 'a' decreases as Point A moves closer to point C.
6. The virtual point on the image on the camera array at B forms a complementary angle to angle B.
7. The horizontal shift of point Ai on the Camera array is directly proportional to the shift of point A. The camera shifted 12" which is b so the horizontal shift in the camera array is equal to a 12-inch shift. The distance a is known and =82-inches.
8. The shift of any point closer to C on line a will have a larger shift and is directly proportional to the shift on the camera array.
9. The distance from the center line of the cameras perpendicular to any point can be determined by using right triangles.
10. The shift of X pixels in Y direction of line a' can be determined from the raster image or from a vector image. The Y direction shift a of the same point can be determined.
  The equation is;
The side of the right triangle are a=12", b=84" a'=n-pixels, b'=distance from lens to camera array=constant K $$\text{Tangent of angle } A = \tan A = a/b = a'/b';$$

$$\tan A = 12/84 = n\text{-pixels}/b';$$

$$\tan A = 0.14 \text{ in/in} = n\text{-pixels}/b';$$

$$b' = n \text{ pixels}/0.14; b' = \text{constant } K;$$

$$K \text{ can be calculated.}$$

$$a1/b1 = a1'/K = \tan A1$$

$$a1 = a = 12";$$

$$b' = b1' = K$$

$$a1'/K = 12/b1 = \tan A1$$

Multiply both sides by b1;

$$b1 * a1'/K = b1 * \tan A1 = 12$$

$$b1 = 12 * K/a1'$$

a1' is measured and known. Then b1 can be calculated.
B1 is the perpendicular distance from the camera to the object at angle C1.

Step 2

The 3-VBSI data consists of n sets of Data points which are the ends of each vector line stating at the trunk target and first the data for the tree trunk FIG. 32, reference 1051. Then data for each point on the branch starting at a point on the trunk. This is stored FIG. 32, reference 1050, in an expected format and saved to the GIS for future activities.

This is accomplished with the JetsonTX1 or equivalent GPU. The 3-D TSI program will utilize several Software Packages including but not limited to; C++, Python, OpenCV, Public libraries.

Note: An option is expected to be available to allow collection of images in Orchard Blocks that have been Manually pruned to be collected during the pruning season.

Step 3

The DIS is now ready for the Pruning Mode FIG. 22.

Step 4

The 3-D Vector Based Stick Image (VBSI) of the trunk and limbs of the tree is converted to absolute locations will be used to show the location of the tree on the machine matrix FIG. 21, reference 904. Also a number of digital images of the as-pruned tree provides to the operator additional details as to where the fruit will be along the limbs.

The DIS will have the imaging processing programs installed into the GPU which will be an embedded System with CBCS as it Host. This is accomplished at installation of the DIS FIG. 1, reference 120 &130, equipment.

The DIS FIG. 1, reference 120 &130, will be capable of recording video, still photos or frame grabs from video.

The image will have a recorded date & time and location from the GPS.
Images will be collected based on inputs from the CBSC host.

The GPU will have a program called the Tree Stick Image Program installed that will process the individual images collected into Vector Based Stick Image (VBSI and save this image to the GIS FIG. 1, reference 140, as well and the High definition image to the GIS.

The Tree Stick Image Builder (TSIB) program is a program coded specifically for generation of VBSI of each tree.

This is accomplished with a Jetson TX1 Graphics Processor Unit (GPU) The TSI will utilize several Software Packages including but not limited to; C++, Python, OpenCV, Public libraries The program starts with a High Definition (HD) image of the tree collected by a camera mounted on the SPV 3. It can be a single image camera or a stereo image camera.

The GIS FIG. 1, reference 140 will also have a 3-D TSIB Program installed that will take at least two of the 2-D VBSIs and process them into a single 3-D VBSI FIG. 32, reference 1055.

This image will be Saved to GIS FIG. 1, reference, 140 and provided to the CBSC FIG. 1, reference 102 for the final in fruit Zone pruning.

The 3-D VBSI is created from two 2-D VBSI using triangulation calculation and knowing the positions and distances. To obtain better accuracy a number of 3-D images can be generated of each tree and the averaged to get a more precise 3-D VBSI.

This image is stored in GIS FIG. 1, reference 140, as well as provided to the CBCS FIG. 1, reference 102 for the final pruning that is inside the fruit zone.

The Vector Based Image of the tree is also located at the GPS locations FIG. 4, reference 456. The GIS setup FIG. 4, reference 400 is only required once for an orchard and then can be used year to year.

Additions, deletions and revisions can be added each year.

The Computer Based Control System (CBCS) FIG. 1 will request that the DIS cameras FIG. 1, reference 120 &130, 182, 184, to process a number of dual images of the tree, FIG. 19, reference 709, and the superimposition of these images starting at the trunk target will provide data to the Tree Stick Image Builder (TSIB) algorithm software FIG. 19, reference 710.

The methods of the TSIB algorithm FIG. 32, are to generate a continuous vector line(s) for the tree trunk starting at the absolute location of the target on the trunk FIG. 19, reference 711.

The method includes several image processing steps FIG. 32. This includes:

Obtain two Raster Based images from Cameras FIG. 32, reference 1046.

Processing the back ground and turning the back ground to one color of blue FIG. 32, reference 1048.

Then processing the image with a Caney algorithm to generate the edges of the images in the image FIG. 32, reference 1049.

Starting at the Trunk Target move up and build a 2D-VBSI of the trunk of the tree. This is based on knowledge that the tree must be continuous from the trunk to the end of each limb. The points are placed at the median point in a horizontal line between the Caney lines for the trunk FIG. 32, reference 1051.

Then build each branch on the side of the tree facing the machine FIG. 19, reference 712. The average tree will have between ten and sixteen major branches (large limbs) connected to the tree trunk. The points are placed between the caney lines and at the median point between the shortest distance between the Caney lines for the branches and limbs FIG. 32 reference 1052 & 1053.

The 2D-VBSI is an array of data points and vectors that reduces the amount data significantly.

The 2D-VBSI is saved to the GIS FIG. 1, reference 140 and CBCS FIG. 1, reference 102. The 2D-VBSI is stored as a series of 2D-dimensional data points of X (parallel to the Machine datum line), Z (Elevation), coordinate system.

The first series of data points start at the trunk target which is the beginning of the first line, and the next data point is the end of the first line and the start of the second line of the trunk of the tree. The series ends at the highest elevation achieved.

The next series of data points will be the first limb toward the bottom of the tree starting at the trunk. The data point will be the start of the first line of the branch and the next data point will be the end of the first line of the branch and the start of the second line. A junction is indicated and can have more than on line series with the junction as it starting point.

The trunk will have an identifier for example "T" for trunk, and the branches will have a sequential number and identifier for example "B" resulting in B001, B002, . . . .

The VBSI lines must be continuous from the base of the trunk. VBSI verification will assure that the trunk and branches are continues.

The GIS FIG. 1, reference 140 will also have a 3-D TSIB Program installed that will take at least two of the 2-D VBSIs and process them into a single 3-D VBSI. This also can be accomplished with the ZED stereo camera where a depth map is generated FIG. 32.

This image will be Saved to GIS FIG. 1, reference 140 and provided to the CBSC FIG. 1, reference 102 for the final in fruit Zone pruning FIG. 20.

The 3-D VBSI is created from two 2-D VBSI using triangulation calculation and knowing the positions and distances. To obtain better accuracy a number of 3-D images can be generated of each tree and the averaged to get a more precise 3-D VBSI FIG. 32.

This image is stored in GIS FIG. 1, reference 140, as well as provided to the CBCS FIG. 1, reference 102, for the final pruning that is inside the fruit zone FIG. 20. Steps to generate a 3-D stick image from Two 2 D Stick images are below.

Step 1

Obtain two/2-D Stick Images FIG. 39.
Information that is known about the 2-Stick image in relation to the imaging camera.
1. Assumptions or knowns
a. Distance between the two cameras when the two images were taken.
 i. 1 foot on Casio cameras
 ii. 12 centimeters on ZED camera
b. The image planes of the CCD chips are parallel
c. Distance to tree trunk at target ~6 inches above ground is 7 feet (84 Inches) from the camera on the horizontal plane.
d. Assume a pin hole lens and no lens distortion error for this work at this time.
e. Assume one picture is of tree target is perpendicular to an image.
f. This creates a right triangle with the camera at the 90-degree angle and the short leg of the triangle 12 inches (casio) to the second camera and the long leg of the triangle 84 inches to the tree target.
g. Trigonometry functions: for a right triangle.
 i. Sine of an Angle $A = \sin A = a/c$ (hypotenuse)=$a'/c'$.
 ii. Cosine of an Angle $A = \cos A = b/c = b'/c'$
 iii. Tangent of angle $A = \tan A = a/b = a'/b'$
 iv. $a2+b2=c2$ (See FIG. 34)
2. Triangulation at tree trunk target at point A. $\sin A = b/c = b'/c' = 12/84 = 1/7 = 0.14$
3. Angle A=8 degrees B=82 degrees.
4. Length b is a constant at 12 inches.
5. The length a decreases as Point A moves closer to point C.
6. The virtual point on the image on the camera array at B forms a complementary angle to angle B.
7. The horizontal shift of point Ai on the Camera array is directly proportional to the shift of point A. The camera shifted 12" which is b so the horizontal shift in the camera array is equal to a 12-inch shift. The distance a is known and =82-inches.
8. The shift of any point closer to C on line a will have a larger shift and is directly proportional to the shift on the camera array.
9. The distance from the center line of the cameras perpendicular to any point can be determined by using right triangles.
10. The shift of X pixels in Y direction of line a' can be determined from the raster image or from a vector image. The Y direction shift a of the same point can be determined. The equation is;
The side of the right triangle are a=12", b=84" a'=n-pixels, b'=distance from lens to camera array=constant K Tangent of angle $A = \tan A = a/b = a'/b'$;

$\tan A = 12/84 = n\text{-pixels}/b'$;

$\tan A = 0.14 \text{ in/in} = n\text{-pixels}/b'$;

$b' = n \text{ pixels}/0.14; b' = \text{constant } K$;

$K$ can be calculated.

$a1/b1 = a1'/K = \tan A1$ $a1 = a = 12"$;

$b' = b1' = K$ $a1'/K = 12/b1 = \tan A1$

Multiply both sides by b1;

$b1 * a1'/K = b1 * \tan A1 = 12$ $b1 = 12 * K/a1'$ a1' is measured and known. Then b1 can be calculated.
B1 is the perpendicular distance from the camera to the object at angle C1.

Step 2

The 3-VBSI data consists of n sets of Data points which are the ends of each vector line stating at the trunk target and first the data for the tree trunk FIG. 39. Then data for each point on the branch starting at a point on the trunk. This is stored in an expected format and saved to the GIS for future activities.
 This is accomplished with the JetsonTX1 or equivalent GPU. The 3-D TSI program will utilize several Software Packages including but not limited to; C++, Python, OpenCV, Public libraries.
Note: An option is expected to be available to allow collection of images in Orchard Blocks that have been Manually pruned to be collected during the pruning season.

Step 3

The DIS is now ready for the Pruning Mode FIG. 39.

Step 4

The 3-D Vector Based Stick Image (VBSI) of the trunk and limbs of the tree is converted to absolute locations will be used to show the location of the tree on the machine matrix FIG. 21, reference 904. Also a number of digital images of the as-pruned tree provides to the operator additional details as to where the fruit will be along the limbs.

The DIS will have the imaging processing programs installed into the GPU which will be an embedded System with CBCS as it Host. This is accomplished at installation of the DIS FIG. 1, reference 120 &130, equipment. The DIS FIG. 1, reference 120 &130, will be capable of recording video, still photos or frame grabs from video. The image will have a recorded date & time and location from the GPS. Images will be collected based on inputs from the CBSC host. The GPU will have a program called the Tree Stick Image Program installed that will process the individual images collected into Vector Based Stick Image (VBSI) and save this image to the GIS FIG. 1, reference 140, as well and the High definition image to the GIS.

The Tree Stick Image Builder (TSIB) program is a program coded specifically for generation of VBSI of each tree. This is accomplished with a Jetson TX1 Graphics Processor Unit (GPU) The TSI will utilize several Software Packages including but not limited to; C++, Python, OpenCV, Public libraries. The program starts with a High Definition (HD) image of the tree collected by a camera mounted on the SPV FIG. 28, reference 3. It can be a single image camera or a stereo image camera.

The image is first processed in where the back ground is turn to one shade of Blue.

This image is then processed using a Caney Algorithm that results in a edge detection of the edges of the tree.

Then this image is process generating a red or other single color vector line starting at the trunk target and drawing a median line between the edges of the tree Caney image.

Then everything but the vector lines are converted to a white or black back ground.

This vector based image is saved as a vector file image.

The GIS FIG. 1, reference 140 will also have a 3-D TSIB Program installed that will take at least two of the 2-D VBSIs and process them into a single 3-D VBSI.

This image will be Saved to GIS FIG. 1, reference 140 and provided to the CBSC FIG. 1, reference 102, for the final in fruit Zone pruning.

The 3-D VBSI is created from two 2-D VBSI using triangulation calculation and knowing the positions and distances. To obtain better accuracy a number of 3-D images can be generated of each tree and the averaged to get a more precise 3-D VBSI.

This image is stored in GIS FIG. 1, reference 140, as well as provided to the CBCS FIG. 1, reference 102, for the final pruning that is inside the fruit zone.

The Vector Based Image of the tree is also located at the GPS locations FIG. 4, reference 456. The GIS setup FIG. 4, reference 400 is only required once for an orchard and then can be used year to year.

Additions, deletions and revisions can be added each year.

Automated Data Collection (Scouting) in Preparation for Harvesting Systems Set Up for Data Collection The set up for Pick Path Generation requires the CBCS and the GIS only. This can also be done with a reduced version of CBCS and GIS on a desktop or lap top with the proper GPU installed. The Pick Path Generation Program is programmed as part of the Harvester design.

The Pick Path Generation program will utilize several Software Packages including but not limited to; C++, Python, OpenCV, Public libraries. The Pick Path Generation software will use Image Recognition software.

A large library of fruit buds will be generated, and a library of not fruit buds will be generated. The imaging steps are generally completed in the Pruning Mode and saved to GIS.

The Pick Path Program will input the 3-D VBSI and will generate a series of tables of data points that will represent the Path of the end effector path that is parallel to the 3-D VBSI. These paths are saved. A path will be generated for each main branch of the tree. This will be repeated until all the branches and limbs have a Pick Path parallel to the branch for limb.

A 3-D VBSI will be made into a screen format. Two HD images are loaded from the GIS. The image recognition code will process the image and place a small Square around each fruit bud on each image. The images will be over-laid on the 3-D VBSI with a ~25% transparency. Interrupts are placed at the closest point on the Pick Path line. The Pick Path Program for the robotic arms will be saved to the GIS.

Setup for Pick Path Generation
1. The set up for Pick Path Generation requires the CBCS and the GIS only. This can also be done with a reduced version of CBCS and GIS on a desktop or lap top with the proper GPU installed. The Pick Path Generation Program is programmed as part of the Harvester design.
2. The Pick Path Generation program will utilize several Software Packages including but not limited to; C++, Python, OpenCV, Public libraries. The Pick Path Generation software will use image recognition.
3. A large library of fruit buds will be generated, and a library of not fruit buds will be generated.
4. All the imaging steps must be completed in the Pruning Mode and saved to GIS.
5. The Pick Path Program will input the 3-D VBSI and will generate a series of tables of data points that will represent the Path of the end effector path that is parallel to the 3-D VBSI. These paths are saved.
6. A path will be generated for each main branch of the tree. This will be repeated until all the branches and limbs have a Pick Path parallel to the branch for limb.
7. A 3-D VBSI will be made into a screen format
8. Two HD images are loaded from the GIS.
9. The image recognition code will process the image and place a small Square around each fruit bud on each image.
10. The images will be over-laid on the 3-D VBSI with a ~25% transparency.
11. Interrupts are placed at the closest point on the Pick Path line.
12. The Pick Path Program for the robotic arms will be saved to the GIS Systems for Data Collection
Computer Based Control System (CBCS-CPU)

The CBCS will determine the robotic paths FIG. 19, 706 and provide them to the robotic arms controllers FIG. 1, reference 170-176, & 180-186. The CBCS will contain programs that have Knowledge Based Systems. The CBCS will utilize programs based on Rule Based Programming and based on the Knowledge Based Data stored. The CBCS will determine the data and programs to be used by the different systems. The program will use information input into the system to create the controls for various aspects of the machine.

The CBCS will set the forward speed for the machine and provide this information to the SPV steering and speed controller FIG. 19, reference 707, and request the machine to move slowly forward. The CBCS will provide input into the other systems that provide for controls or processing during operation. The CBCS will provide the programs to the robotic arm controllers to accomplish the task needed. The robotic arms controllers FIG. 1, reference 170-176 & 180-186, will prune or harvest the tree on each side of the machine.

Once the CBCS FIG. 1, reference 102, is notified that the paths have been completed by the robotic arm on either the left or right side of the machine it assigns the next task. The CBCS FIG. 1, reference 102, determines if this is the last tree in the row FIG. 20, 748. If no, the process returns to the next available tree, and if yes, the process returns to Home D FIG. 20, reference 748.

Global Information System (GIS) for Data Collection

GIS FIG. 1, reference 140, maintains an Absolute Position Database for the orchard.

(GIS) Database for Data Collection

Matrix Details for Robotic Pruner & Harvester

A three-dimensional Matrix FIG. 26 reference 596, is the center of the Mapping System for the Robotic Pruner and Harvester. The matrix data points are mapped in GPS units which provides an Absolute Data reference regardless of the machine that the Matrix FIG. 26 reference 596, is on. This makes the data interchangeable between machines. The data points consist of the global position numbers of Latitude; Longitude; and Elevation. The matrix FIG. 26 reference 596, is a 3-dimensional virtual rectangular box of which, one vertical plane surface makes up a plane and a perpendicular horizontal plane surface that the two GPS 17 antennas are reference points.

Input for Vector Based Stick Image for Data Collection

The method to locate the tree in the matrix FIG. 26 reference 596, utilizes vector graphics to place objects in the matrix FIG. 26 reference 596, at the proper locations. The method utilizes a Vector Based Stick Image (VBSI) of the tree trunks, branches and limbs that is generated from stereo images of the tree, or several single images from known locations when the tree is dormant. A VBSI is an image of the tree trunk, branches, and limbs is defined by a series of vectors and points in 3-D space. The image starts at the base of the trunk as the first point with a line (vector) to the next point going up the trunk. A series of short lines connecting points that is located at the mid-point of the diameter of the trunk as one progresses up the trunk until the trunk become less the ½ inch in diameter. Then starting at the line on the trunk a series of lines and points are determined for each branch coming from the trunk. When completed a stick image is generated of the tree trunk, branches and limbs using only a series of points (x,y,z) connected by vectors. Once the VBSI is created for a tree the tree can be placed in the matrix FIG. 26 reference 596, by locating the starting point on the tree trunk in the matrix space.

Digital Imaging System (DIS) for Data Collection

Input for Imaging Processing to Obtain Vector Based Stick Image Input for Imaging and Guiding Arm to Cut Stem Machines for Data Collection Computer Based Control System (CBCS-CPU)

The CBCS-CPU controls the integration of collecting all data to operate the Pruner Harvester.

Global Information System (GIS)

The GIS will store and maintain all the data required to operate the Pruner Harvester.

Methods for Data Collection

Method of the Computer Generation of Pick-Paths Program for the Robotic Arm

Pick Path Algorithm can be generated any time between the time of pruning of a tree and the time for harvesting of the fruit.

A Pick Path is a set of GPS absolute data points that is off set toward the machine from the tree limb VBSI FIG. 21, reference 905. A Pick Path for each limb is generated FIG. 21, reference 906. And the paths between the limbs Pick Path can be connected by the operator or an automated limb path connector can be utilized FIG. 59, reference 907. This allows for the assignment of various limb pick paths to Forward Robotic Arm FIG. 2 reference 340, Middle Robotic Arm FIG. 2 reference 341, or Rear Robotic Arm FIG. 2 reference 346, FIG. 21, reference 908, and the assignment of the direction the machine is expected to be moving during the picking FIG. 21, reference 909. Routing models will be utilized to help determine the optimum path for speed and access by the robotic arm. Utilize Navigation and Motion planning to determine the fastest pick path and an optional pick paths.

The process flow for Pick Path generation is shown if FIG. 21, PROCESS FLOW DIAGRAM for the generation of Pick Path Algorithm. The Pick Path Algorithm can be generated any time between the time of pruning of a tree and the time for harvesting of the fruit. This time is five to six months for the harvesting of apples. It can vary for different types of fruits.

FIG. 21, can be accomplished by the CBCS FIG. 1, reference 102, and GIS FIG. 1, reference 140, that is associated with the machine in FIG. 28, or a desktop computer, or laptop computer with sufficient capacity and access to a copy of the GIS FIG. 1, reference 140, and the GIS data base for the orchard. This description is for the CBCS FIG. 1, reference 102, and the GIS FIG. 1, reference 140, that are on the machine for convenience.

The machine is usually shut down in the Manual FIG. 21, reference 900 mode, so the Operator switches the machine to the Home mode FIG. 21, references 921, 901.

With the machine in the Home mode FIG. 21, reference 921 the operator uses information provided by the GPS FIG. 1, reference 124, GIS FIG. 1, reference 140, and data stored in the GIS FIG. 1, reference 140, to get the tree identification number FIG. 21, reference 902

The data stored in the GIS 140 under the Tree Identifying Number during the pruning process for each side of a tree is retrieved FIG. 21, reference 902 and processed FIG. 21, reference 903.

The processing is accomplished by the Pick Path Algorithm which includes an expert system where and how the tree variety blooms and sets fruit on the limbs and other parameters found important to knowing where the fruit will be located on the tree.

The VBSI of the trunk and limbs of the tree is converted to absolute locations will be used to show the location of the tree on the machine matrix FIG. 21, reference 904.

Also a number of digital images of the as-pruned tree provides to the operator additional details as to where the fruit will be along the limbs.

A Pick Path is a set of GPS absolute data points that is off set toward the machine from the tree limb VBSI FIG. 21, reference 905.

A Pick Path for each limb is generated FIG. 21, reference 906.

And the paths between the limbs Pick Path can be connected by the operator or an automated limb path connector can be utilized FIG. 21, reference 907. This allows for the assignment of various limb pick paths to Forward Robotic Arm FIG. 28, reference 30, Middle Robotic Arm 31, or Rear Robotic Arm 32, FIG. 21, reference 908, and the assignment of the direction the machine is expected to be moving during the picking FIG. 21, reference 909.

Interrupts will be placed at each location along the path where fruit is expected FIG. 21, reference 910.

The Pick Paths for each side of a tree will be stored in the GIS FIG. 1, reference 140, under the Tree Identifying Number FIG. 21, reference 911. Once a tree is completed a flag is set to show that both sides of the tree have been processed and ready to harvest FIG. 21, reference 912.

The Program returns and processes the next Tree FIG. 21, reference 913, notifies the operator it is ready to process the next set of trees or row of trees FIG. 21, Loop A.

The operator checks the block, and can run a simulator for the block to resolve any issues.
Stores the Pick Paths for harvest time.
Rule Based Input:
Rule based information:
Pick fruit from bottom up on tree.
Consider the reach of the arm
Minimum path length for speed

Method of the Computer Generation of Pick-Program for the Robotic Arm

Utilize the Digital Imaging System to direct the last six to eight inches of the end effector during the pick mode. This will make the small adjustments to guide the robot to cut the stem. The decisions to make adjustments to the robotic controller will be based on a knowledge base and using Rule Decisions to make the calculations for the adjustments for the distance to move the Robotic Arm Sections.
The method for accomplishing this process is as follows:
 The image is process by the GPU to turn the color range for the variety of apple to one uniform red color.
 The GPU adds a white circle around the red pixels and locates the center and add a target point.
 Calculates the distance to align the sight on the stem Cutter and provides it the Robotic Controller,
 The GPU repeats the process until the apple drops.
 The GPU sends a drop signal to the Robotic controller.
The camera can also be used to make a determination on color, size and if multiple apples are on the same bud location. If the apple is under size it can stop the pick and move on to the next apple. If the apple is not the color for ripe the, pick can be stopped and move on to the next apple. Detect when the apple drops and stops the robot from extending into the tree area.

Method to Recognize the Fruit Buds and Determine their Location

The processing is accomplished by a program which includes an system knowing where and how the tree variety blooms and sets fruit on the limbs and other parameters for determining where the fruit will be located on the tree. The program will recognize the fruit buds and differentiate the fruit buds from leaf buds. The program will provide the coordinates of the fruit buds generate table of coordinates that locate the buds.

The recognition process will use neural networks to differentiate a fruit bud from a leaf bud. The following characteristics will be included to differentiate between leaf buds and fruit buds and limbs and twigs;
 The data for the fruit buds identified for each fruit variety, where to expect fruit buds.
 Fruit buds are larger that leaf buds.
 Fruit buds have a white fuzz on the top area of the bud.
 Fruit buds color is a green color different from leaf buds.
 A large number of fruit bud images are provided for the program to utilize in making a decision.

Automated Harvesting Control Systems

Set Up for Harvesting

GIS set up. Disclosed in FIG. 7. Database GIS FIG. 7, reference 501. Select an area of an orchard to be harvested.

The machine is configured for harvesting as shown in FIG. 28, by removing the power pruner assemblies and installing the stem cutter assemblies on the robotic arms, installing the vacuum hoses, and checkout the rest of the harvesting systems. The GIS FIG. 1, reference 140, requires an initial setup FIG. 4, reference 400 prior to putting the machine into the orchard FIG. 4, reference 401. This will be accomplished During the Pruning Mode. The database GIS for the orchard FIG. 5, reference 406 needs to be installed or downloaded. The orchard is shown on a base map that provides an image and area of the orchard FIG. 4, reference 402. FIG. 4, FIG. 5, FIG. 6, & FIG. 7 is a flow diagram for GIS System. Initialization Steps for Harvesting.

CBCS Harvesting Programs. The CBCS FIG. 1 reference 102, provides the integration function of interfacing the other systems to accomplish task of harvesting.

An operating system (Windows, UNIX) is installed on the CBCS.

When the CSCS is turned the Operating system is booted and a computer program is loaded and runs a program that generates the screens for the control monitors. A number of operator interfaces are created to allow an operator with minimal training to operate the Pruner/harvester. The Main operator screen will allow the operator to select a number of modes of operation. These will include but not limited to Manual Mode, Prune Mode, Pick Path Generation Mode, Pick Mode, Home Mode.
 The mode selected will load the specified programs and the desired Operator interface screens for the Mode selected.
 The GIS is started.
 The RRS programs are started.
 The DIS program is started.
 The Robotic Controllers are started
 The CBCS Program will load the Matrix FIG. 26 reference 596, from GIS FIG. 1 reference 140.
 The Harvesting Program for the selected type of orchard will be loaded.
 The operator will select the Manual Mode if the CBCS is not already in the Manual Mode.
 This will load the operator interface screens required for manual operations, enable the controls required for manual operations, including the joystick, the RRS, DIS, GPS, Robotic Controllers.
 The Operator will release the brakes and operate the SPV to drive to the desired location in the orchard.
 The operator will determine the starting row to start or continue harvesting of a Block.
 The operator will align the SPV beside the row or between the 2 rows that are to be harvested.

Set Up Systems for Harvesting

1. GIS set up. Disclosed in FIG. 4.
2. Database GIS FIG. 6, reference 476.
3. Select an area of an orchard to be harvested.
4. The machine is configured for harvesting as shown in FIG. 28, by removing the power pruner assemblies and installing the stem cutter assemblies on the robotic arms, installing the vacuum hoses, and checkout the rest of the harvesting systems.
5. The GIS FIG. 1 reference 140, requires an initial setup FIG. 5, reference 400 prior to putting the machine into the orchard FIG. 4, reference 402. This will be accomplished During the Pruning Mode.
6. The database GIS for the orchard FIG. 4, reference 501 needs to be installed or downloaded. The orchard is shown on a base map that provides an image and area of the orchard FIG. 4, reference 402. FIG. 4, FIG. 5, FIG. 6, & FIG. 7, is a flow diagram for GIS System.

7. Initialization Steps for Harvesting. CBCS Harvesting Programs. The CBCS FIG. 1, reference 102, provides the integration function of interfacing the other systems to accomplish task of harvesting.
8. An operating system (Windows, UNIX) is installed on the CBCS.
9. When the CSCS is turned the Operating system is booted and a computer program is loaded and runs a program that generates the screens for the control monitors. A number of operator interfaces are created to allow an operator with minimal training to operate the Pruner/harvester.
10. The Main operator screen will allow the operator to select a number of modes of operation. These will include but not limited to Manual Mode, Prune Mode, Pick Mode, Home Mode. The mode selected will load the specified programs and the desired Operator interface screens for the Mode selected.
11. The GIS is started.
12. The RRS programs are started.
13. The DIS program is started.
14. The Robotic Controllers are started
15. The CBCS Program will load the Matrix FIG. 26 reference 596, from GIS FIG. 1, reference 140.
16. The Harvesting Program for the selected type of orchard will be loaded.
17. The operator will select the Manual Mode if the CBCS is not already in the Manual Mode.
18. This will load the operator interface screens required for manual operations, enable the controls required for manual operations, including the joystick, the RRS, DIS, GPS, Robotic Controllers.
19. The Operator will release the brakes and operate the SPV to drive to the desired location in the orchard.
20. The operator will determine the starting row to start or continue harvesting of a Block.
21. The operator will align the SPV beside the row or between the 2 rows that are to be harvested.

Set Up for Machine for Harvesting

The machine is configured for harvesting as shown in FIG. 1, & FIG. 28.

The GIS FIG. 1, reference 140, requires an initial setup FIG. 4, reference 400, prior to putting the machine into the orchard FIG. 4, reference 401. The database for the orchard FIG. 64, reference 406 needs to be installed or downloaded. The orchard is shown on a base map that provides an image and area of the orchard 402. Collectively, FIG. 4-FIG. 7 are flow diagrams for GIS System FIG. 1, reference 40.

Initialization Steps for Harvesting

The process flow for harvesting is shown in FIG. 22, PROCESS FLOW DIAGRAM FOR HARVESTING MODE.

With the machine in the manual mode FIG. 22, reference 922 the operator uses information provided by the GPS FIG. 1, reference 124 to manually align the machine to the center of the row of two row trees, or in the case of an edge row one sets the distance of the machine from the tree row. The operator initializes each robotic arm FIG. 28, reference 30-32 & 33-35 to the start harvesting position FIG. 9, reference 800.

With the machine in the manual mode FIG. 22, reference 922, the operator uses information provided by the GPS FIG. 1, reference 124 to manually align the machine to the center of the row of two row trees, or in the case of an edge row one sets the distance of the machine from the tree row. The operator initializes each robotic arm FIG. 28, reference 30-32 & 33-35, to the start harvesting position FIG. 22, reference 937. The operator will then locate the first tree trunk on left side of the SPV FIG. 1, reference 3, by guiding the most forward left robotic arm FIG. 28, reference 30, to the starting position. The operator will do this task by operating the joystick FIG. 28, reference 14. Then the operator will locate the first tree on the left side of the SPV FIG. 2, reference 3, by guiding the most forward robotic arm FIG. 28, reference 30, until the stem cutter assembly just touches the target on the trunk of the first left tree. Note: the left side robotic arms are staggered ahead of the right side robotic arms on the machine. Then the operator repeats the operation for the right side of the machine until the right side robotic arm's FIG. 28, reference 33, stem cutter assembly just touches the target on the trunk of the first right tree. Once the machine is aligned and initialized the operator then checks that all interlocks are good FIG. 22, reference 923 and selects the mode for picking FIG. 22, reference 937.

Systems for Harvesting

Computer Based Control System (CBCS-CPU) for Harvesting

The CBCS-CPU FIG. 1 reference 102, FIG. 2. reference 302, will determine the robotic paths FIG. 22, 926 and provide them to the robotic arms controllers FIG. 1, FIG. 2 341, 342, 345, 347. The CBCS will contain programs that have Knowledge Based Systems. The CBCS will utilize programs based on rule based programming and based on the knowledge data stored the CBCS will determine the data and programs to be used by the different systems. The program will use information input into the system to create the controls for various aspects of the machine. The CBCS will set the forward speed for the machine and provide this information to the SPV steering and speed controller FIG. 22, 925, and request the machine to move slowly forward FIG. 22, 928. The CBCS will provide input into the other systems that provide for controls or processing during operation. The CBCS will provide the programs to the robotic arm controllers to accomplish the task needed. The robotic arms controllers FIG. 1, will harvest the tree on each side of the machine.

Once the CBCS FIG. 1, reference 102 is notified that the paths have been completed by the robotic arm on either the left or right side of the machine it assigns the next task. The CBCS FIG. 1, reference 102, determines if this is the last tree in the row FIG. 22, 931. If no, the process returns to the next available tree, and if yes, the process returns to Manual B FIG. 22, 931.

Global Position System (GPS) for Harvesting

The GPS will provide to the machine two global data points to orient the machine for harvesting. The two antennas are placed of the centerline of the SPV frame. Each GPS antenna serves as a Global-Reference-Point for alignment of the SPV to the orchard rows. new If the GPS also has the ability to measure orientation with Gyro system than only one antenna is required. The GPS provides location in Latitude and Longitude for each tree and the Identification of each tree is its location in Latitude and Longitude. All data is stored in a data base under the tree's ID.

Global Information System (GIS) for Harvesting

GIS, FIG. 1, reference 140, maintains an Absolute Position Database for the orchard.

(GIS) Database for Harvesting

The GIS contains all the data and Programs required for harvesting. The data is backed up for additional protection. The data and programs are downloaded as needed to accomplish the harvesting tasks. The GIS also maintains and keeps the Matrix updated on a regular bases to allow the machine to know where it is at all times.

Matrix Details for Robotic Pruner & Harvester

A three-dimensional Matrix FIG. 26 reference 596, is the center of the Mapping System for the Robotic Pruner and Harvester. The matrix data points are mapped in GPS units which provides an Absolute Data reference regardless of the machine that the Matrix is on. This makes the data interchangeable between machines. The data points consist of the global position numbers of Latitude; Longitude; and Elevation. The matrix is a 3-dimensional virtual rectangular box of which, one vertical plane surface makes up a plane and a perpendicular horizontal plane surface that the two GPS antennas are reference points.

Input for Vector Based Stick Image for Harvesting

The method to locate the tree in the matrix utilizes vector graphics to place objects in the matrix at the proper locations. The method utilizes a Vector Based Stick Image (VBSI) of the tree trunks, branches and limbs that is generated from stereo images of the tree, or several single images from known locations when the tree is dormant. A VBSI is an image of the tree trunk, branches, and limbs is defined by a series of vectors and points in 3-D space. The image starts at the base of the trunk as the first point with a line (vector) to the next point going up the trunk. A series of short lines connecting points that is located at the mid-point of the diameter of the trunk as one progresses up the trunk until the trunk become less the 2 inch in diameter. Then starting at the line on the trunk a series of lines and points are determined for each branch coming from the trunk. When completed a stick image is generated of the tree trunk, branches and limbs using only a series of points (x,y,z) connected by vectors. Once the VBSI is created for a tree the tree can be placed in the matrix by locating the starting point on the tree trunk in the matrix space.

Robotic Ranging System (RRS) for Harvesting

Using the GPS FIG. 1, reference 124, data for the location of the machine and the distance from the RRS FIG. 1, reference 136 & 137, an absolute location is calculated FIG. 19, 711, and this absolute location will be the Identifying Number for the tree. Items that can be located by the RRS FIG. 1, reference 136 & 137, are irrigation lines and sprinkler heads, trellis frames and wires. The RRS FIG. 1, reference 136 & 137, will request the operator through the operator interface FIG. 1, reference 106, to identify and note if the machine must avoid the obstructions FIG. 22, 924. These obstructions will also be associated with the tree identification in the GIS FIG. 1, reference 140.

Digital Imaging System (DIS) for Harvesting

FIG. 16 is a Block Diagram of the DIS. There are two Embedded System modules FIG. 16, reference 507 & 526 that will house the DIS Processor FIG. 16, reference 509 & 527, one for each side of the machine. The DIS processor FIG. 16 reference 509 & 527, for each side will process the camera for the same side of the machine. These include Cameras FIG. 16, reference 331-334, and 335-338. They also include the close-up cameras FIG. 16, reference 586, 587, 589 and 596, 597, 598. And FIG. 28, reference 60-65. The DIS processor FIG. 16, reference 509 & 527, for each side will connect to the cameras through USB system FIG. 16, reference 528.

The Embedded module will connect through the Local Area Network FIG. 16, reference 599, to a Host CPU FIG. 16 reference 339. The Host CPU will communicate with Ranging FIG. 16 reference 360, GIS FIG. 16 reference 361, CBCS FIG. 16 reference 362, and GPS FIG. 16 reference 363.

Images will be collected based on inputs from the CBSC FIG. 16 reference 362.

Input for imaging processing to obtain Vector Based Stick Image

Provides the number and location of all the fruit buds in a tree.

Input for imaging and guiding arm to cut stem

Machines for Harvesting

Self Propelled Vehicle (SPV) for Harvesting

FIG. 28 is a isometric drawing of the machine FIG. 28, reference 1, configured for harvesting. The SPV FIG. 28, reference 3, supports the harvesting apparatus. The drives are Hydrostatic drives FIG. 28, reference 4, powering low profile wheels FIG. 28, reference 5. There is an operator platform FIG. 28, reference 6, that is low and to the rear of the SPV FIG. 28, reference 3. The operator platform has a control system cabinet FIG. 28, reference 13, and a Emergency Stop FIG. 28, reference 10, which will stop all components in place. The steering wheel will be a auto steer system FIG. 28, reference 16. A brake pedal FIG. 30, reference 23, is also provided on the platform to stop the machine motion.

Figure 30:
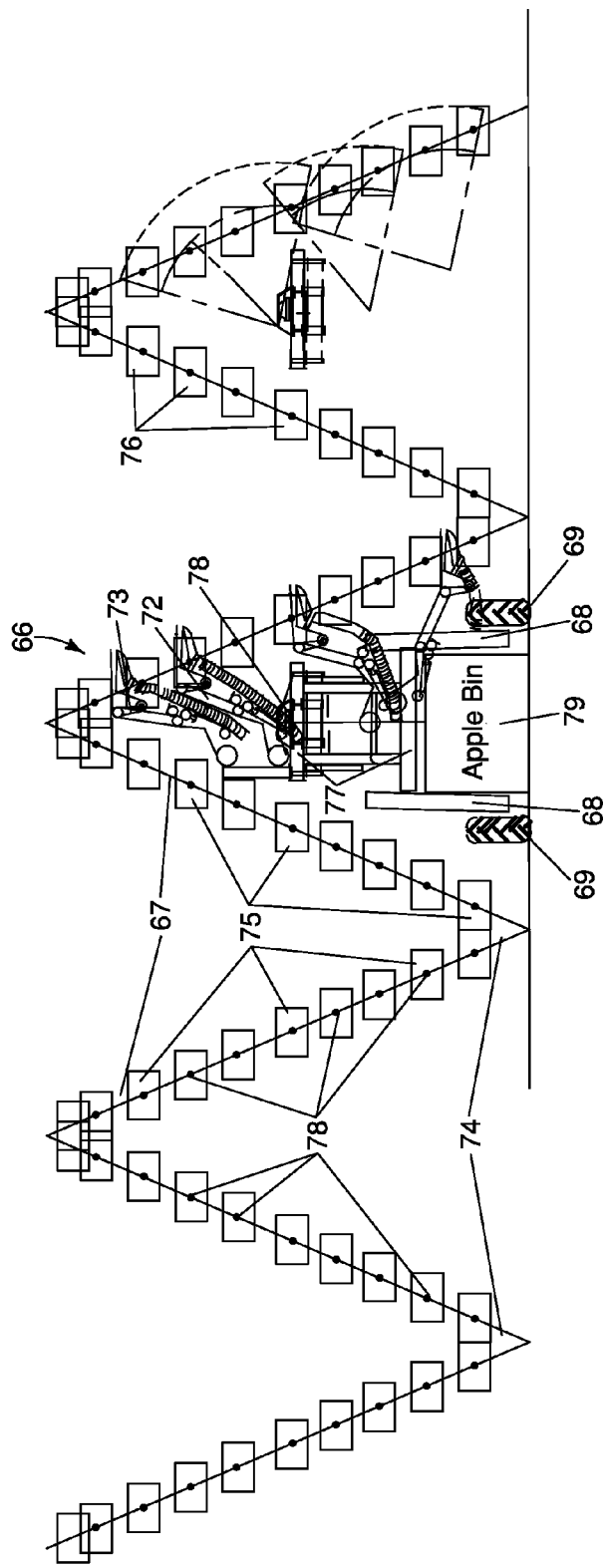
FIG. 30 is a front view of the apple harvester in a v-trellis orchard (only one Side).
Figure 31:
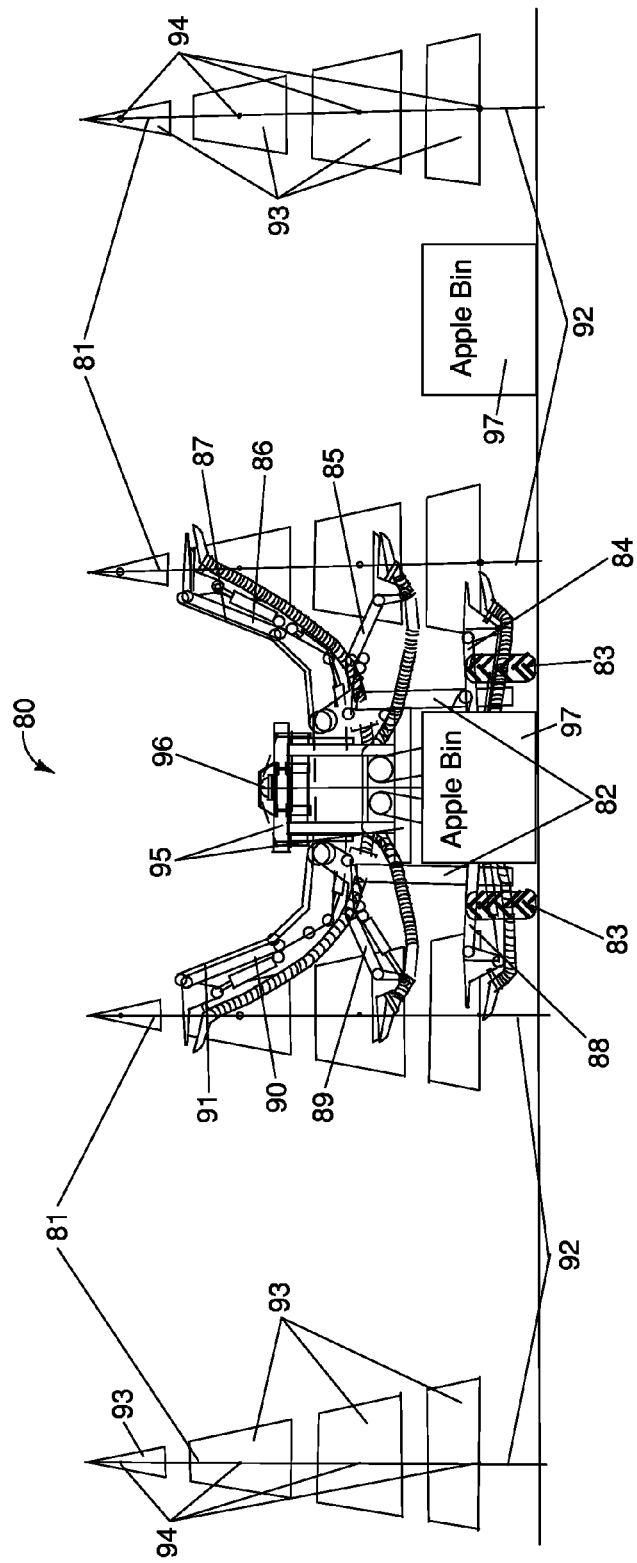
FIG. 31 is a front view of the apple harvester in a straight trellis orchard.

The motor FIG. 30, reference 7 and Hydrostatic transmission FIG. 30, reference 8, and electric generator FIG. 30, reference 9, are all mounted at the front of the machine. The first production SPV will be designed for operation in trellised apple orchards. FIG. 30 is a detailed drawing front view of the Harvester FIG. 30, reference 66, in a v-trellis orchard. The SPV FIG. 1, reference 3 is designed with a clearance tunnel to allow the empty apple bins FIG. 30, reference 79, to pass under the harvester. The robot arms FIG. 30, reference 70, 71, 72, & 73, are staggered both horizontal as well as vertical in order to access all of the tree. The robotic Arms FIG. 28, reference 30-35 are powered by hydraulic cylinders FIG. 28, reference 30-35 Only one side of the Robotic Arms are shown for clarity. The machine runs on low-Profile tires FIG. 30, reference 69, to keep the machine low. A leveling system FIG. 30, reference 68 keeps the harvester level sloping orchards. The tree trunks FIG. 30, reference 74, and trellis poles FIG. 30, reference 66, make up the shape of the v trellis. The trellis wires FIG. 30, reference 75, is where the main branches are tied. The Fruit Zones FIG. 30, reference 76, is where all the fruit will be located. The SPV Frame FIG. 30, reference 77 provides a ridge support for the robotic arms FIG. 30, reference 70, 71, 72, & 73. The front GPS antenna FIG. 30, reference 78, provides the reference location of the machine and Matrix. The first production SPV will be designed for operation in trellised apple orchards. FIG. 30 is a detailed drawing front view of the Harvester FIG. 31, reference 80, in a straight trellis orchard. The SPV FIG. 1, reference 3 is designed with a clearance tunnel to allow the empty apple bins FIG. 31, reference 97, to pass under the harvester. The robot arms FIG. 31, reference 85, 86, 87, 89, 90, & 91, are staggered both horizontal as well as vertical in order to access all of the tree. The machine runs on low-Profile tires FIG. 31, reference 83, to keep the machine low. A leveling system FIG. 31, reference 82 keeps the harvester level sloping orchards. The tree trunks FIG. 31, reference 92, and trellis poles FIG. 31, reference 81, make up the Christmas tree shape of the straight trellis. The trellis wires FIG. 31, reference 94, is where the main branches are tied. The Fruit Zones FIG. 31, reference 93, is where all the fruit will be located. The SPV Frame FIG. 31, reference 95 provides a ridge support for the robotic arms FIG. 30, reference 85, 86, 87, 89, 90, & 91. The front GPS antenna FIG. 31, reference 96, provides the reference location of the machine and Matrix.

The machine is configured for harvesting as shown in FIG. 28. The process flow for harvesting is shown in FIG. 22 PROCESS FLOW DIAGRAM FOR HARVESTING MODE. With the machine in the manual mode FIG. 22, reference 922 the operator uses information provided by the GPS FIG. 1, reference 124, to manually align the machine to the center of the of two row trees, or in the case of an edge row one sets the distance of the machine from the tree row. The operator initializes each robotic arm FIG. 28, reference 30, 31, & 32, to the start harvesting position FIG. 22, reference 923. The operator will then locate the first tree trunk on left side of the SPV FIG. 1, reference 3, by guiding the most forward left robotic arm FIG. 28, reference 30, to the starting position.

The operator will do this task by operating the joystick FIG. 28, reference 14. The joystick is shown in the Flow Diagram for the Operator Interface FIG. 3. Then the operator will locate the first tree on the left side of the SPV FIG. 28, reference 3, by guiding the most forward robotic arm FIG. 28, reference 30 until the end effector just touches the target on the trunk of the first left tree. Note: the left side robotic arms are staggered ahead of the right side robotic arms on the machine.

Then the operator repeats the operation for the right side of the machine until the right side robotic arm's FIG. 28, reference 33 end effector just touches the target on the trunk of the first right tree. Once the machine is aligned and initialized the operator then checks that all interlocks are good FIG. 22, reference 923 and selects the mode for Picking FIG. 22, reference 937. The CBCS FIG. 1, reference 102, will load the matrix FIG. 22, reference 924, identify the machine direction FIG. 22, reference 825, and load the Pick Paths and Pick Fruit algorithms FIG. 22, reference 926. The CBCS FIG. 1, reference, 102 then requests the GIS FIG. 1, reference 140, to load the matrix for the machine FIG. 22, reference 924. The direction the machine is expected to be moving during the picking is verified FIG. 22, reference 925. The CBCS FIG. 1, reference 102, then loads the Pick Path data for the side of the trees facing the machine from the GIS FIG. 1, reference 140; FIG. 22, reference 926. The paths may be reassigned and also may be resigned to the specific robotic arm by the operator FIG. 22, reference 927. The pick path is downloaded to the specific robotic controller FIG. 22, reference 927 which is the same step in FIG. 9 reference 844, on the robotic controller receiving the Pick Path Program. The robotic controller runs the assigned pick path program to harvest the apples on the assigned tree area. When the controller step encounters an interrupt FIG. 22, reference 929 also FIG. 9, Reference 844 the Pick path is turned over to the pick function FIG. 22, reference 933, also FIG. 9 Reference 850, 852, to find the fruit and then cut the stem FIG. 22, reference 934, also FIG. 9 Reference 854. Once completed the robotic controller checks for more apples in the same cluster by looping FIG. 9 Reference 856, 850. If no more apples the function is turned back to FIG. 9, Reference 844 to see if the next pick path is loaded FIG. 22, reference 926 and loops to continue the pick paths until the last tree pick path is completed FIG. 22, reference 931, also FIG. 9, Reference 848.

When finished with the current tree the CBCS FIG. 1, reference 102 will check to see if this is the last tree in the row and if no FIG. 22, reference 931 will return and load the data for the next tree in the row FIG. 22, reference 926. If the tree is the last in the row, then if is yes, FIG. 22, reference 931, the robotic arm is sent a Pick Pause signal as each arm completes its current assigned pick paths FIG. 22, reference 932, also FIG. 22 Reference 848. When the last Pick path is completed the machine stops and returns the mode to manual FIG. 22, reference B, 922 also FIG. 9 Reference 870.

Robotic Arm for Harvesting

Robotic Control system FIG. 2, references 340, 342, 344, 346 will control a robot arm with 3 horizontal pivots and one vertical Pivot point and including the end effector will have 4 to 5 degrees of freedom.

The Controller will consist of a commercial robotic controller that will control electrohydraulic servo valve (EHSV) or proportional valves as needed. The valves will control flow to hydraulic cylinders that will control the movement of each arm section around the pivot point. A feedback loop is provided by linear position sensors provided as part of the cylinders or separate rotational or linear sensors.

The controller will control 5 pivot axis

The control valves will be Danfoss PVE electrohydraulic actuators or equivalent product.

Robotic Position Sensors for Pruning

The hydraulic cylinders will be commercial equipment and will be Intellinder Position Sensor Hydraulic Cylinders by Parker@ or equivalent product.

The position sensors may be independent Penney+ Gilles® rotational and linear sensors or sensors integrated into the commercial equipment hydraulic cylinders and may be Intellinder Position Sensor Hydraulic Cylinders by Parker®, or equivalent product.

Robotic Arm Controller

FIG. 10 is a Block diagram for the Robotic Controller. The Robotic Controllers FIG. 10, reference 806-809, communicates with the GIS Matrix FIG. 10, reference 805, to get all positions in GPS position format. The positions are converted to linear movements to provide to each link of the robotic arm. All the controllers for the robotic arm are the same so only one controller is described in the Block diagram. Four Robotic controllers are shown in FIG. 10, reference 806, 807, 808, & 809, which would make up one side of an 8-arm machine. The apparatus is shown for only Robotic Controller #1 FIG. 10, reference 806, It has controls for six servo valves FIG. 10, reference 821-826, that operate up to six hydraulic cylinders FIG. 10, reference 811-816.

The Robotic Controller #1 FIG. 10, reference 806, receives input from position sensors FIG. 10, reference 831-836, that indicates the position of each cylinder. There is a close-up camera FIG. 10, reference 860-864, on each end effector to guide the arm to pick the fruit.

FIG. 9 is a flow diagram for Robotic Controllers FIG. 1, reference #1 or 170, reference #2 or 172, reference #3 or 174, reference #4 or 176, reference #5 or 180, reference #6 or 182, or reference #7 or 184, reference #8 or 186. There are four Left Side Robotic Controllers and four Right Side Robotic Controllers. In one embodiment, the controllers are the same so only one flow diagram will be shown for all of the controllers. The Robotic Controllers will have a calibration program FIG. 9, reference 800, a home program FIG. 9, reference 820, pruning pause program FIG. 9, reference 830, picking pause program FIG. 9, reference 840, Pruning Program FIG. 9, reference 850, Picking Program FIG. 9, reference 842, Manual Program FIG. 9, reference 870, and a Shutdown program FIG. 63, reference 890.

The calibration program cycles the robotic arm through a series of absolute locations based on the matrix FIG. 9, reference 801, adjustments are made to the positions of the arms if the control points are off FIG. 9, reference 803. Once calibrated the arms are returned to the Home position FIG. 9, reference 820.

1. Robotic Control system will control a robot arm with one vertical Pivot point and 3 horizontal pivots and including the end effector will have 4 to 5 degrees of freedom.
   a. The Controller will consist of single board computers or a commercial robotic controller that will control electrohydraulic servo valve (EHSV) or proportional valves as needed. The valves will control flow to hydraulic cylinders that will control the movement of each arm section around the pivot point.
   b. A feedback loop is provided by linear position sensors or rotation position sensors provided as part of the cylinders or separate item.
   c. The hydraulic cylinders will be commercial equipment and will be Intellinder Position Sensor Hydraulic Cylinders by Parker@ or equivalent product.
   d. Control 5 pivot axis
   e. The control valves will be Eaton CMA Advanced Mobile Valve with Independent Metering, Danfoss PVE electrohydraulic actuators or equivalent product.
   f. The single board Computers will be a Allen Bradley PLC. "1768 CompactLogix™, Compact GuardLogix® controllers, or Siemens and GE PLC controllers are equivalent products, Raspberry Pi or equivalent product.
2. The Robot arm controller will run with six algorithms loaded. There will be a Shutdown program, a Startup program, a Park program, a Home program, a Calibrate program that will be standard for the robot arms. It will have a manual algorithm, a Pick Path Program, and a Pick Program.
   a. The Shutdown Program will position the robot for transport, and proceed through a safe shutdown sequence including setting safe locks.
   b. The Startup Program will start a warning alarm, check interlocks, and release locks.
   c. The Home program will move the robotic arms to the home position for the robotic arms.
   d. The Park Program will move the robotic arm to a position to allow the machine to be turned around at the end of row or in preparation for shutdown.
   e. The Calibration Program sequences the robotic arms about the home position to allow for adjustments in the calibration of the sensors.
   f. The Manual Program will allow the machine to be manually controlled through the Joy stick
   g. The Pick Path Program loads the previously generated program stored in the GIS and determines the movements for each hydraulic cylinder and positions of the linear sensors for each effector GPS location. At the interrupts, the program is turned over to the Pick Program. When the Pick Program completes its sequence, the control is turned back to the Pick Path Program.
3. The operator will be asked to assess the order the pick paths are assigned to the robotic arms, and will have an opportunity to re-assign a pick path to the Left Robotic Controller #1, Left Robotic Controller #2, Left Robotic Controller #3, or for the other side of the SPV for the Right Robotic Controller #4, Right Robotic Controller #5, or Right Robotic Controller #6, as appropriate FIG. 22, reference 927.
4. The pick-path for the robot arm will be a series of locations that each axis of the robot arm is to be at to maintain the end effectors at its Global Position location as it moves from point to point along the pick path. This will be handled by the robot controller with positional feedback on each axis of the robotic arm. Each Robot controller will start the pick path when the VBSI positions are in the bounds of the GPS locations in the matrix.
   a. When Interrupt is encountered in the Pick Path Program FIG. 9, reference 1155, then the operation is turned over to the Pick Program FIG. 9, reference 1153.
   b. When a robotic arm has finished with the current tree the CBCS FIG. 9, reference 846, will check to see if this is the last tree in the row and if no will return and load the paths for the next tree in the row FIG. 9, reference 848.
   c. If the tree is the last tree in the row, then if is yes, FIG. 9, reference 848, the robotic arm is sent a Prune Pause FIG. 9, reference 830 signal as each arm completes its current assigned pick paths FIG. 9, reference 846.
   d. When the last Pick path is completed the machine stops and returns the mode to manual FIG. 9, reference 870.
5. The Pick Program FIG. 9, reference 1153, moves from the interrupt location and moves toward the apple based on small adjustments from the Pick camera until the fruit drops. The effector is then returned to the interrupt position, checks for another apple. If an apple is detected it is also picked. When no apple is visible then the control is returned to the Pick Path Program. The program may have options selected to no pick if size is small, or if color is not correct.
6. The Pick Program moves from the interrupt location and moves toward the apple based on small adjustments from the Pick camera until the fruit drops. The effector is then returned to the interrupt position, checks for another apple. If an apple is detected it is also picked. When no apple is visible then the control is returned to the Pick Path Program. The program may have options selected to no pick if size is small, or if color is not correct.

The operator will be asked to assess the order the pick paths are assigned to the robotic arms, and will have an opportunity to re-assign a pick path to the Left Robotic Controller #1, Left Robotic Controller #2, Left Robotic Controller #3, or for the other side of the SPV for the Right Robotic Controller #4, Right Robotic Controller #5, or Right Robotic Controller #6, as appropriate 305.

5. Stem Cutter Assembly for Harvesting

A detailed design has been completed for the Stem Cutter Assembly FIG. 9, reference 300. Two sizes of Shear Blades FIG. 14, reference 29 and Knife blades FIG. 15, reference 30 have been designed, one for small fruit (cherries, Plums) and a larger size for larger fruits (apples, pears) FIG. 21, reference 34, and FIG. 22, reference 35.

The Stem Cutter utilized a set of synchronized counter-rotating blades.

6. Fruit Catcher for Harvesting

When the stem of the fruit is cut, the fruit falls a short distance to the fruit catcher FIG. 28, reference 50. The fruit catcher FIG. 28, reference 50, will be held just under the fruit and the fruit is directed into the vacuum hose FIG. 28, reference 18. The vacuum hose FIG. 28, reference 18 conveys each piece of fruit to the fruit handling system FIG. 28, reference 20, which will pack the fruit in fruit bins or fruit trays that will be placed on pallets.

7. Vacuum Hose for Harvesting

The air flowing in the vacuum hose FIG. 28, reference 18, FIG. 28, reference 18 moves the fruit individually to the fruit collector FIG. 28, reference 19, FIG. 28, reference 19.

As the fruit moves up the elevator FIG. 28, reference 21, the air flowing in the vacuum hose FIG. 28, reference 18, and moves the fruit individually to the fruit collector FIG. 28, reference 19.

The air flowing in the vacuum hose FIG. 28, reference 18, and moves the fruit individually to the fruit collector FIG. 28, reference 19.

8. Fruit Collector (Decelerator) for Harvesting

The fruit collector FIG. 28, reference 19, absorbs the energy of the fruit moving through the vacuum hoses FIG. 28, reference 21, by dropping the fruit into flowing water.

9. Fruit Handling for Harvesting

The fruit handling system FIG. 1, reference 108, FIG. 28, reference 20 uses water to wash the fruit and move the fruit to the elevator FIG. 28, reference 21. As the fruit moves up the elevator FIG. 28, reference 21, air is blown over the fruit to dry the surface water on the fruit. The elevator raises the fruit up to the bin loader FIG. 28, reference 22, that gently places the fruit into the fruit bin or trays.

Prototype

First prototype will be a single robotic arm mounted on a mobile platform. This prototype will demonstrate that the robotic arm (RB) can operate in an autonomous mode and prune apple trees, and then harvest the apples and maintain quality for the commercial fresh fruit apple market.

The Prototype RB is necessary due to the costs to design and manufacture the RB. The interfaces between the systems is complex and the prototype RB allows the detailed design to be accomplished verified and tested before the Prototype production RB design is committed to production. FIGS. 1, 2, 3 and 4 are photos of the prototype RB. The arm is mounted in a trailer that can be pulled and powered by an orchard tractor. The trailer will have an apple decelerator, apple handler, apple bin to receive the harvested apples and a prototype controls.

The RB consists of a mounting main frame assembly that mount the RB to the trailer, a swing frame assembly, a boom assembly, a goose neck assembly, control valve assembly, Hydraulic cylinders, position sensors, hoses and fittings, and control cabinet containing the CPU and PLC RA controller.

Methods for Harvesting

Methods for Automated Harvesting Operation

Steps for Fruit Harvesting

Pick Mode Steps

The CBCS FIG. 1, reference 102, will load and start the matrix FIG. 22, reference 924, Pick Paths and Pick Fruit algorithms FIG. 9, reference 926, when the picking mode FIG. 9, reference 937, is selected.

CBCS loads Pick Paths for the sides of the trees facing the SPV FIG. 9, reference 3, for the first 8 to ten trees in the row.
  a. Note: the CBCS will parallel process one to four or five trees on each side of the machine depending on the tree spacing set by the operator and when the VBSI appears in the matrix.

The CBCS then requests the GIS FIG. 1, reference 140 to load the matrix for the machine FIG. 22, reference 924.

The direction the machine is expected to be moving during the picking is verified FIG. 2, reference 925.

The CBCS then loads the Pick Path data for the side of the trees facing the machine from the GIS FIG. 1, reference 140, FIG. 22, reference 926.

The operator will be asked to assess the order the pick paths are assigned to the robotic arms, and will have an opportunity to re-assign a pick path to the Left Robotic Controller #1, Left Robotic Controller #2, Left Robotic Controller #3, Right Robotic Controller #4, Right Robotic Controller #5, or Right Robotic Controller #6, as appropriate FIG. 22, reference 927.

The CBCS loads the Pick Program and sends the Program to the DIS and Robotic Arm Controllers.

Upon authorization, the pick paths are sent to the appropriate Robotic controllers and the picking operation is started FIG. 22, reference 928.

Steps for Pick Path

Each Robot controller will start the pick path when the VBSI is in the matrix. The Pick Path Programs will have interrupts at each location along the path where fruit is expected. When an Interrupt is encountered in the pick path program FIG. 21, reference 929, then the operation is turned over to the Pick algorithm FIG. 22, reference 933.

When a robotic arm has finished with the current tree the CBCS FIG. 9, reference 102 will check to see if this is the last tree in the row and if no will return and load the paths for the next tree in the row FIG. 22, reference 932.

If the tree is the last in the row, then if yes, FIG. 22, reference 931, the robotic arm is sent a Manual signal as each arm completes its current assigned pick paths FIG. 22, reference 931. When the last Pick path is completed the machine stops and returns the mode to manual FIG. 22 reference 922.

Steps for Pick

The Pick Path algorithms will have interrupts at each location along the path where fruit is expected. When an interrupt is encountered FIG. 22, Loop C, the operation is turned over to Pick Algorithm FIG. 22, references 933, 934, & 936.

The Pick Algorithms then finds the closest fruit FIG. 22, reference 933 and cuts the stems using the DIS camera FIG. 1,136-143 & 156-162, DIS cameras shown in inconsistent sides of machine in some figures such as FIG. 1 mounted on the stem cutter assembly. This is accomplished with a feedback loop that moves in on the detected fruit and the stem cutter is passed through the area of the stem on the fruit FIG. 22, reference 934. When a fruit drop is yes than an interrupt is set FIG. 22, Loop C, then the robotic pulls back to the interrupt location FIG. 22, reference 936
The DIS camera looks for more fruit FIG. 22, reference 933, If no fruit is detected then the operation returns to the last interrupt and the Pick algorithm FIG. 22, references 936, returns to the Pick Path algorithm FIG. 22, reference 933, and continues to the next expected fruit location and then returns the operation back over to the Pick algorithm FIG. 22, references 926. This is repeated until each pick path is completed for the tree. When the last Pick path is completed the machine stops and returns the mode to manual FIG. 22, reference B.

The operator then uses the joystick and SPV controls to turn the SPV around and align the SPV with the next row to be harvested, and repeats harvesting process for the next row.

Method to Recognize the Fruit Buds and Determine their Location

The processing is accomplished by a program which includes a system knowing where and how the tree variety blooms and sets fruit on the limbs and other parameters for determining where the fruit will be located on the tree. The program will recognize the fruit buds and differentiate the fruit buds from leaf buds. The program will provide the coordinates of the fruit buds generate table of coordinates that locate the buds.

The recognition process will use Neural networks to differentiate a fruit bud from a leaf bud. The following characteristics will be included to differentiate between leaf buds and fruit buds and limbs and twigs;
The data for the fruit buds identified for each fruit variety, where to expect fruit buds.
Fruit buds are larger that leaf buds.
Fruit buds have a white fuzz on the top area of the bud.
Fruit buds color is a green color different from leaf buds.
A large number of fruit bud images are provided for the program to utilize in making a decision.

Utilize the Digital Imaging System to direct the last six to eight inches of the end effector during the pick mode. This will make the small adjustments to guide the robot to cut the stem. The camera can also be used to make a determination on color, size and if multiple apples are on the same bud location. If the apple is under size it can stop the pick and move on to the next apple. If the apple is not the color for ripe the, pick can be stopped and move on to the next apple. Detect when the apple drops and stops the robot from extending into the tree area.

Method to Remove the Fruits as Individual Pieces of Fruit

The processing is accomplished by a program which includes a system knowing where and how the tree variety blooms and sets fruit on the limbs and other parameters for determining where the fruit will be located on the tree. The GPU will utilize programs used for image recognition. The program will recognize the fruit buds and differentiate the fruit buds from leaf buds. The program will provide the coordinates of the fruit buds generate table of coordinates that locate the buds.

The processing is accomplished by a program which includes a system knowing where and how the tree variety blooms and sets fruit on the limbs and other parameters for determining where the fruit will be located on the tree. The program will recognize the fruit buds and differentiate the fruit buds from leaf buds. The program will provide the coordinates of the fruit buds generate table of coordinates that locate the buds.

The recognition process will use Neural networks to differentiate a fruit bud from a leaf bud. The following characteristics will be included to differentiate between leaf buds and fruit buds and limbs and twigs:
The data for the fruit buds identified for each fruit variety, where to expect fruit buds.
Fruit buds are larger that leaf buds.
Fruit buds have a white fuzz on the top area of the bud.
Fruit buds color is a green color different from leaf buds.
A large number of fruit bud images are provided for the program to utilize in making a decision.

Utilize the Digital Imaging System to direct the last six to eight inches of the end effector during the pick mode. This will make the small adjustments to guide the robot to cut the stem. The camera can also be used to make a determination on color, size and if multiple apples are on the same bud location. If the apple is under size it can stop the pick and move on to the next apple. If the apple is not the color for ripe the, pick can be stopped and move on to the next apple. Detect when the apple drops and stops the robot from extending into the tree area.

1. The pick-path for the robot arm will be a series of locations that each axis of the robot arm is to be at to maintain the end effectors at its Global Position location as it moves from point to point along the pick path. This will be handled by the robot controller with positional feedback on each axis of the robotic arm. Each Robot controller will start the pick path when the VBSI positions are in the bounds of the GPS locations in the matrix.
   a. When Interrupt is encountered in the Pick Path Program FIG. 22, reference 928, then the operation is turned over to the Pick Program FIG. 22, reference C.
   b. When a robotic arm has finished with the current tree the CBCS FIG. 1, reference 102, will check to see if this is the last tree in the row and if no FIG. 22, reference 931, will return and load the paths for the next tree in the row FIG. 22, reference 926.
   c. If the tree is the last tree in the row, then if is yes, FIG. 22, reference 931, the robotic arm is sent a Home signal as each arm completes its current assigned pick paths FIG. 22, reference 932.
   d. When the last Pick path is completed the machine stops and returns the mode to manual FIG. 22, reference 922.
2. The Pick Path Program FIG. 9, reference 842 loads the previously generated program stored in the GIS FIG. 1, reference 140, and determines the movements for each hydraulic cylinder and positions of the linear sensors for each effector GPS location provided by the Pick Path Program FIG. 9, reference 842. At the interrupts, the program is turned over to the Pick Program FIG. 9, reference 850.
3. Utilize the Digital Imaging System to direct the last six to eight inches of the end effector during the pick mode. This will make the small adjustments to guide the robot to cut the stem. The decisions to make adjustments to the robotic controller will be based on a knowledge base and using Rule Decisions to make the calculations for the adjustments for the distance to move the Robotic Arm Sections.

The method for accomplishing this process is as follows:
The image is process by the GPU to turn the color range for the variety of apple to one uniform red color.
The GPU adds a white circle around the red pixels and locates the center and add a target point.
Calculates the distance to align the sight on the stem Cutter and provides it the Robotic Controller,
The GPU repeats the process until the apple drops.
The GPU sends a drop signal to the Robotic controller. The camera can also be used to make a determination on color, size and if multiple apples are on the same bud location. If the apple is under size it can stop the pick and move on to the next apple. If the apple is not the color for ripe the, pick can be stopped and move on to the next apple. Detect when the apple drops and stops the robot from extending into the tree area.

4. When Interrupt is encountered in the Pick Path Program FIG. 9, reference 1155, then the operation is turned over to the Pick Program FIG. 9, reference 1153.
5. When a robotic arm has finished with the current tree the CBCS FIG. 22, reference 102, will check to see if this is the last tree in the row and if no will return and load the paths for the next tree in the row FIG. 22, reference 844.
6. If the tree is the last tree in the row, then if is yes, FIG. 22, reference 848, the robotic arm is sent a Pick Pause signal as each arm completes its current assigned pick paths.
7. When the last Pick path is completed the machine stops and returns the mode to manual FIG. 22, reference 870.
8. The Pick Program FIG. 9, reference 1153, moves from the interrupt location and moves toward the apple based on small adjustments from the Pick camera until the fruit drops. The effector is then returned to the interrupt position, checks for another apple. If an apple is detected it is also picked. When no apple is visible then the control is returned to the Pick Path Program. The program may have options selected to no pick if size is small, or if color is not correct.

Method for Handling the Fruit without Damage

And SPV FIG. 30, design to allow the machine to go over top of empty bins that are pre placed between the tree rows.
The function of the machine to remove fruit is divided among the CBCS FIG. 1, reference 102, the DIS FIG. 1, reference 120 & 130, the stem cutter end effector FIG. 28, reference 36-41, and the robotic arm FIG. 28, references 30-35. The pick fruit algorithm will run in the CBCS FIG. 1, reference 102, The DIS FIG. 1, reference 120 & 130, will target fruit and provide delta adjustments to the robotic arm to move in on the fruit. The stem cutter FIG. 28, 36-41, which is running and powered by a hydraulic motor will cut the stem when encountered allowing the fruit to drop about 1 to 2 inches into the fruit catcher FIG. 28, reference 50. When the DIS FIG. 12, references 512, 513, 514 or fruit catcher senses fruit dropping, it retracts the arm to the interrupt point and turns the operation over to the pick path algorithm.

1. The Pick Program moves from the interrupt location and moves toward the apple based on small adjustments from the Pick camera until the fruit drops. The effector is then returned to the interrupt position, checks for another apple. If an apple is detected it is also picked. When no apple is visible then the control is returned to the Pick Path Program. The program may have options selected to no pick if size is small, or if color is not correct.
2. The Pick Program FIG. 9, references 850-856 receives control from the Pick Path Program. The Path Program requests the DIS to find apples and the close up-camera obtains images FIG. 9 reference 850. The program looks for the proper color and if detected then it knows there is an Apple in view. It Puts a circle around the area of proper color and determines the center. It sends movements to the robot controller to center the circle in the cameras view and moves from the interrupt location and moves toward the apple based on small adjustments from the DIS close-up camera until the fruit drops FIG. 9, reference 854. The effector is then returned to the interrupt position FIG. 9, reference 856, checks for another apple FIG. 9, reference 850. If an apple is detected it is also picked. When no apple is visible then the control is returned to the Pick Path Program FIG. 9, reference 852. The program may have options selected to no pick if size is small, or if color is not correct.
3. The DIS camera looks for more fruit FIG. 22, reference 933, If no fruit is detected then the operation returns to the last interrupt and the Pick algorithm FIG. 22, references 929, 933, returns to the Pick Path algorithm FIG. 22, reference 926 and continues to the next expected fruit location and then returns the operation back over to the Pick algorithm FIG. 22, references 933, 934, 936. This is repeated until each pick path is completed for the tree.
7. When the last Pick path is completed the machine stops and returns the mode to manual FIG. 22, reference 922.
8. The operator will be asked to assess the order the pick paths are assigned to the robotic arms, and will have an opportunity to re-assign a pick path to the Left Robotic Controller #1, Left Robotic Controller #2, Left Robotic Controller #3, or for the other side of the SPV for the Right Robotic Controller #4, Right Robotic Controller #5, or Right Robotic Controller #6, as appropriate 927.

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. A method for harvesting fruit comprising:
   obtaining an image of the fruit plant comprising branches;
   creating fruit zones surrounding the branches; and
   harvesting the fruit from the plant based upon the fruit zones;
   wherein the harvesting comprises utilizing graphic processor unit processing to locate fruit buds in the fruit zones; and
   wherein the utilizing the graphic processor unit processing comprises:
   placing a circle around the fruit bud;
   locating a center of the circle in X, Y coordinates; and
   determining a distance from a preselected point on the plant to the center of the circle and configure the distance in X, Y coordinates.

2. The method of claim 1 wherein the harvesting comprises locating buds in the fruit zones from a library of fruit buds.

3. The method of claim 1 wherein the image comprises an image of the fruit plant after pruning.

4. The method of claim 3 wherein the obtaining comprises developing an image of the fruit plant after pruning.

5. The method of claim 1 wherein the harvesting comprises differentiating between leaf buds and fruit buds.

6. The method of claim 1 further comprising developing a table of X, Y coordinates representing respective distances of fruit buds to the preselected point on the plant.

7. The method of claim 1 wherein the harvesting comprises developing a virtual matrix comprising data points for three-dimension space representing distances between a harvesting apparatus and the fruit.

8. The method of claim 7 wherein the harvesting apparatus comprises a vehicle.

9. The method of claim 8 wherein the vehicle is a self-propelled vehicle comprising robotic arms with cutting devices.

10. The method of claim 9 wherein:
the fruit is in a row of fruit plants;
the cutting devices perform the harvesting of the fruit; and
the self-propelled vehicle moves along the row of the fruit plants simultaneously with the harvesting of the fruit.

11. The method of claim 1 wherein the harvesting comprises developing a library of image locations of the fruit plant devoid of fruit buds.

12. The method of claim 1 wherein the creating comprises distinguishing between different tree varieties.

13. The method of claim 1 wherein the creating comprises determining where the fruit will be located on respective branches of the fruit plant.

14. The method of claim 1 wherein the harvesting comprises utilizing a neural network to differentiate between leaf buds and fruit buds.

15. The method of claim 1 wherein the harvesting comprises differentiating between fruit buds and at least one of the following: leaf buds, limbs, and twigs.

16. The method of claim 7 wherein the data points are mapped in GPS units which provides an Absolute Data reference.

17. The method of claim 7 wherein the data points comprise global position numbers of latitude, longitude and elevation.

18. The method of claim 1 wherein the harvesting comprises utilizing a Digital Imaging System (DIS) to direct an end effector the last 6 to 8 inches of the harvesting.

19. The method of claim 1 wherein the harvesting comprises distinguishing between color and size of the fruit to determine if the fruit is desirable to harvest.

20. The method of claim 1 wherein the obtaining an image further comprises generating two-dimensional stick images of the plant trunk, branches and limbs.

21. The method of claim 20 wherein the harvesting further comprises utilizing a robotic arm and an end effector.

22. The method of claim 21 wherein the harvesting further comprises relying upon the two-dimensional stick images to avoid damaging the plant trunk, branches and limbs while utilizing the robotic arm and the end effector.

23. The method of claim 20 wherein the obtaining an image further comprises converting the two-dimensional stick images into three-dimensional stick images.

24. The method of claim 23 wherein the harvesting further comprises:
utilizing a robotic arm and an end effector to gather the fruit; and
relying upon the three-dimensional stick images to avoid damaging the plant trunk, branches and limbs while utilizing the robotic arm and the end effector.

* * * * *